(12) United States Patent
Schantz et al.

(10) Patent No.: US 9,997,845 B2
(45) Date of Patent: Jun. 12, 2018

(54) EMBEDDED SYMMETRIC MULTIPLE AXIS ANTENNA SYSTEM WITH ISOLATION AMONG THE MULTIPLE AXES

(71) Applicant: Q-Track Corporation, Huntsville, AL (US)

(72) Inventors: Hans Gregory Schantz, Big Cove, AL (US); Christopher David Pittman, Huntsville, AL (US); James Lee Richards, Fayetteville, TN (US); Stephen A. Werner, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 572 days.

(21) Appl. No.: 14/313,932

(22) Filed: Jun. 24, 2014

(65) Prior Publication Data

US 2015/0318624 A1 Nov. 5, 2015

Related U.S. Application Data

(63) Continuation-in-part of application No. 12/834,821, filed on Jul. 12, 2010, now Pat. No. 8,922,440, which
(Continued)

(51) Int. Cl.
*H01Q 7/00* (2006.01)
*H01Q 21/28* (2006.01)
(Continued)

(52) U.S. Cl.
CPC ............ *H01Q 21/28* (2013.01); *G01S 5/14* (2013.01); *H01Q 1/273* (2013.01); *H01Q 1/276* (2013.01);
(Continued)

(58) Field of Classification Search
CPC ........... H01Q 7/00; H01Q 1/273; H01Q 7/08; H01Q 1/276; H01Q 21/24; H01Q 21/0087;
(Continued)

(56) References Cited

U.S. PATENT DOCUMENTS

| 716,134 A | 12/1902 | Stone | 342/417 |
|---|---|---|---|
| 1,483,383 A | 2/1924 | Sandell | 455/274 |

(Continued)

FOREIGN PATENT DOCUMENTS

| EP | 1226729 B1 | 7/2005 |
|---|---|---|
| GB | 5811 | 0/1903 |

OTHER PUBLICATIONS

W.J. Polydoroff, *High Frequency Magnetic Materials: Their Characteristics and Principal Applications*, (New York: John Wiley & Sons, 1960), pp. 166-169.
(Continued)

*Primary Examiner* — Hoang Nguyen
*Assistant Examiner* — Jae Kim
(74) *Attorney, Agent, or Firm* — James Richards; Mark P. Kahler

(57) ABSTRACT

The present disclosure pertains to a rotationally triply symmetric three axis magnetic antenna system having substantial isolation among the three axes, including a three axis skew orthogonal magnetic antenna system and device utilizing the antenna system. The antenna system comprising three substantially identical magnetic antenna elements disposed symmetrically about a reference point such that the magnetic axes from the three antenna elements are orthogonal to one another in direction and do not intersect one another. The three antenna elements are positioned in a substantial cross coupling null from one another to minimize cross coupling. The arrangement yields packaging efficiency for compact electronic devices. A 1, 1, diameter embodiment
(Continued)

is disclosed. A location system utilizing the antenna system is disclosed. Methods for producing the antenna are disclosed. A moldable triple coil holder for the antenna system is described.

12 Claims, 32 Drawing Sheets

Related U.S. Application Data is a continuation-in-part of application No. 11/473,595, filed on Jun. 23, 2006, now Pat. No. 7,755,552, which is a continuation-in-part of application No. 11/272,533, filed on Nov. 10, 2005, now Pat. No. 7,307,595.

(60) Provisional application No. 61/838,422, filed on Jun. 24, 2013, provisional application No. 60/637,779, filed on Dec. 21, 2004.

(51) Int. Cl.
*H01Q 21/00* (2006.01)
*G01S 5/14* (2006.01)
*H01Q 1/27* (2006.01)
*H01Q 7/08* (2006.01)
*H01Q 21/24* (2006.01)
*G01S 5/02* (2010.01)

(52) U.S. Cl.
CPC ............ *H01Q 7/00* (2013.01); *H01Q 7/08* (2013.01); *H01Q 21/0087* (2013.01); *H01Q 21/24* (2013.01); *G01S 5/0252* (2013.01); *Y10T 29/49018* (2015.01)

(58) Field of Classification Search
CPC ..... H01Q 21/28; Y10T 29/49018; G01S 5/14; G01S 5/0252
USPC ....... 343/718, 787, 788, 866, 867, 876, 893, 343/895, 900
See application file for complete search history.

(56) References Cited

U.S. PATENT DOCUMENTS

| | | | |
|---|---|---|---|
| 2,266,262 A | 12/1941 | Polydoroff | 343/764 |
| 2,282,030 A | 5/1942 | Busignies | 342/432 |
| 2,339,234 A | 1/1944 | Polydoroff | 343/788 |
| 2,399,382 A | 4/1946 | Polydoroff | 343/788 |
| 2,432,858 A | 12/1947 | Brown | 343/791 |
| 2,521,550 A | 9/1950 | Smith | 343/742 |
| 3,046,549 A | 7/1962 | Kalmus | 342/385 |
| 3,121,228 A | 2/1964 | Kalmus | 342/448 |
| 3,413,644 A | 11/1968 | Laub | 343/800 |
| 3,440,542 A | 4/1969 | Gautney | 455/274 |
| 3,448,440 A | 6/1969 | Wiegand | 365/244 |
| 3,713,148 A | 1/1973 | Cardullo et al. | 342/42 |
| 3,868,565 A | 2/1975 | Kuipers | 324/207.26 |
| 3,983,474 A | 9/1976 | Kuipers | 324/207.18 |
| 4,054,881 A | 10/1977 | Raab | 342/448 |
| 4,091,327 A * | 5/1978 | Larsen | G01R 29/0878 324/72.5 |
| 4,314,251 A | 2/1982 | Raab | 342/463 |
| 4,588,993 A | 5/1986 | Babij et al. | 342/351 |
| 5,697,384 A | 12/1997 | Miyawaki et al. | 128/899 |
| 5,771,438 A | 6/1998 | Palermo et al. | 455/41.1 |
| 6,060,882 A | 5/2000 | Doty | 324/318 |
| 6,067,052 A | 5/2000 | Rawles | 343/741 |
| 6,215,456 B1 | 4/2001 | Nakanishi | 343/895 |
| 6,538,617 B2 * | 3/2003 | Rochelle | G08B 21/0263 343/788 |
| 6,720,930 B2 | 4/2004 | Johnson | 343/742 |
| 6,774,642 B2 | 8/2004 | Lin et al. | 324/660 |
| 7,321,290 B2 | 1/2008 | Stevens et al. | 340/10.1 |
| 8,063,844 B1 | 11/2011 | Pease | 343/788 |
| 2005/0242959 A1 | 11/2005 | Watanabe | 340/572.7 |
| 2008/0252538 A1 | 10/2008 | Ying | 343/767 |

OTHER PUBLICATIONS

Kalmus, "A new guiding and tracking system," IRE Transactions on Aerospace and Navigational Electronics, Mar. 1962, vol. ANE-9, Issue 12, pp. 7-10.
Raab, "Quasistatic magnetic-field technique for determining position and orientation," IEEE Transactions on Geoscience and Remote Sensing, vol. GE-19, Issue 4, Oct. 1981, pp. 235-245.
Raab et al, "Magnetic position and orientation tracking system," IEEE Transactions on Aerospace and Electronic Systems, vol. AES-15 No. 5, Sep. 1979, pp. 709-717.
Ghirardi, Radio Physics Course, New York: Farrar & Rinehart, 1930, pp. 601-605.
Hertz, Electric Waves, 1893, pp. 109.
J.A. Goulbourne, HF Antenna Cookbook, 2nd ed. Texas Instruments Technical Application Report 11-08-26-001, Jan. 2004.
HF Antenna Design Notes, Texas Instruments Technical Application Report 11-08-26-003, Sep. 2003.
Fleming, The Principles of Electric Wave Telegraphy, London: Longmans, Green, and Co., 1908, pp. 31-32.
Morecroft, Principles of Radio Communication, 2nd ed., New York: John Wiley, 1921, pp. 194-203.
Schantz, "Origins of RF Based Location Technology" 2011 IEEE Radio and Wireless Symposium (submitted), Jan. 16-20, 2011.
Schantz, "RF Based Location Technology Since World War II" 2011 IEEE Radio and Wireless Symposium (submitted), Jan. 16-20, 2011.
Terman, Radio Engineering, 1st ed. New York: McGraw-Hill, 1932, pp. 40-41.

* cited by examiner

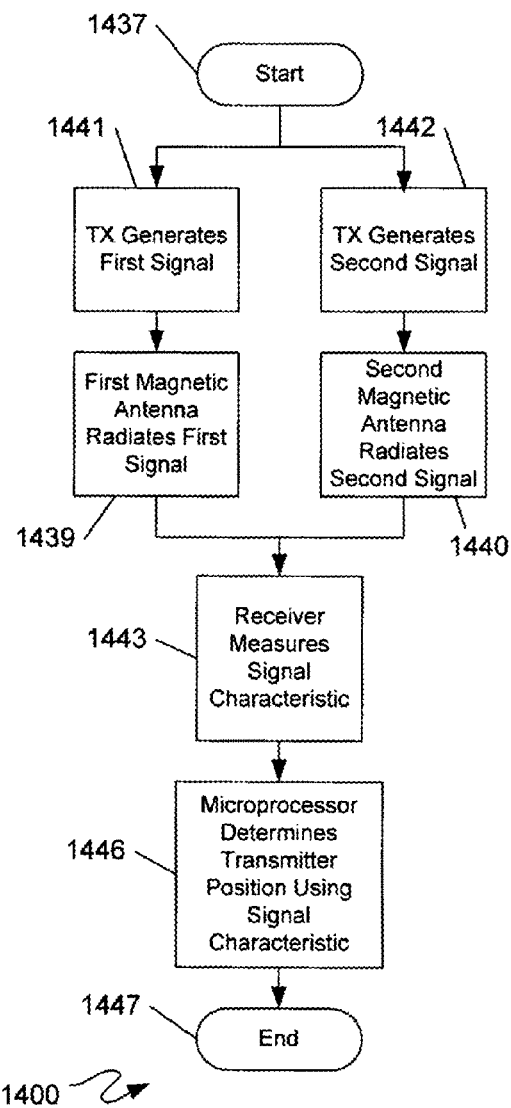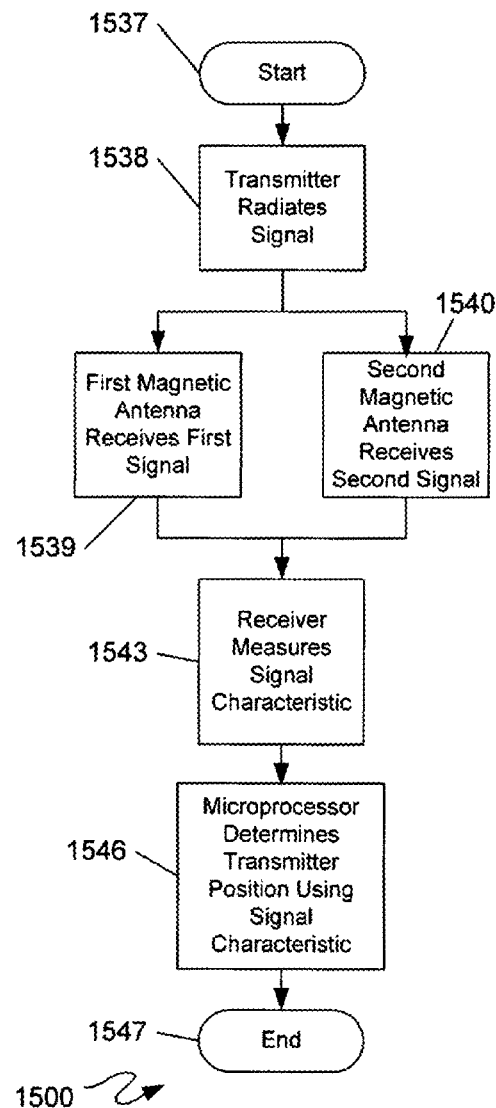
Fig. 14
Fig. 15

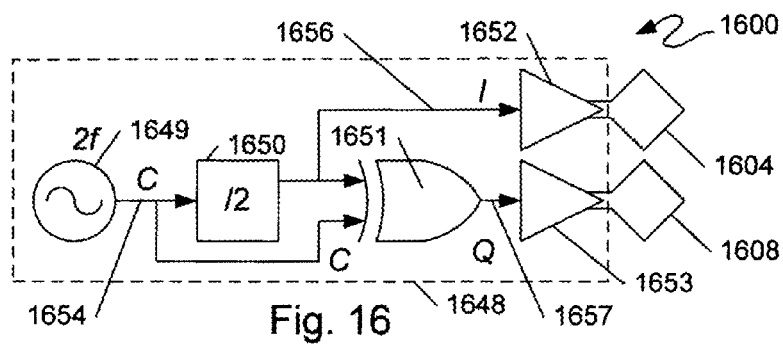
Fig. 16
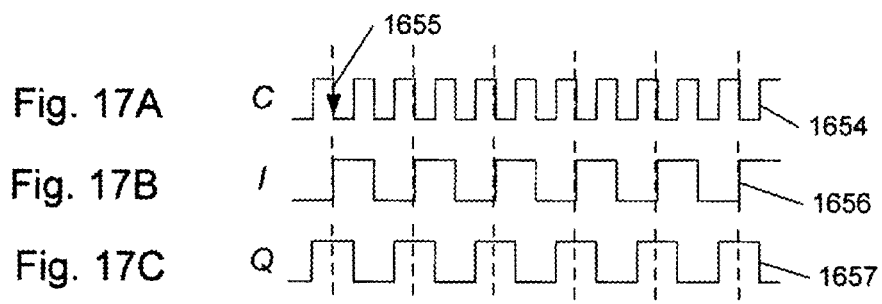
Fig. 17A
Fig. 17B
Fig. 17C
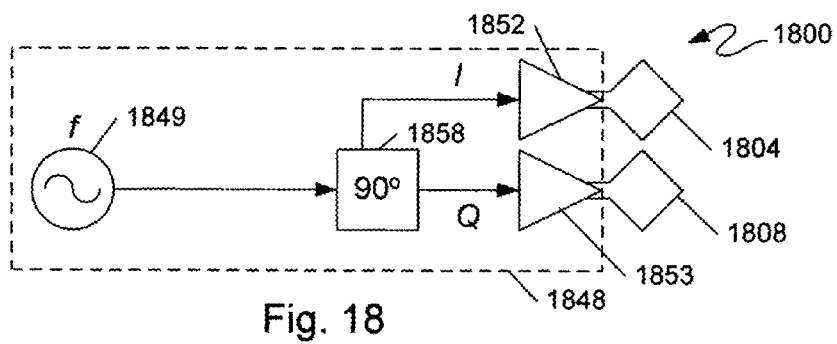
Fig. 18
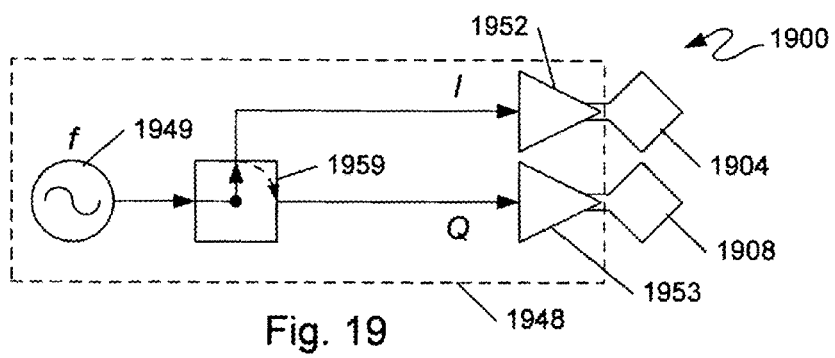
Fig. 19

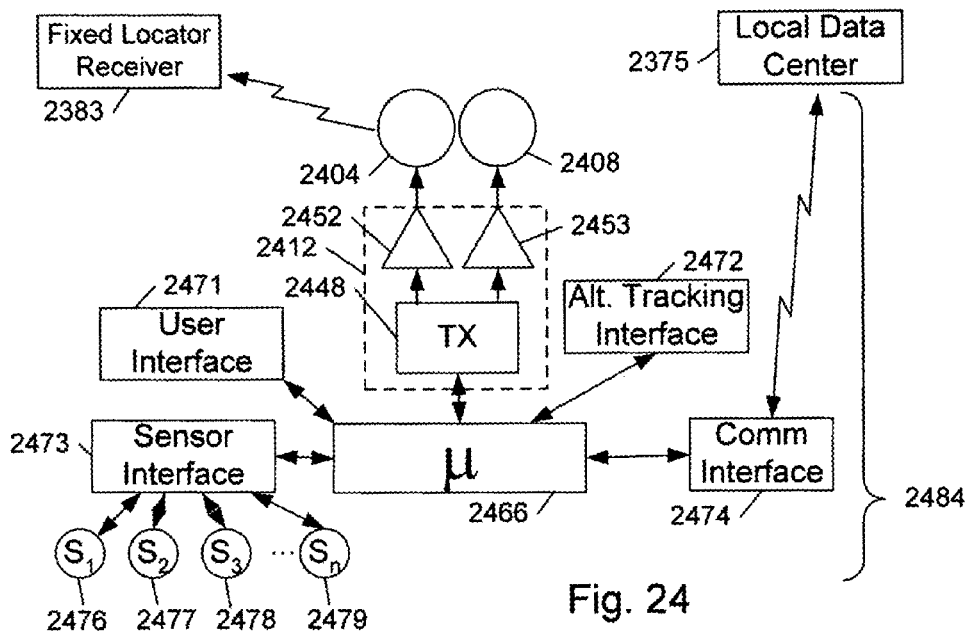
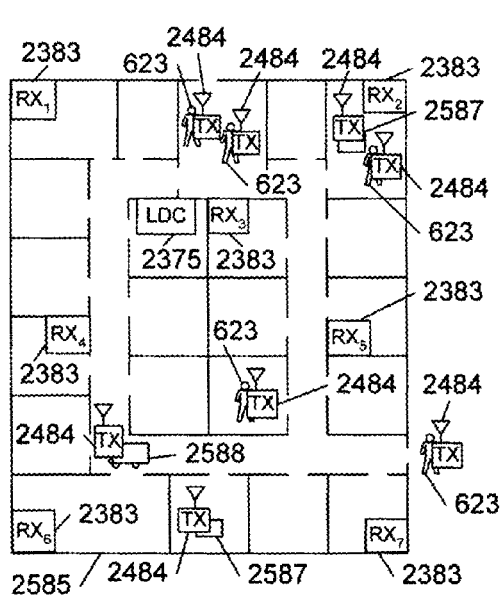
Fig. 25
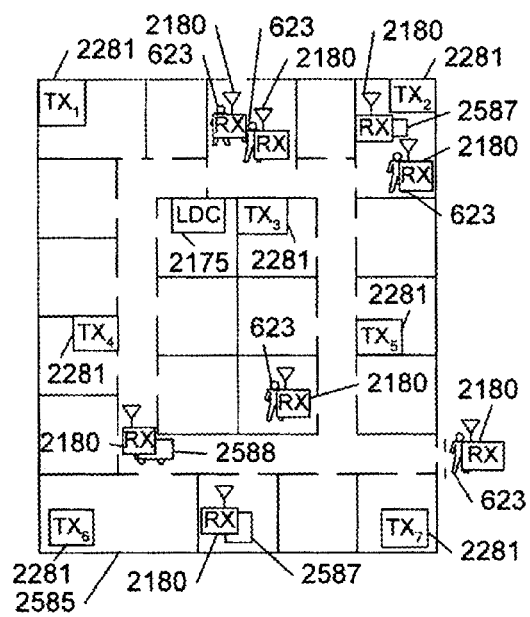
Fig. 26

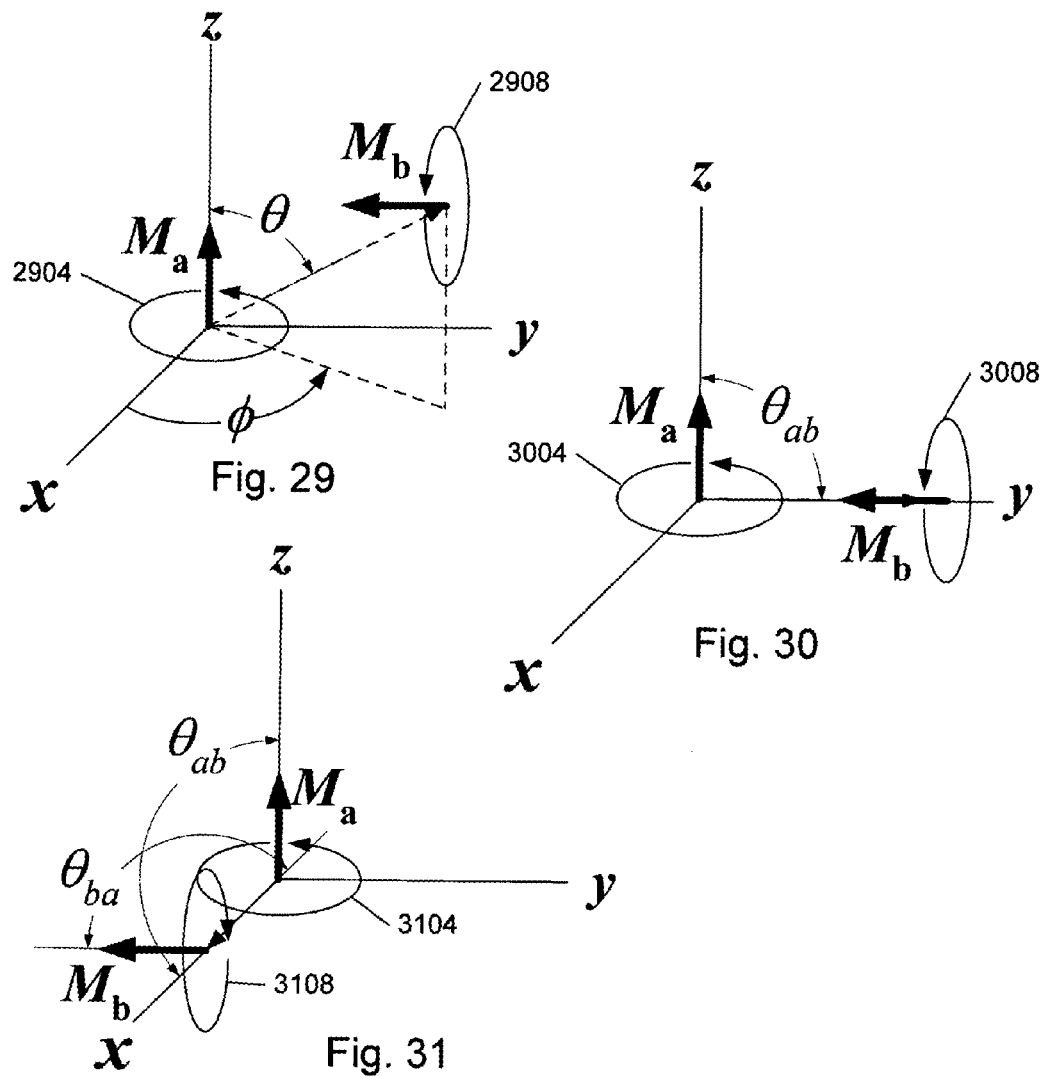

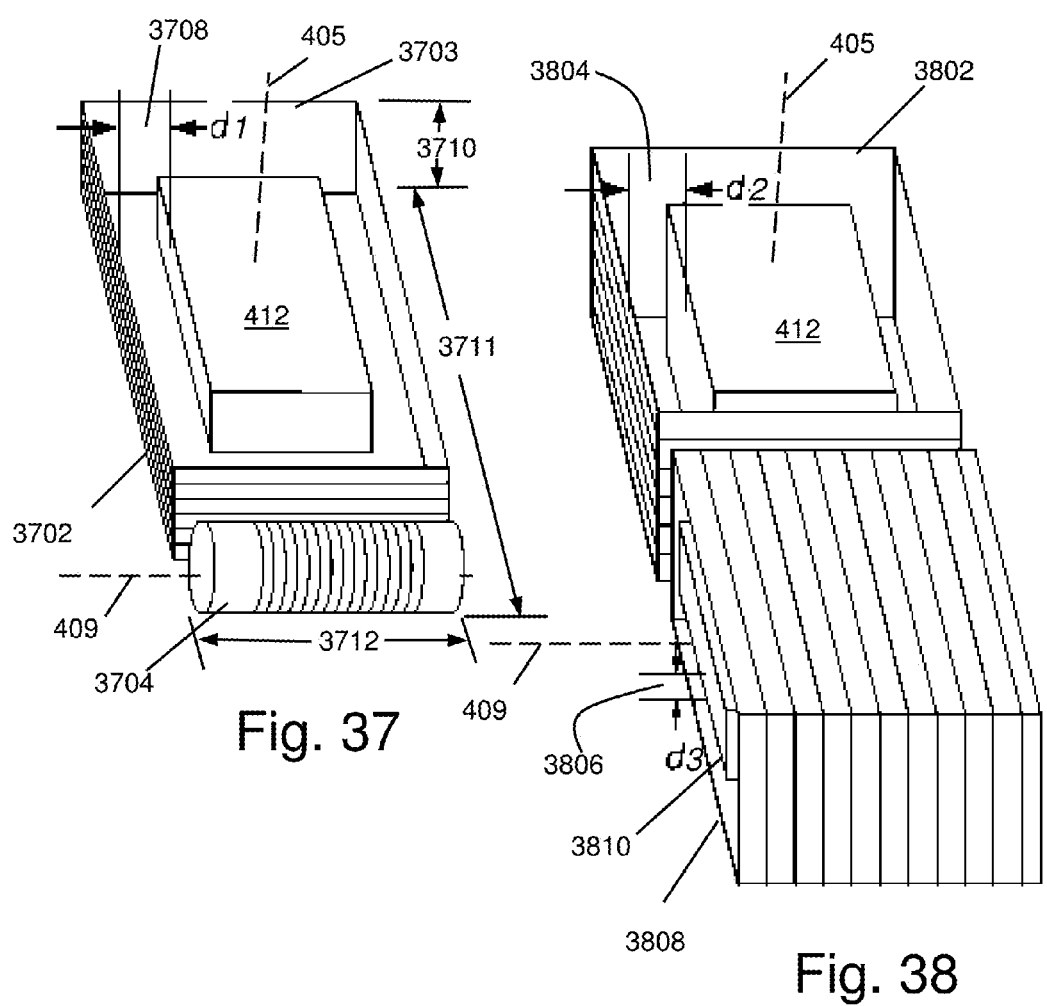

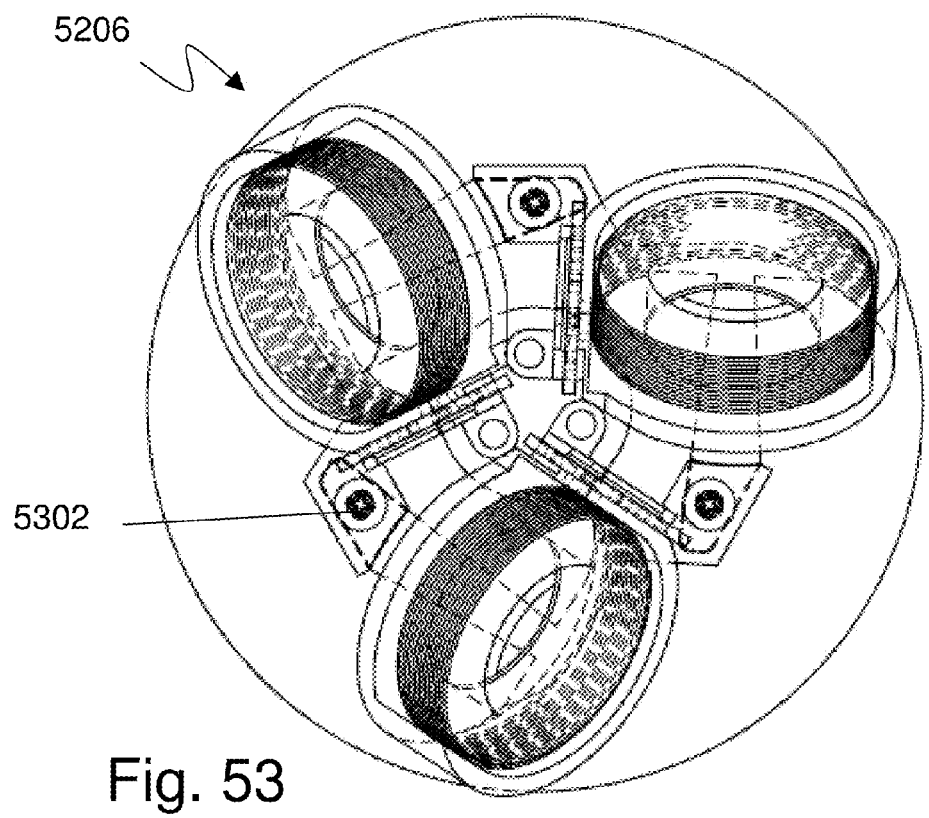
Fig. 53
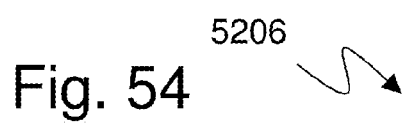
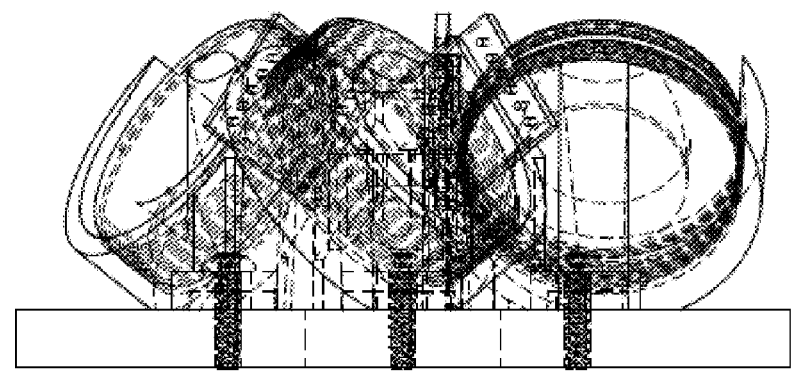

ID SYMMETRIC MULTIPLE AXIS
ANTENNA SYSTEM WITH ISOLATION
AMONG THE MULTIPLE AXES

The present application is a continuation in part of application Ser. No. 12/834,821 titled: "Space Efficient Magnetic Antenna Method" filed Jul. 12, 2010 by Schantz et al, and the present application claims the benefit under 35 USC 119(e) of provisional application 61/838,422 titled: "Minimum coupling and symmetric antenna array" filed Jun. 24, 2013 by Schantz; Ser. No. 12/834,821 is a continuation in part of U.S. patent application Ser. No. 11/473,595 Titled: "Space Efficient Magnetic Antenna System", filed Jun. 23, 2006 by Schantz et al, now U.S. Pat. No. 7,755,552, which is a continuation-in-part of U.S. patent application Ser. No. 11/272,533 titled: "Near field location system and method," filed Nov. 10, 2005 by Schantz et al., now U.S. Pat. No. 7,307,595, which claims the benefit under 35 USC 119(e) of provisional application Ser. No. 60/637,779, titled: "Near field amplitude positioning system and method," filed Dec. 21, 2004 by Schantz et al., all of which are incorporated herein by reference in their entirety.

GOVERNMENT RIGHTS

This invention was made with Government support under Grant OII-0539073 and Grant 1217524, both awarded by the National Science Foundation.

This invention was also made with Government support under Grant 2R44OH008952-02 awarded by the NIOSH. Finally, this invention was further made with Government support under Contract W900KK-13-C-0032 awarded by U.S. ARMY PEO STRI on behalf of the Test Resource Management Center, Test and Evaluation/Science and Technology Program. The Government has certain rights in the invention.

BACKGROUND

Field of the Invention

The disclosures herein relate generally to antenna arrays, and more specifically, to electrically small antenna arrays.

Background of the Invention

When operated at "low" frequencies, traditional quarter-wavelength antennas become prohibitively large for certain applications. For example, a quarter-wavelength monopole operating at 10 MHz has a physical size of 7.5 m. This may be acceptable for an outdoor antenna (for instance), but would be impractical for a compact hand-held device. Thus, an antenna designer must employ electrically-small antenna (ESA) techniques in order to transmit and receive signals effectively using an antenna considerably smaller than this natural quarter-wavelength scale.

In short, there exists a significant need for advances in electrically small antennas, particularly arrays of electrically small antennas.

Magnetic antennas, particularly loopstick antennas, are often used for reception of low frequency signals. FIG. 1 is a circuit diagram showing a prior art loopstick antenna 104. Prior art loopstick antenna 104 comprises primary coil 131, ferrite rod 135, secondary coil 133 and tuning means 132. In alternate embodiments, ferrite rod 135 may be iron, some other ferromagnetic material, or even a non-ferromagnetic material to support primary coil 131. Ferrite rod 135 may also be a bar, cylinder, prism, or other geometric form suitable for supporting primary coil 131. In alternate embodiments ferrite rod may be dispensed with altogether if primary coil 131 is sufficiently stiff to maintain a suitable mechanical shape. Secondary coil 133 provides coupling into primary coil 131 and means by which prior art loopstick antenna 104 may further couple to an RF device.

FIG. 2 is a schematic diagram illustrating a prior art loopstick antenna 104. Primary coil 131 generally comprises turns with normals co-located with loopstick axis 205. Loopstick axis 205 is not only an axis of ferrite rod 135, but also a null axis for prior art loopstick antenna 104. Pattern of prior art loopstick antenna 104 lies generally along pattern axis 207. Pattern axis 207 is substantially orthogonal to loopstick axis 205.

Existing antenna arrangements are large and bulky or small and inefficient. Other existing antenna arrangements are prone to undesirable coupling to a mobile asset or person carrying an associated wireless device.

BRIEF SUMMARY OF THE INVENTION

The present disclosure pertains to a rotationally triply symmetric three axis magnetic antenna system having substantial isolation among the three axes, including a three axis skew orthogonal magnetic antenna system and device utilizing the antenna system. The antenna system comprising three substantially identical magnetic antenna elements disposed symmetrically about a reference point such that the magnetic axes from the three antenna elements are orthogonal to one another in direction and do not intersect one another. The three antenna elements are positioned in a substantial cross coupling null from one another to minimize cross coupling. The arrangement yields packaging efficiency for compact electronic devices. A 1, 1, diameter embodiment is disclosed. A location system utilizing the antenna system is disclosed. Methods for producing the antenna are disclosed. A moldable triple coil holder for the antenna system is described.

Further, the present disclosure pertains to a system and method for assembling multiple antenna elements in a minimum coupling orientation. A minimum coupling and symmetric antenna array comprises a plurality of coil elements. Each of the plurality of coil elements lies along a respective azimuthal axis a common distance from a central point. Each of the plurality of coil elements is also rotated about each of the respective azimuthal axes by a common angle with respect to vertical. The common angle aligns the magnetic vector of each of said coil element so as to be orthogonal to a magnetic field of any other of said coil elements. In one variation, the minimum coupling array includes three elements and the common angle is approximately 41 degrees. In alternate variations, the minimum coupling array includes two elements and the common angle is approximately 45 degrees.

This disclosure also teaches a method for creating a minimum coupling and symmetric array comprising the steps of 1) aligning a plurality of coil elements so that a magnetic moment vector of each of said coil elements are co-linear with a vertical axis, 2) uniformly distributing said plurality of coil elements in an azimuthal plane orthogonal to said magnetic moment vectors, each of said coil elements at a common distance from a central point within said azimuthal plane, each of said coil elements distributed tangent to a circle in said azimuthal plane, and each of said coil elements lying along an azimuthal axis intersecting said central point and said coil element, and 3) rotating each of said plurality of coil elements about said azimuthal axis so that each of said magnetic moment vectors lie at a common angle with respect to said vertical axis.

An associated method includes a minimum coupling search method, which may be a physical search or simulation search, including:

A method for finding a skew orthogonal minimum coupling configuration including steps:

1. Establish coils displaced a prescribed distance from a construction origin, each on a respective orthogonal axis, for example Cartesian x, y, z axis system, same distance for each coil. Orient each coil with coil magnetic axis parallel to next sequential axis (x-y-z sequence, right hand), e.g., the coil displaced along the x axis is oriented with magnetic axis parallel to the y axis.

2. Adjust coils along each respective coil magnetic axis until a predetermined amount of coupling attenuation is achieved.

Note: alternatively, an opposite hand system may be used: y-x-z sequence.

3. Further optional step: refine the minimum, keep adjusting in the same direction as long as attenuation continues to increase. Stop adjusting when an attenuation decrease is noted. Back up adjustment one step to maximum attenuation, i.e., minimum coupling. The steps achieve the finding of a local minimum coupling configuration with an increase of coupling as the distance is varied on both sides of the local minimum position. In one variation, the adjusting may be in steps, for example each step may be one tenth of the diameter of a coil or less. The local minimum coupling may be found as a minimum coupling with increased coupling on each side.

A further variation includes: a 1,1 Diameter Construction, i.e., one embodiment may be produced by associating three coils with three respective axes of a coordinate system, the three axes having a sequence; placing each of the three coils with respect to each of the three axes. Each respective coil is displaced one coil diameter with respect to the respective associated coil axis and then further displaced one diameter with respect to the next axis in sequence. Each respective coil is oriented with the magnetic axis parallel to the respective next axis in sequence. The axis sequence may be left hand or may be right hand.

A further variation includes: A skew orthogonal three axis antenna system comprising:

a first magnetic antenna having a coil diameter equal to D and a first magnetic axis, said first magnetic antenna placed at a x=D, y=D, z=0 position in a three axis, x axis, y axis, and z axis coordinate system, said first magnetic antenna oriented with said first magnetic axis parallel to the y axis;

a second magnetic antenna having said coil diameter and a second magnetic axis, said second magnetic antenna placed at a x=0, y=D, z=D position and oriented with the second magnetic axis parallel to the z axis;

a third magnetic antenna having said coil diameter and a third magnetic axis, said third magnetic antenna placed at x=D, y=0, z=D position and oriented with the third magnetic axis parallel to the x axis;

wherein a tolerance on each placement D is plus or minus 15% of the diameter D and a tolerance on each axis direction is plus or minus ten degrees.

A further variation includes a planar construction minimum coupling array.

A minimum coupling and symmetric antenna array comprises a plurality of coil elements. Each of the plurality of coil elements lies along a respective azimuthal axis a common distance from a central point. Each of the plurality of coil elements is also rotated about each of the respective azimuthal axes by a common angle with respect to vertical. The common angle aligns the magnetic vector of each of said coil element so as to be orthogonal to a magnetic field of any other of said coil elements. In a preferred embodiment, the minimum coupling array includes three elements and the common angle is approximately 41 degrees. In alternate embodiments, the minimum coupling array includes two elements and the common angle is approximately 45 degrees.

The planar construction may yield a symmetric array that achieves minimal coupling, but may be near orthogonal, i.e., approximately orthogonal, but not exactly orthogonal—sufficiently orthogonal for some applications, but not others.

The three axis antenna system provides for numerous benefits and advantages including:

The arrangement achieves compact package allowing for a small envelope for hand held devices and small RFID tags, location tags and other devices.

In one embodiment, coils may be arranged so that one or two are aligned with x, y space, to be positioned or measured, i.e. x and y horizontal and z vertical.

In alternative embodiment, coils may be arranged diagonally to x, y space for compact packaging. Diagonal coils may be utilized by rotating vector coil a, b, c signals to x, y, z space. Rotation based on fixed package or sensed vertical vector.

The symmetric orthogonal coil antenna system can provide orientation independent signal reception or transmission by guaranteeing that at least one axis is oriented to receive a signal of any orientation, thus, the three axis antenna system can provide three axis omnidirectional coverage.

A coil magnetic axis is the coil axis of rotational symmetry of the field observed far enough away that coil shape features are not a significant factor. This typically corresponds to the far field antenna response null axis passing through the center of the coil. For example, the magnetic axis of a circular or rectangular coil passes through the center of the circle or rectangle perpendicular to a plane containing the circle or rectangle.

In various embodiments, the coil magnetic axis may be a preferred reference for orienting coils in an orthogonal relationship. Alternatively, for simple coils, orthogonality may be based on coil geometry. Much of this disclosure illustrates coils as a single turn or a simple cylinder for simplicity of illustration and explanation. Practical coils, however, may be wound as multi turn and/or multi layer with complex windings, for example basket windings. The coils, however typically exhibit a cylindrical winding envelope indicative of the magnetic axis, i.e. the winding envelope has a cylindrical axis of symmetry that is the same as the magnetic axis. Unusual cases, such as asymmetrical cores and diagonal windings can modify the magnetic axis. Magnetic axis, magnetic vector, and magnetic moment may be used interchangeably in this disclosure. If simple coils are used, the coil shape may be used to estimate the operational field axis, otherwise careful simulations or physical measurements may be desired to measure the coil magnetic axis.

BRIEF DESCRIPTION OF THE DRAWINGS

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

FIG. 14 is a process flow diagram of a positioning system employing a dual magnetic transmit antenna configuration in accordance with the present invention.

FIG. 15 is a process flow diagram of a dual receive antenna positioning process in accordance with the present invention.

FIG. 16 is a block diagram showing a preferred embodiment magnetic antenna transmission system for use in a positioning system FIG. 17A is a timing diagram showing a typical clock (C) signal in a preferred embodiment magnetic antenna transmission system.

FIG. 17B is a timing diagram showing a typical in-phase (I) signal in a preferred embodiment magnetic antenna transmission system.

FIG. 17C is a timing diagram showing a typical quadrature (Q) signal in a preferred embodiment magnetic antenna transmission system.

FIG. 18 is a block diagram showing a first alternate embodiment magnetic antenna transmission system for use in a positioning system.

FIG. 19 is a block diagram showing a second alternate embodiment magnetic antenna transmission system for use in a positioning system.

FIG. 24 is a block diagram laying out a mobile transmitter tag for use in a positioning system.

FIG. 25 illustrates an exemplary indoor deployment of a positioning system including fixed locator receivers and mobile transmitter tags.

FIG. 26 illustrates an exemplary indoor deployment of a positioning system including fixed beacon transmitters and mobile locator receiver tags.

FIG. 29 shows the geometry around two small orthogonal loops.

FIG. 30 shows the geometry around two small orthogonal loops in a first minimal coupling arrangement.

FIG. 31 shows the geometry around two small orthogonal loops in a second minimal coupling arrangement.

FIG. 37 shows an exemplary space efficient antenna embodiment having a first magnetic antenna wound outside of and surrounding an electronics module.

FIG. 38 shows a system having two orthogonal magnetic antennas.

FIG. 52, FIG. 53 and FIG. 54 illustrate an exemplary three axis antenna system including antenna element holder system holder for a skew orthogonal tri-symmetric antenna system.

DETAILED DESCRIPTION OF THE PREFERRED EMBODIMENTS

Overview of the Invention
Orthogonal and Magnetic Antenna Basics

Applicants discovered that orthogonal magnetic antennas offer unique advantages for transmission and reception in near-field wireless systems and elsewhere. Details may be found in "Near-field location system and method," (Ser. No. 11/272,533, filed Nov. 10, 2005, now U.S. Pat. No. 7,307,595, issued Dec. 11, 2007). Additional compact antenna designs are shown in applicant's "Space efficient magnetic antenna system," (Ser. No. 11/473,595, filed Jun. 22, 2006, now U.S. Pat. No. 7,755,552 issued Jul. 13, 2010). Other antenna concepts of value in an wireless systems and elsewhere are disclosed in Applicant's co-pending "Planar loop antenna system," (Ser. No. 12/857,528, Aug. 16, 2010 now U.S. Pat. No. 8,436,780 issued May 7, 2013), and "Space efficient magnetic antenna method," (Ser. No. 12/834,821, filed Jul. 12, 2010, now U.S. Patent Publication U.S. 2010/0277387 published Nov. 4, 2010). Applicant's "Directive electrically small antenna system and method," (application Ser. No. 13/436,956 filed Apr. 1, 2012, now U.S. Patent Publication U.S. 2013/0027249 published Jan. 31, 2013) presents further antennas of use in conjunction with near-field wireless or other applications. The above referenced patent documents are hereby incorporated herein by reference in their entirety.

Near Field Propagation

Figure 3A:
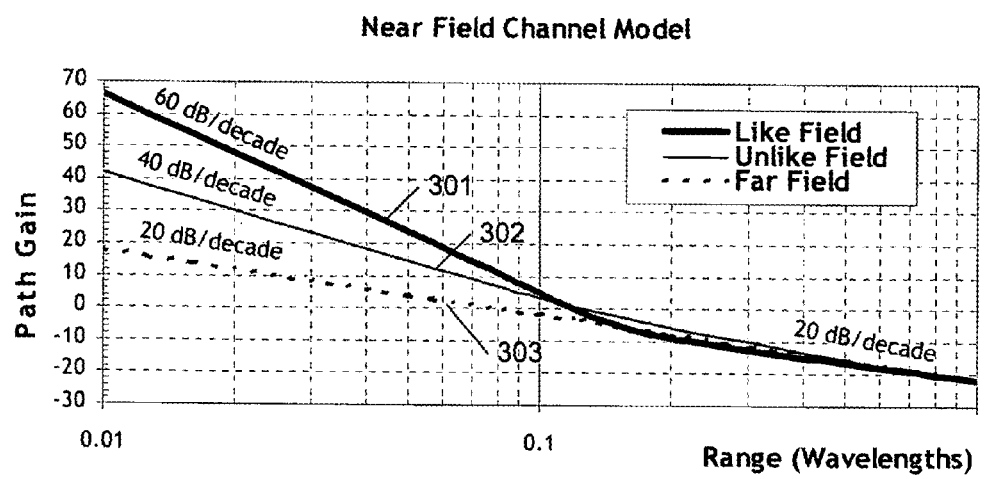
FIG. 3A is plot of path gain versus range in free space for electric and magnetic signals from a small electric transmit antenna as electric and magnetic signals transition from the near field to the far field.

A near field location system may rely on certain properties of near field electromagnetic signals. FIG. 3A is plot of path gain versus range in free space for electric and magnetic signals from a small electric transmit antenna as electric and magnetic signals transition from the near field to the far field. At a range, approximately equal to about one sixth of a wavelength ($\lambda/2\pi$), electromagnetic signals from electrically small antennas in free space transition between near field to far field behavior. In the near field zone, within $\lambda/2\pi$, "like" signals decrease in amplitude 60 dB for every decade (factor of ten) increase in range, as shown in trace 301. "Like" signals are signals received by an antenna of the same type of design e.g. electric fields received by electric field antenna such as a dipole or whip antenna or magnetic fields received by a magnetic antenna such as a loop or loopstick antenna. Also, in the near field zone, "unlike" signals (electric signals from magnetic antennas or magnetic signals from electric antennas) decrease in amplitude 40 dB for every decade increase in range, as shown in trace 302. In the transition region around $\lambda/2\pi$, both like and unlike signals transition to far field behavior in which signals decrease in amplitude 20 dB for every decade increase in range, as shown in trace 303. This transition is essentially complete once signals propagate one wavelength ($1\lambda$). Thus, it is advantageous for a signal strength positioning system to operate at ranges on the order of $1\lambda$ or less. Conversely, it is advantageous for a signal strength positioning system to operate at a frequency chosen so that a corresponding wavelength is longer than a typical range for a relevant propagation environment.

In a typical office or industrial environment, signals are bound by conducting planes in the floor and ceiling like reinforcement rod structures, metallic pans or metallic sheathing. In this "parallel plate" environment, vertically polarized signals tend to propagate better than horizontally polarized signals. In alternate embodiments, one may take advantage of the ability of the propagation environment to shift some energy from one polarization to the other. For instance, a horizontally polarized transmit signal may couple to a propagation environment resulting in adequate vertical polarized energy to be detected by a vertically polarized receive system.

Figure 3B:
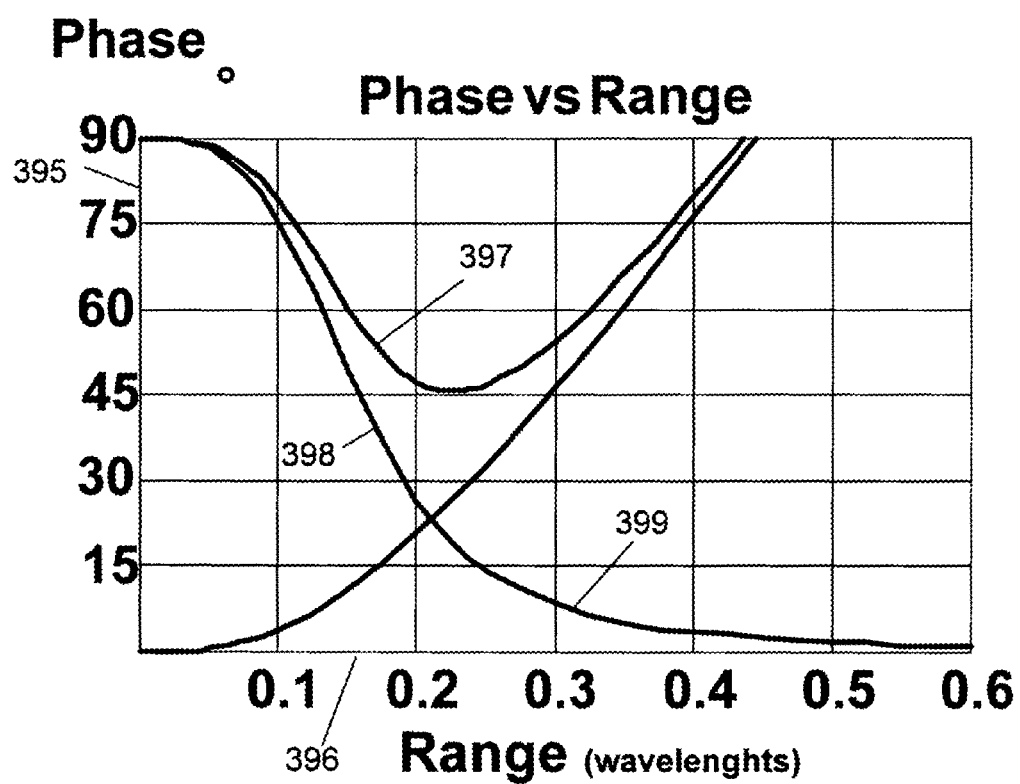
FIG. 3B is a graphic representation of electric and magnetic field phase relationships as a function of range for an ideal electrically small loop in free space.

FIG. 3B is a graphic representation of electric and magnetic field phase relationships as a function of range for an ideal electrically small loop in free space. FIG. 3B includes a magnetic or H-Field phase curve 397, an electric or E-Field phase curve 398 and a phase difference or $\Delta\varphi$ curve 399 representing the difference between curves 397, 398. Curves 397, 398, 399 are plotted against a first axis 395 representing phase (preferably in degrees) as a function of range represented on a second axis 396 in wavelength (preferably in a kilogram-meter-second unit, such as meters) of an electromagnetic signal under consideration. H-field phase curve 397 begins 90° out of phase with respect to E-field phase 398. As range is increased from about 0.05λ to about 0.50λ, H-field phase curve 397 initially decreases, and then increases. Similarly, as range is increased from about 0.05λ to about 0.50λ, E-field phase curve 398 increases, gradually at first, and at an increasing rate as range increases. The difference between E-field phase curve 398 and H-field phase curve 397 is represented by $\Delta\varphi$ curve 399. $\Delta\varphi$ curve 399 begins at approximately 90° (i.e., at phase quadrature) in the near-field within a range of about 0.05λ and goes to 0° (i.e., phase synchronicity) as the far-field is approached, past a range of about 0.50λ. Transition of Δφ curve 399 from phase quadrature to phase synchronicity between about 0.05λ, to about 0.50λ is substantially continuous and predictable and is used to advantage by the present invention. With more precise measurement, this phase transition can be beneficially used at ranges inside 0.05λ and outside 0.50λ to 1.0λ or more. Further details regarding the use of phase in near field location systems may be found in U.S. patent application Ser. No. 10/355,612, titled "System and Method for Near-Field Electromagnetic Ranging," filed Jan. 31, 2003, by Schantz et al., now U.S. Pat. No. 6,963,301, issued Nov. 8, 2005, which has been incorporated herein by reference. Thus, in accordance with the present invention near field signal propagation properties as evidenced by, for example, amplitude or phase or relative amplitude or relative phase or other characteristics, may be used to determine a location. Near field properties may be used in combination with far field properties to extend the range of a location system.

Figure 4:
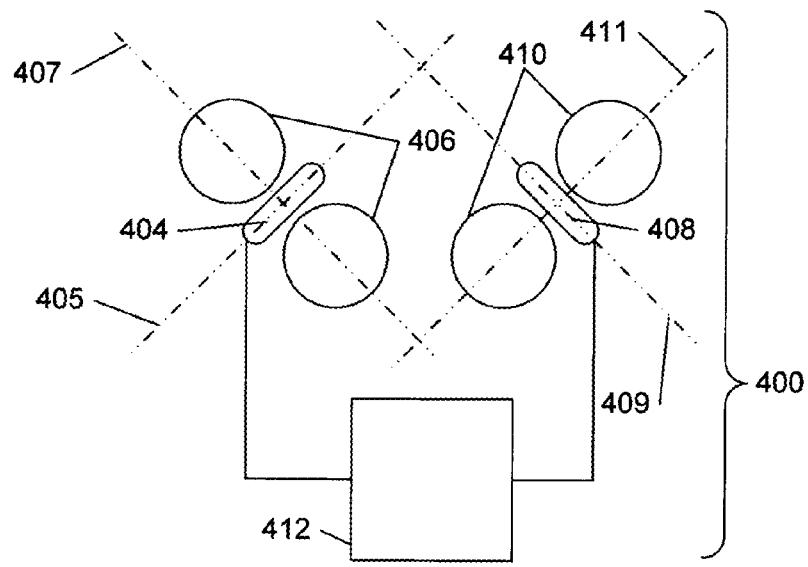
FIG. 4 is a schematic diagram describing orientation and antenna patterns of a radio frequency (RF) tracking device.

FIG. 4 is a schematic diagram describing orientation and antenna patterns of a radio frequency (RF) tracking device 400. RF tracking device 400 comprises first magnetic antenna 404, second magnetic antenna 408, and RF module 412. RF module 412 may be a transmitter, a receiver, or a transceiver. RF module 412 may further include additional modules useful for RF tracking device 400. First magnetic antenna 404 has a first pattern 406 generally aligned along first pattern axis 407 and with a null generally aligned along first null axis 405. Second magnetic antenna 408 has a second pattern 410 generally aligned along second pattern axis 411 and with a null generally aligned along second null axis 409. First pattern axis 407 is substantially orthogonal to second pattern axis 411. Similarly, first null axis 405 is substantially orthogonal to second null axis 409. First pattern axis 407, second pattern axis 411, first null axis 405 and second null axis 409 lie substantially within and define an azimuthal or horizontal plane. First pattern 406 and second pattern 410 are both substantially vertically polarized patterns in the vicinity of the azimuthal plane. Thus, first pattern 406 and second pattern 410 jointly provide full vertical polarization coverage of the azimuthal plane. In a preferred embodiment, first magnetic antenna 404 and second magnetic antenna 408 are loopstick antennas. In alternate embodiments, first magnetic antenna 404 and magnetic antenna 208 may be loop antennas or other magnetic antennas. First magnetic antenna 404 and second magnetic antenna 408 are arranged "orthogonally" in that their corresponding null axes (first null axis 405 and second null axis 409) are substantially orthogonal to each other.

Figure 5:
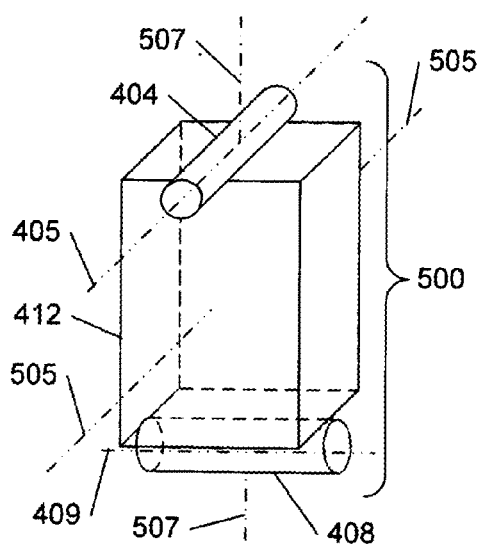
FIG. 5 is a schematic diagram describing a first embodiment of an RF tracking device.

FIG. 5 is a schematic diagram describing a first embodiment of an RF tracking device 500, utilizing parallel and perpendicular magnetic antennas. FIG. 5 illustrates one configuration of the elements of FIG. 4. The RF module 412 is shown generally as a rectangle having characteristic physical dimensions, length, width, and height and associated axes. Although a rectangle is shown, any shape, as may be desired for commercial appearance or as needed for other reasons, may be used. First embodiment of RF tracking device 500 comprises first magnetic antenna 404, second magnetic antenna 408, and RF module 412. First magnetic antenna 404 is generally aligned with a null along first null axis 405 and second magnetic antenna 408 is generally aligned along second null axis 409. First null axis 405 and second null axis 409 are substantially orthogonal to each other. First null axis 405 is also substantially co-parallel with normal 505 to RF module 412. First null axis 405 and second null axis 409 lie substantially within an azimuthal plane whose normal is vertical axis 507. Thus, first magnetic antenna 404 and second magnetic antenna 408 can cooperate to yield substantially vertically polarized patterns in the vicinity of the azimuthal plane as will be further disclosed in this document. Throughout, it should be understood that terms like vertical are meant for purposes of description and not limitation, and the overall configuration described for RF tracking device 500 may be used in a wide variety of orientations.

Figure 6:
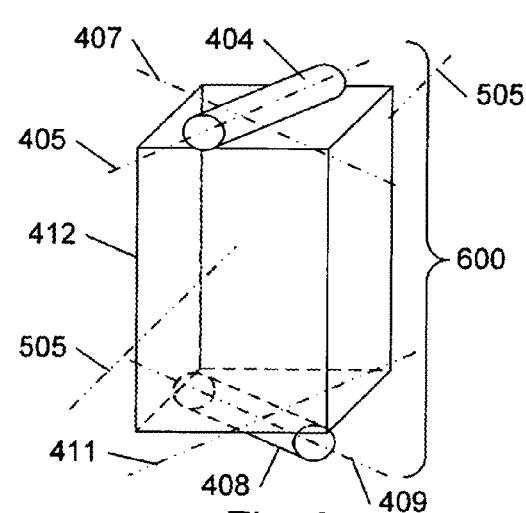
FIG. 6 is a schematic diagram showing second embodiment of an RF tracking device

FIG. 6 is a schematic diagram showing second embodiment of an RF tracking device 600 utilizing diagonally oriented magnetic antennas. FIG. 6 illustrates an alternate configuration of the elements of FIG. 4. Second embodiment of a RF tracking device 600 comprises first magnetic antenna 404, second magnetic antenna 408, and RF module 412. First magnetic antenna 404 is generally aligned with a null along first null axis 405 and second magnetic antenna 408 is generally aligned along second null axis 409. First null axis 405 and second null axis 409 are substantially orthogonal to each other. First null axis 405 is also oriented at a diagonal angle of approximately 45 degrees with respect to normal 505 of RF module 412. Such an orientation yields a compact form factor for RF tracking device 600. The 45 degree angle shown is exemplary. Other angles may be used, and the particular angle chosen may depend on the actual shape of the RF module 412 among other factors. Here again, first magnetic antenna 404 and second magnetic antenna 408 can cooperate to yield substantially vertically polarized patterns in the vicinity of the azimuthal plane.

Figure 7A:
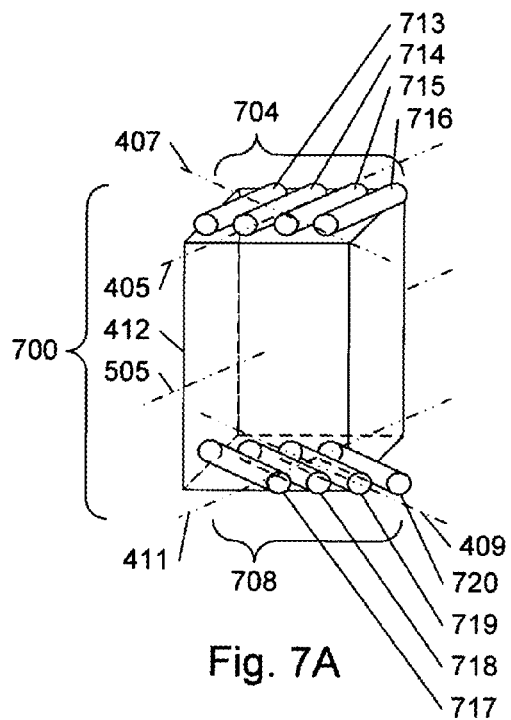
FIG. 7A is a schematic diagram describing a preferred embodiment RF tracking device

FIG. 7A is a schematic diagram describing a preferred embodiment RF tracking device 700 utilizing multiple diagonal magnetic antenna elements. The use of diagonal antennas reduces package size; the use of multiple diagonal antenna elements further improves package size and form factor by reducing the maximum dimensions of the package and eliminating protrusions. In alternate embodiment, multiple antenna elements may be used in the non-diagonal arrangement of FIG. 5. Referring to FIG. 7A, preferred embodiment RF tracking device 700 comprises first magnetic antenna system 704, second magnetic antenna system 708, and RF module 412. The system of FIG. 7A corresponds to the system of FIG. 4, with alternate antenna system 704 corresponding to antenna 404 of FIG. 4 and antenna system 708 corresponding to antenna 408 of FIG. 4. First magnetic antenna system 704 is generally aligned with a null along first null axis 405 and second magnetic antenna system 708 is generally aligned along second null axis 409. First null axis 405 and second null axis 409 are substantially orthogonal to each other. First null axis 405 is also oriented at approximately 45 degrees with respect to normal 505 of RF module 412.

First magnetic antenna system 704 further comprises first magnetic antenna component 713, second magnetic antenna component 714, third magnetic antenna component 715, and fourth magnetic antenna component 716 (collectively, "first set of magnetic antenna components"). A first set of magnetic antenna components are all generally aligned so as to have nulls generally along first null axis 405 and constructive addition of patterns generally along first pattern axis 407. First magnetic antenna system 704 is depicted as having four components for purpose of illustration and not limitation. In alternate embodiments, first magnetic antenna system 704 may further comprise more than four components or less than four components.

Second magnetic antenna system 708 further comprises fifth magnetic antenna component 717, sixth magnetic antenna component 718, seventh magnetic antenna component 719, and eighth magnetic antenna component 720 (collectively, "second set of magnetic antenna components"). A second set of magnetic antenna components are all generally aligned so as to have nulls generally along second null axis 409 and constructive addition of patterns generally along second pattern axis 411. Second magnetic antenna system 708 is depicted as having four components for purpose of illustration and not limitation. In alternate embodiments, second magnetic antenna system 708 may further comprise more than four components or less than four components. First magnetic antenna system 704 and second magnetic antenna system 708 yield a compact form factor for RF tracking device 700.

Figure 7B:
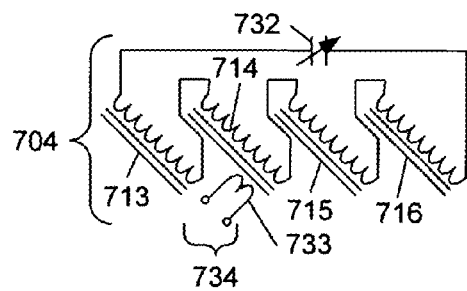
FIG. 7B is a circuit diagram describing a first potential circuit implementation of magnetic antennas for a preferred embodiment RF tracking device.

FIG. 7B is a circuit diagram describing a first potential circuit implementation of magnetic antennas for a preferred embodiment RF tracking device 700. First magnetic antenna system 704 further comprises first magnetic antenna component 713, second magnetic antenna component 714, third magnetic antenna component 715, fourth magnetic antenna component 716, secondary coupling coil 733, and tuning means 732. Tuning means 732 may be a variable capacitor, a varactor, a switched capacitance bank or any other means by which first magnetic antenna system 704 may be tuned. Secondary coupling coil 733 cooperates with one of the magnetic antenna components, such as magnetic antenna component 714, to couple signals between first magnetic antenna system 704 and RF module 412. Coupling coil terminals 734 provide means by which signals may be coupled intermediate RF module 412 and secondary coupling coil 733.

First magnetic antenna component 713, second magnetic antenna component 714, third magnetic antenna component 715, and fourth magnetic antenna component 716 are all generally aligned so as to have constructive addition of patterns generally along first pattern axis 407. If a magnetic antenna component were reversed relative to other magnetic antenna components, it is possible to achieve an undesired destructive combination of patterns. From an electrical point of view, first magnetic antenna system 704 may be thought of as a series combination of first magnetic antenna component 713, second magnetic antenna component 714, third magnetic antenna component 715, and fourth magnetic antenna component 716. In alternate embodiments, parallel or other more complicated combinations are possible.

Figure 7C:
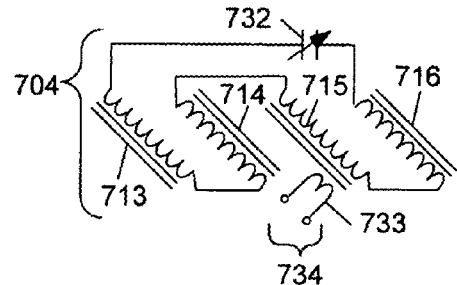
FIG. 7C is a circuit diagram describing a second potential circuit implementation of magnetic antennas for a preferred embodiment RF tracking device.

FIG. 7C is a circuit diagram describing a second potential circuit implementation of magnetic antennas for a preferred embodiment RF tracking device 700. In this second potential circuit implementation, first magnetic antenna system 704 also further comprises first magnetic antenna component 713, second magnetic antenna component 714, third magnetic antenna component 715, and fourth magnetic antenna component 716, secondary coupling coil 733, and tuning means 732.

In FIG. 7C, the orientation of second magnetic antenna component 714 and fourth magnetic antenna component 716 have been reversed with respect to the orientation of first magnetic antenna component 713 and third magnetic antenna component 715. However, using an alternate circuit arrangement depicted in FIG. 7C recovers a desired constructive superposition of patterns.

Figure 8:
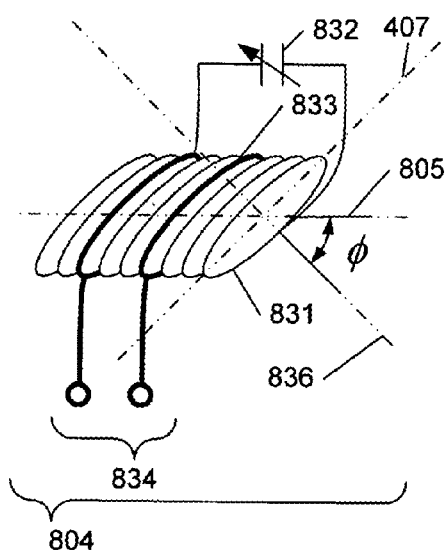
FIG. 8 is a schematic diagram presenting a slanted loopstick antenna.

FIG. 8 is a schematic diagram presenting a slanted loopstick antenna 804. Slanted loopstick antenna 804 comprises slanted primary coil 831, secondary coupling coil 833 and tuning means 832. Slanted primary coil 831 is generally aligned with loopstick axis 805. Loopstick axis 805 is the rotational axis of a coil form, which may be used to form the slanted primary coil 831. (The coil form itself is optional or may be removed after forming the coil.) Slanted primary coil 831 comprises turns substantially centered with loopstick axis 805 yet oriented so that turn normal 836 is aligned at an angle φ with respect to loopstick axis 805. "Turn normal 836" refers to an axis normal to a plane substantially containing the turn. Orienting turn normal 836 at an angle φ with respect to loopstick axis 805 shifts null axis 409 so as to orient the null axis 409 parallel to turn normal 836 at an angle φ with respect to loopstick axis 805. Similarly, pattern axis 407 remains orthogonal to null axis 409. Thus, slanted loopstick 804 has pattern axis 407 no longer substantially orthogonal to loopstick axis 805.

In alternate embodiments, slanted loopstick antenna may further comprise a ferrite rod (not shown), however a ferrite rod collinear with the loopstick axis 805 may tend to create a potentially undesired shift of pattern axis 407 toward loopstick axis 805. A ferrite rod will have the potentially advantageous effect of increasing inductance and decreasing vulnerability to undesired coupling, such as to nearby objects.

Figure 9:
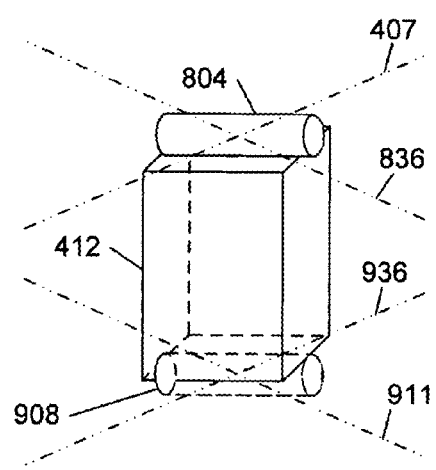
FIG. 9 is a schematic diagram describing a slanted loopstick RF tracking device

FIG. 9 is a schematic diagram describing a slanted loopstick RF tracking device 900. Slanted loopstick RF tracking device 900 comprises first slanted loopstick 804, second slanted loopstick 908, and RF module 412. First slanted loopstick 804 is constructed so as to align first pattern axis 407 at an angle 90°−φ degrees with respect to normal 905 to RF module 412. The angle φ may be, for example, 45 degrees. First pattern axis 407 and first pattern null 836 lie substantially within a first azimuthal plane. Second slanted loopstick 908 is constructed so as to align second pattern axis 911 at an angle φ degrees with respect to normal 905. Second pattern axis 911 and second pattern null 936 lie substantially within a second azimuthal plane parallel to the first azimuthal plane. Because the two azimuthal planes and respective loopstick antennas 804,908 are separated by a small distance relative to the typical ranging distance for the device 900 in use, the two antennas 804, 908 respond essentially as coplanar antennas. Thus, first slanted loopstick 804 and second slanted loopstick 908 have generally orthogonal patterns that, in combination, can provide full vertical polarization coverage for objects near either of the azimuthal planes.

Figure 10A:
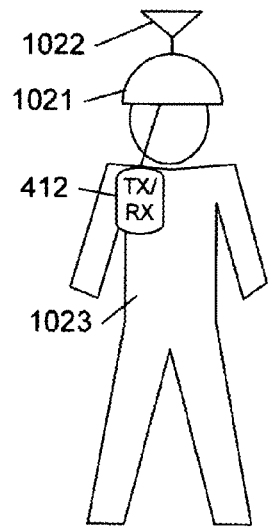
FIG. 10A is a schematic diagram depicting a first configuration of a body mounted electric field antenna.

FIG. 10A is a schematic diagram depicting a first configuration of a body mounted electric field antenna. Positioning system antennas may be subject to undesired coupling to nearby objects, resulting in undesired amplitude and/or phase signal measurements further resulting in position measurement errors. In body mounted systems for tracking people, body coupling can result in significant errors. Body coupling can be minimized by including antennas in accordance with the present invention.

A first configuration of a body mounted electric field antenna comprises monopole element 1022 driven against helmet counterpoise 1021. Alternatively, this arrangement may be thought of as a dipole comprising monopole element 1022 as one element and helmet counterpoise 1021 as another element. First configuration of a body mounted electric field antenna avoids undesired coupling to human body 1023 by placing monopole element 1022 and helmet counterpoise 1021 relatively far away from human body 1023. RF module 412 may be carried on human body 1023 wherever convenient.

Figure 10B:
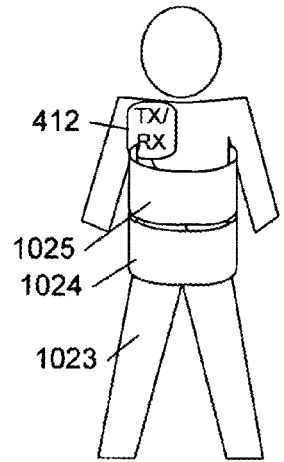
FIG. 10B is a schematic diagram depicting a second configuration of a body mounted electric field antenna.

FIG. 10B is a schematic diagram depicting a second configuration of a body mounted electric field antenna. The second configuration of a body mounted electric field antenna comprises a first dipole element 1024 driven against a second dipole element 1025. Second configuration of a body mounted electric field antenna avoids undesired coupling to the human body 1023 by enclosing the human body 1023 substantially within the first dipole element 1024 and the second dipole element 1025. RF module 412 may be carried on the human body 1023 wherever convenient. The first dipole element 1024 and the second dipole element 1025 may be embedded in clothing such as a shirt or coat. In alternate embodiments, the first dipole element 1024 may be embedded in pants and second dipole element 1025 may be embedded in a shirt or coat.

Figure 10C:
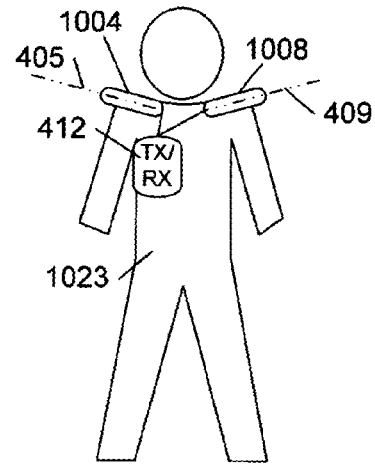
FIG. 10C is a schematic diagram showing a potential configuration of a body mounted magnetic field antenna system.

FIG. 10C is a schematic diagram showing a potential configuration of a body mounted magnetic field antenna system. A body mounted magnetic field antenna system comprises first magnetic antenna 1004 and second magnetic antenna 1008. First magnetic antenna 1004 is generally aligned with a null along first null axis 405 and second magnetic antenna 1008 is generally aligned along second null axis 409. First null axis 405 is substantially orthogonal to second null axis 409. First null axis 405 and second null axis 409 lie substantially within a common azimuthal plane. A body mounted magnetic field antenna system provides omni-directional vertical polarization coverage throughout an azimuthal plane. An advantage of a magnetic field antenna is that a magnetic field antenna is less likely to have undesired body coupling. A preferred location for body mounted magnetic field antennas is in proximity to a wearer's shoulders, away as much as practical from any ferromagnetic materials such as a steel tank, such as an air tank as typically worn by a fire fighter or hazardous materials worker.

A single magnetic field antenna positioned to accept vertically polarized signals will not be omni-directional in a horizontal plane. Omnidirectional coverage may be achieved by utilizing multiple vertically polarized magnetic antennas in accordance with the present invention. RF module 412 may be carried on human body 1023 wherever convenient.

Figure 11:
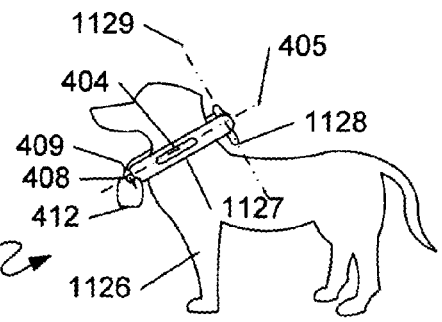
FIG. 11 is a schematic diagram describing a potential configuration of a canine magnetic field antenna system.

FIG. 11 is a schematic diagram describing a potential configuration of a canine magnetic field antenna system 1100. Canine magnetic field antenna system 1100 comprises a first magnetic antenna 404, and a second magnetic antenna 408 embedded in a collar 1127. In alternate embodiments, the collar 1127 may be a harness or other structure that fastens to a dog 1126 or other animal. The first magnetic antenna 404 is generally aligned with a null along the first null axis 405 and the second magnetic antenna 408 is generally aligned with the null along the second null axis 409. The first null axis 405 is substantially orthogonal to the second null axis 409. In still further embodiments, the canine magnetic field antenna system 1100 may be supplemented by a third magnetic antenna 1128 generally oriented so as to align a null with a third null axis 1129. The third null axis 1129 is generally aligned so as to be mutually orthogonal with both the first null axis 405 and the second null axis 409. In conjunction with RF module 412, canine magnetic field antenna system 1100 contributes to a system for tracking and monitoring the whereabouts of the dog 1126. Although in a preferred embodiment canine magnetic field antenna system 1100 is mounted on the dog 1126, in alternate embodiments the canine magnetic field antenna system may be employed with a cat, horse, cow, or other domestic or wild animal whose whereabouts are of interest. Canine magnetic field antenna system 1100 may be part of a system that monitors the location of an animal and emits noises or electric shocks as a deterrent if an animal attempts to leave a defined safe area or enter a defined prohibited area.

In one embodiment, a prohibited area may be defined using another mobile tracking unit. Thus prohibited areas may be dynamically changing. For example, a prohibited area for a first dog may be defined as being a predefined two meter radius from a person or a one meter radius from a second dog. In operation, the first dog could be prohibited from coming closer than the predefined radius from the person or second dog, even though the person or second dog may move around. The three antenna configuration of the canine magnetic field antenna system 1100 may be advantageously used in any context in which orientation of a tag may be arbitrary.

Figure 12:
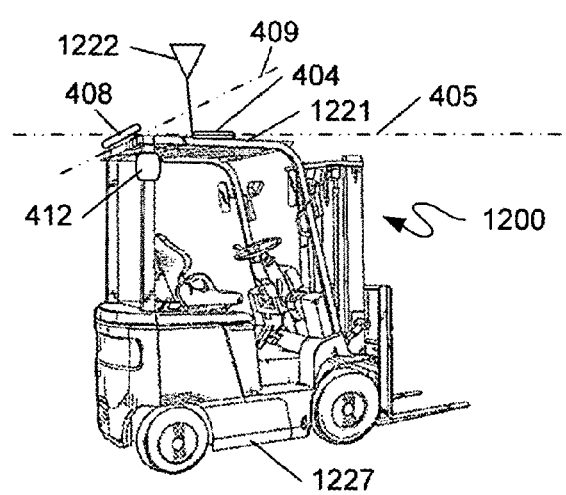
FIG. 12 illustrates one embodiment of a positioning system including a forklift.

FIG. 12 illustrates one embodiment of a positioning system including a forklift. Forklift positioning system 1200 may include one or more of a first magnetic antenna 404, a second magnetic 408, and/or an electric antenna 1222. First magnetic antenna 404 is generally aligned with a null along first null axis 405 and second magnetic antenna 408 is generally aligned along second null axis 409. First null axis 405 is substantially orthogonal to second null axis 409. Electric antenna 1222 may be a dipole, but is preferentially a monopole element driven against counterpoise 1221, which may be the top of the forklift 1227 as shown. RF module 412 may be mounted wherever convenient. In one embodiment, the forklift positioning system 1200 may comprise the first magnetic antenna 404 and the second magnetic antenna 408. In another embodiment, the forklift antenna system 1200 may comprise the electric antenna 1222. In still a further embodiment, the forklift antenna system 1200 may comprise the first magnetic antenna 404, the second magnetic antenna 408, and the electric antenna 1222.

Figure 13:
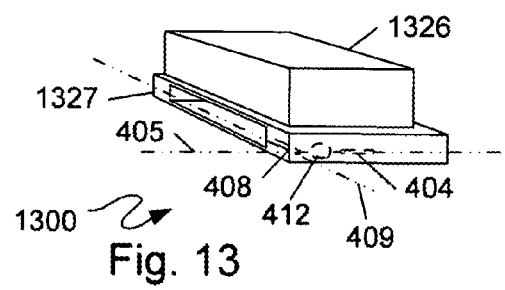
FIG. 13 is a schematic diagram depicting a potential configuration of a pallet magnetic field antenna system.

FIG. 13 is a schematic diagram depicting a potential configuration of a pallet magnetic field antenna system 1300. Pallet magnetic field antenna system 1300 comprises first magnetic antenna 404, and second magnetic antenna 408 embedded in pallet 1327. In alternate embodiments, pallet 1327 may be a box, bin, carton, or other container of assets, such as asset 1326, whose whereabouts are of interest. First magnetic antenna 404 is generally aligned with a null along first null axis 405 and second magnetic antenna 408 is generally aligned along second null axis 409. First null axis 405 is substantially orthogonal to second null axis 409.

FIG. 14 is a process flow diagram of a positioning system employing a dual magnetic transmit antenna configuration in accordance with the present invention. Magnetic antenna system transmission process 1400 begins at a START locus 1437.

The dual magnetic transmit antenna positioning process 1400 continues with the step of, in no particular order, (1) a first transmitter generating a first signal as indicated in block 1441 and a first magnetic antenna radiating the first signal as indicated in block 1439, and (2) a second transmitter generating a second signal as indicated in block 1442 and a second magnetic antenna radiating the second signal as indicated in block 1440.

In a preferred embodiment, the first magnetic antenna and the second magnetic are aligned so as to have substantially orthogonal patterns. Also in a preferred embodiment, the first signal (I) and a second signal (Q) are in quadrature (i.e. a ninety degree phase shift with respect to each other). In an alternative embodiment, the first signal and second signal are transmitted alternately, one at a time at a predetermined rate or according to a predetermined pattern. If the first signal and the second signal alternate on a time scale short with respect to the receiver response time scale (i.e. the receiver averages multiple transmissions), then magnetic antenna system transmission process 1400 can achieve an effective omnidirectional vertical polarization radiation pattern, i.e., the system response is substantially the same for any azimuth angle. Thus, the dual magnetic antenna configuration, when driven in accordance with the present invention, can result in the equivalent of a substantially omnidirectional response pattern.

The dual transmit antenna positioning process 1400 continues with the step of a receiver measuring at least one signal characteristic as denoted in block 1443. At least one signal characteristic may include an amplitude of a signal or a phase of a signal. In alternate embodiments, at least one signal characteristic may include an amplitude or a phase of an electric signal or a magnetic signal. An electric signal is a signal received by an electric antenna like a monopole, a dipole, or a whip, while a magnetic signal is a signal received by a magnetic antenna like a loop or a loopstick.

The dual transmit antenna positioning process 1400 continues with the step of a microprocessor determining transmitter position using at least one signal characteristic as indicated in block 1446. The dual transmit antenna positioning process 1400 terminates at an END locus 1447.

FIG. 15 is a process flow diagram of a dual receive antenna positioning process. The process 1500 begins at a START locus 1537, and continues with the step of a transmitter transmitting a transmitted signal as indicated in block 1538.

The process 1500 continues with the step of, in no particular order, (1) a first magnetic antenna receiving the transmitted signal to generate a first received signal, as indicated in block 1539, and (2) a second magnetic antenna receiving the transmitted signal to generate a second received signal, as indicated in block 1540. The process 1500 continues with the step of a receiver determining at least one signal characteristic from the first and second received signals, as shown in block 1543.

The dual receive antenna positioning process 1500 continues with the step of a microprocessor determining transmitter position using the signal characteristic. The signal characteristic may include an amplitude of a signal or a phase of a signal. In alternate embodiments, the signal characteristic may include an amplitude or a phase of an electric signal or a magnetic signal. An electric signal is a signal received by an electric antenna like a monopole, a dipole, or a whip, while a magnetic signal is a signal received by a magnetic antenna like a loop or a loopstick. The process 1500 terminates at an END locus 1547.

FIG. 16 is a block diagram showing a preferred embodiment magnetic antenna transmission system 1600 for use in a positioning system. Magnetic antenna transmission system 1600 comprises oscillator 1649, divide by two divider 1650, XOR gate 1651, first power amplifier 1652, second power amplifier 1653, first magnetic antenna 1604, and second magnetic antenna 1608. In a preferred embodiment, first magnetic antenna 1604, and second magnetic antenna 1608 are arranged orthogonally. Transmitter system 1648 comprises oscillator 1649, divide by two divider 1650, XOR gate 1651, first power amplifier 1652, and second power amplifier 1653. Transmitter system 1648 is an example of an RF module, such as RF module 412.

Oscillator 1649 operates at twice a desired frequency f to yield a clock signal C. Divide by two divider 1650 takes clock signal C at frequency 2 f and divides it by two to yield an in-phase signal I at frequency f. XOR gate 1651 accepts clock signal C as a first input and in-phase signal I as a second input. XOR gate 1651 yields quadrature output signal Q. Quadrature output signal Q is shifted ninety degrees with respect to in-phase signal I. First power amplifier 1652 amplifies in-phase signal I and conveys it to first magnetic antenna 1604. Second power amplifier 1653 amplifies quadrature signal Q and conveys it to second magnetic antenna 1608. Feeding a first in-phase signal I to first magnetic antenna 1604 and a second quadrature signal Q to second magnetic antenna 1608 enables a preferred embodiment magnetic antenna transmission system 1600 to radiate substantially omnidirectional vertically polarized electromagnetic waves.

First power amplifier 1652 and second power amplifier 1653 may further include filtering means, matching means, or power control means. Filtering means include high pass, low pass, band pass or band notch filters such as are generally understood by practitioners of the RF arts. Filtering means enable first power amplifier 1652 and second power amplifier 1653 to deliver appropriate frequency components to first magnetic antenna 1604 and second magnetic antenna 1608. Matching means include impedance transformation and balun transformation. Power control means allow output power of first power amplifier 1652 and second power amplifier 1653 to be adjusted so as to meet a desired power specification such as one imposed by a regulatory limit.

Preferred embodiment magnetic antenna transmission system 1600 is particularly useful for a positioning system operating at relatively low frequencies such as those less than 2 MHz. At relatively low frequencies it is relatively easy to generate a clock signal at twice a frequency of interest. The inventors have successfully used direct digital synthesis. A variety of other techniques are possible including other digital techniques, quartz oscillators, multi-vibrators, synthesizers, LC oscillators and other oscillators. At higher frequencies it becomes more difficult to generate a clock signal at twice a frequency of interest. For these higher frequencies, alternate embodiments using a clock or oscillator operating at the frequency of interest become more attractive.

FIG. 17A is a timing diagram showing a typical clock signal 1654 in a preferred embodiment magnetic antenna transmission system. Clock signal 1654 toggles at a frequency 2 f for a magnetic antenna transmission system 1600 where transmission at a frequency f is desired. In an exemplary system, divide by two divider 1650 triggers on a falling edge such as falling edge 1655.

FIG. 17B is a timing diagram showing a typical in-phase (I) signal 1656 in a preferred embodiment magnetic antenna transmission system 1600. In-phase (I) signal 1656 toggles at frequency f.

FIG. 17C is a timing diagram showing a typical quadrature (Q) signal 1657 in a preferred embodiment magnetic antenna transmission system 1600. Quadrature (Q) signal 1657 toggles at frequency f and is shifted in time by a quarter period with respect to in-phase (I) signal 1656.

FIG. 18 is a block diagram showing a first alternate embodiment magnetic antenna transmission system 1800 for use in a positioning system. First alternate embodiment magnetic antenna transmission system 1800 comprises oscillator 1849, quadrature splitter 1858, first power amplifier 1852, second power amplifier 1853, first magnetic antenna 1804, and second magnetic antenna 1808. In a preferred embodiment, first magnetic antenna 1804, and second magnetic antenna 1808 are arranged orthogonally. Transmitter system 1848 comprises oscillator 1849, quadrature splitter 1858, first power amplifier 1852, and second power amplifier 1853. Transmitter system 1848 is an example of an RF module, such as RF module 412.

Oscillator 1849 generates a sine wave signal at a frequency f and conveys a sine wave signal to a quadrature splitter 1858. Quadrature splitter 1858 yields a first in-phase signal I and a second quadrature signal Q. First power amplifier 1852 amplifies a first in-phase signal I and delivers a first in-phase signal I to first magnetic antenna 1804. Second power amplifier 1853 amplifies a second quadrature signal Q and delivers a second quadrature signal Q to second magnetic antenna 1808. Feeding a first in-phase signal I to first magnetic antenna 1804 and a second quadrature signal Q to second magnetic antenna 1808 enables a first alternate embodiment magnetic antenna transmission system 1800 to radiate substantially omnidirectional vertically polarized electromagnetic waves.

The main advantage of first alternate embodiment magnetic antenna transmission system 1800 is that it does not require any operation at frequencies higher than a preferred frequency f. This makes first alternate embodiment magnetic antenna transmission system 1800 suitable for use at higher frequencies, such as 13.56 MHz, where it becomes more difficult to implement the digital approach of preferred embodiment magnetic antenna transmission system 1600.

FIG. 19 is a block diagram showing a second alternate embodiment magnetic antenna transmission system 1900 for use in a positioning system. Second alternate embodiment magnetic antenna transmission system 1900 comprises oscillator 1949, switch 1959, first power amplifier 1952, second power amplifier 1953, first magnetic antenna 1904, and second magnetic antenna 1908. Transmitter system 1948 comprises oscillator 1949, switch 1959, first power amplifier 1952, and second power amplifier 1953. Transmitter system 1948 is an example of an RF module, such as RF module 412.

Switch 1959 toggles back and forth on a time scale short with respect to a receiver average response time scale. In a preferred embodiment, first magnetic antenna 1904, and second magnetic antenna 1908 are arranged orthogonally. Thus, second alternate embodiment magnetic antenna transmission system 1900 can achieve an effective omnidirectional vertical polarization radiation pattern. Thus, second alternate embodiment magnetic antenna transmission system 1900 radiates effectively omnidirectional vertically polarized electromagnetic waves. In an alternate embodiment, switch 1959 may switch at another predetermined rate or pattern, such as a rate longer than the receiver average response time scale.

Thus the two magnetic antennas may be used to transmit the equivalent of an omnidirectional pattern by driving the antennas in an orthogonal manner. The orthogonal drive may be, for example, time orthogonal as shown in the switched antenna examples, or phase orthogonal as shown in the phase quadrature examples. Other orthogonal switching patterns or signals may also be used. Since one objective of the orthogonal signaling is to provide coverage in the null of one antenna, strict orthogonality may not be necessary, an adequate component of orthogonality to overcome the deep null of one antenna may be sufficient.

Orthogonal drive may be in addition to the orthogonal arrangement of the null patterns of the two antennas. As with the drive, strict orthogonality of the antenna null patterns may not be necessary for all applications. Packaging constraints or other considerations may dictate a less than perfect implementation. Thus, in a further embodiment, the null axes are arranged with a 60 degree separation. In a further embodiment, three antennas may be arranged with nulls at 0, 60 and 120 degrees and driven with time orthogonal signals, or with three phase signals substantially at 0, 120 and 240 degree phase angles. Additional arrays of multiple antennas may be extrapolated from this teaching.

Figure 20:
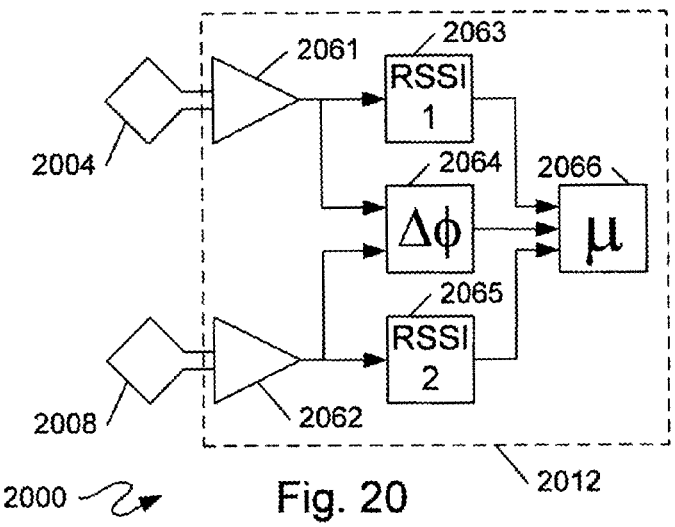
FIG. 20 is a block diagram showing a preferred embodiment magnetic antenna reception system for use in a positioning system.

FIG. 20 is a block diagram showing a preferred embodiment magnetic antenna reception system 2000 for use in a positioning system. Magnetic antenna reception system 2000 comprises first magnetic antenna 2004, second magnetic antenna 2008, first receiver 2061, second receiver 2062, first signal strength detector 2063, second signal strength detector 2065, microprocessor 2066, and in some embodiments, phase comparator 2064. In a preferred embodiment, first magnetic antenna 2004, and second magnetic antenna 2008 are arranged orthogonally. Receiver system 2012 comprises first receiver 2061, second receiver 2062, first signal strength detector 2063, second signal strength detector 2065, and in some embodiments, phase comparator 2064. Receiver system 2012 is an example of an RF module, such as RF module 412.

The microprocessor 2066 typically determines a received power by combining received power information from the first magnetic antenna 2004 and the second magnetic antenna 2008. In one embodiment, the power levels detected in the two antennas 2004, 2008 are summed. In another embodiment, the ratio of the power levels is used to determine a power multiplier factor based on the antenna receive patterns. The power multiplier is then applied to the greater power of the two to determine actual received power.

Figure 21:
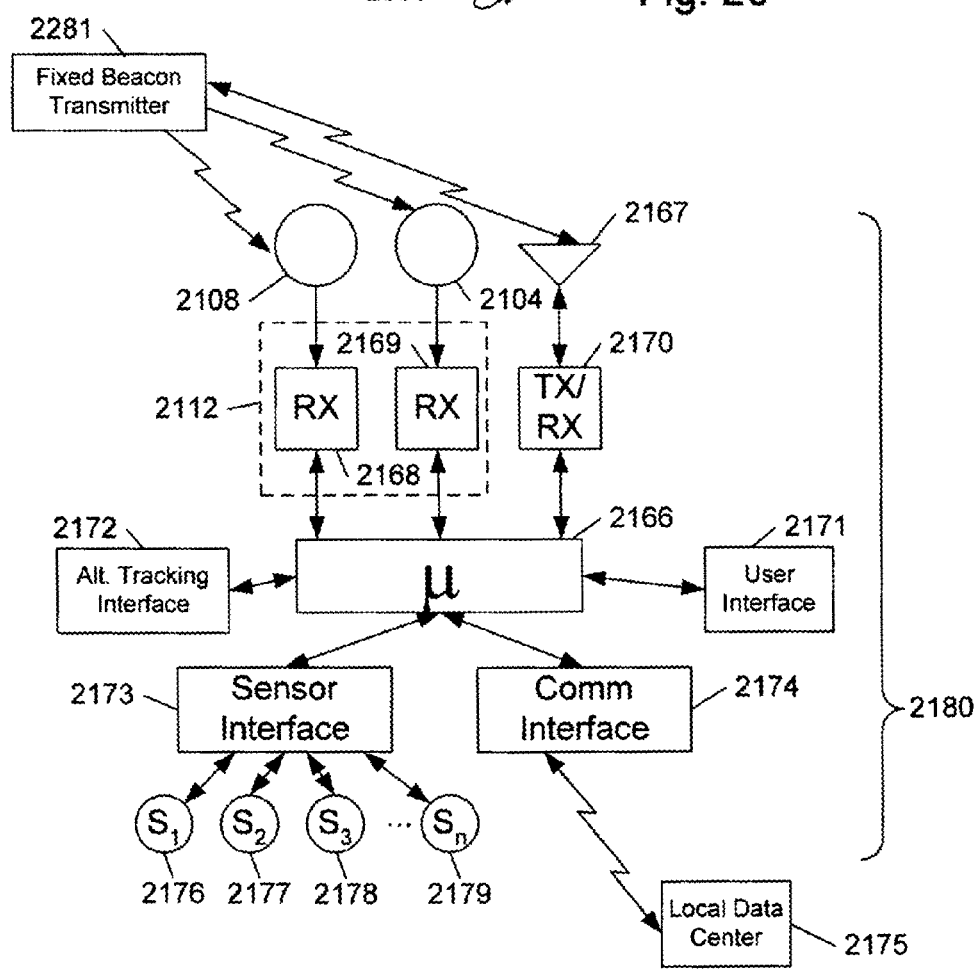
FIG. 21 is a block diagram showing a mobile locator tag for use in a positioning system.

FIG. 21 is a block diagram showing a mobile locator tag 2180 for use in a positioning system. Mobile locator tag 2180 comprises first magnetic antenna 2104, second magnetic antenna 2108, RF module 2112, electric antenna 2167, transceiver 2170, microprocessor 2166, alternate tracking interface 2172, user interface 2171, sensor interface 2173, first sensor 2176, second sensor 2177, third sensor 2178, nth sensor 2179, and communications interface 2174. The sensors 2173, 2176, 2177, and 2179 may be collectively referred to as a sensor net. Mobile locator tag 2180 receives signals from fixed beacon transmitters like fixed beacon transmitter 2281 and communicates with a local data center 2175.

RF module 2112 is a near field receiver comprising a first receiver 2169 and a second receiver 2168. First receiver 2169 detects signals from a first magnetic antenna 2104, and second receiver 2168 detects signals from a second magnetic antenna 2108. In a preferred embodiment, first magnetic antenna 2104 and second magnetic antenna 2108 are arranged orthogonally. First receiver 2169 and second receiver 2168 may use analog or digital techniques for determining signal properties such as RSSI. For instance, first receiver 2169 and second receiver 2168 may perform a Fourier Transform operation like an FFT on a received time domain waveform to simultaneously identify amplitude and phase characteristics of multiple near field signals at various frequencies. RF module 2112 communicates signal characteristics to microprocessor 2166. Microprocessor 2166 conveys command and control signals to RF module 2112.

Near field transceiver 2170 receives signals from electric field antenna 2167. Electric field antenna detects electric field signals from fixed beacon transmitter 2281. In alternate embodiments, near field transceiver 2170 can also transmit data signals to fixed beacon transmitter 2281 intermediate electric field antenna 2167. Microprocessor 2166 conveys command and control signals as well as data signals to near field transceiver 2170.

An optional alternate tracking interface 2172 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2166 conveys command and control signals to alternate tracking interface 2172 and receives data pertaining to location and position.

A particularly useful alternate tracking system is a near field amplitude positioning system operating at frequencies in the vicinity of 13.56 MHz with a wavelength ($\lambda$=22 m). Such a frequency is suitable for precision near field amplitude positioning to a range of 3-10 m. A near field amplitude positioning system at 13.56 MHz is particularly well suited for monitoring people within a small unit, or squad. A near field amplitude positioning system operating at frequencies in the vicinity of 13.56 MHz is also suitable as a stand-alone system for monitoring social interactions and contacts between people in a residential or office environment. In such an application, a mobile transmitter tag co-located with a mobile locator receiver tag facilitates mutual ranging and positioning.

Optional user interface 2171 provides means to control mobile locator tag 2180 and obtain information from mobile locator tag 2180. User interface 2171 conveys command and control signals to microprocessor 2166 and provides means for accessing information stored in microprocessor 2166. Optional user interface 2171 may employ visual, audio or tactile means of conveying data to a user. Optional user interface 2171 may further comprise means for a user to control a mobile locator tag or otherwise input relevant data to a microprocessor.

Microprocessor 2166 includes input/output capability, memory and/or data storage capability, and processing capability. Preferentially, microprocessor 2166 also includes the ability to monitor data from sensor interface 2173, apply rules, and react to data from sensor interface 2173. Microprocessor 2166 can convey data, alarms, alerts, or status information via communications interface 2174 to a local data center 2175. In some embodiments, microprocessor 2166 can store and allow retrieval of other information including for instance invoices, bills of lading, material safety data, and sensor logs.

Sensor interface 2173 may exchange control and data signals with the sensor net. Sensor interface 2173 may include wired or wireless links to the sensor net. Sensor interface 2173 is preferentially compatible with IEEE 1451.2 or similar such protocols for data exchange. Preferentially, sensor interface 2173 enables a modular approach to sensor net 2173 in which a wide variety of sensors may be selected to fulfill a variety of desired missions, including container security, container surveillance, container integrity, and container safety.

Sensor interface 2173 may connect to a variety of sensors. For purposes of illustration and not limitation, first sensor 2176 might detect heart rate, body temperature, respiration or other vital statistic of an individual associated with mobile locator tag 2180. Alternatively, first sensor 2176 might detect oxygen tank level, battery status, or ammunition level status of an individual associated with mobile locator tag 2180. Second sensor 2177 might detect motion and thus be able to determine when mobile locator tag 2180 moves and should transmit an update. Such a motion detector might be part of a more comprehensive inertial tracking system that could provide valuable information to contribute toward an accurate position solution. Third sensor 2178 might detect temperature, humidity, the presence of dangerous chemical or biological agents or the presence of ionizing radiation that might indicate environmental hazards dangerous for the person or asset associated with mobile locator tag 2180. As many additional sensors as might be desired may be added, up to and including an $n^{th}$ sensor 2179 that might detect tampering or the presence of undesired activity in the vicinity of a valuable asset. In the context of a positioning system for assets, sensor interface 2173 enables asset integrity and security to be preserved and also allows early detection of potential hazards or other anomalies. In the context of a positioning system for people or animals, sensor interface 2173 enables health and safety to be monitored and provides for prompt detection of potentially hazardous or dangerous situations. Discussions of specific sensors are for purposes of illustration not limitation.

Local data center 2175 (LDC) receives and processes data from mobile locator receiver tags like mobile receiver locator tag 2180. This data may include signal strength (RSSI) or other signal characteristics including phase characteristics. Local data center 2175 can use data from a mobile locator tag 2180 to determine position of a mobile locator tag 2180 using a ranging algorithm with plurality of appropriate ranging parameters for a given propagation environment as selected by a user or other schemes. Alternatively a mobile-locator tag 2180 may perform certain processing locally and convey ranges or a calculated position to a local data center 2175.

Nothing in this description should be interpreted so as to require all elements depicted in FIG. 21. For instance in alternate embodiments, mobile locator receiver tag 2180 may omit alternate tracking interface 2172, user interface 2171, sensor interface 2173, first sensor 2176, second sensor 2177, third sensor 2178, nth sensor 2179, or communications interface 2174. Mobile locator receiver tag 2180 requires only those elements needed for a particular application.

Figure 22:
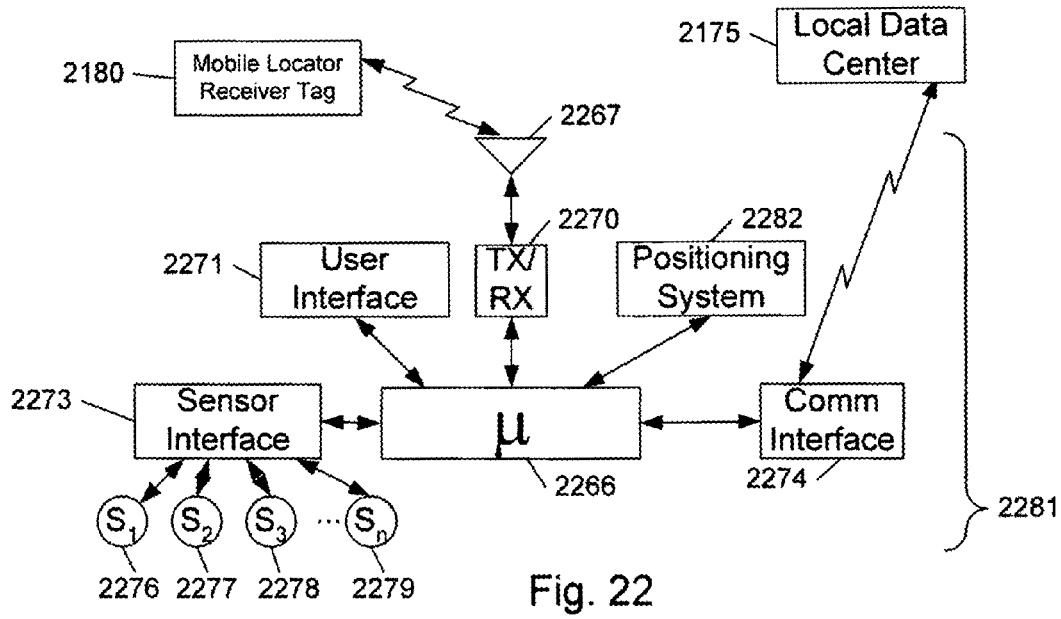
FIG. 22 is a block diagram presenting a fixed beacon transmitter for use in a positioning system.

FIG. 22 is a block diagram presenting a fixed beacon transmitter 2281 for use in a positioning system. Fixed beacon transmitter 2281 comprises electric field antenna 2267, near field transceiver 2270, user interface 2271, positioning system 2282, microprocessor 2266, sensor interface 2273, first sensor 2276, second sensor 2277, third sensor 2278, nth sensor 2279, and communications interface 2274. Fixed beacon transmitter 2281 transmits signals to mobile locator receiver tags (like mobile receiver tag 2180). Fixed beacon transmitter 2281 communicates with a local data center 2175.

Near field transceiver 2270 transmits a signal via electric field antenna 2267 to mobile locator receiver tags, like mobile locator receiver tag 2180. In alternate embodiments, near field transceiver 2270 can also receive data signals from mobile locator receiver tags, like mobile locator receiver tag 2180, intermediate electric field antenna 2267. Microprocessor 2266 conveys command and control signals as well as potentially receives data signals from near field transceiver 2270.

In alternate embodiments, a near field transceiver 2270 may include means for transmitting and receiving near field signals through a propagation environment to other beacon transmitter devices 2270 at known locations so as to measure appropriate ranging parameters for use in a ranging algorithm.

An optional positioning system 2282 may include use of pre-surveyed landmarks, GPS, UWB, laser range finding, or near field electromagnetic ranging to establish location of a fixed beacon transmitter. Microprocessor 2166 conveys command and control signals to optional positioning system 2282 and receives data pertaining to location and position.

Optional user interface 2271 provides means to control fixed beacon transmitter 2281 and obtain information from fixed beacon transmitter 2281. User interface 2271 conveys command and control signals to microprocessor 2266 and provides means for accessing information stored in microprocessor 2266. Optional user interface 2271 may employ visual, audio or tactile means of conveying data to a user. Optional user interface 2271 may further comprise means for a user to control a fixed beacon transmitter 2281 or otherwise input relevant data to a microprocessor 2266.

Microprocessor 2266 includes input/output capability, memory and/or data storage capability, and processing capability. Preferentially, microprocessor 2266 also includes the ability to monitor data from sensor interface 2273, apply rules, and react to data from sensor interface 2273. Microprocessor 2266 can convey data, alarms, alerts, or status information via communications interface 2274 to a local data center 2175. Microprocessor 2266 can store and allow retrieval of other information including for instance invoices, bills of lading, material safety data, and sensor logs.

Sensor interface 2273 exchanges control and data signals intermediate sensors (such as sensor 2276) and a microprocessor 2266. Sensor interface 2273 may include wired or wireless links to a sensor net (not shown). Sensor interface 2273 is preferentially compatible with IEEE 1451.2 or similar such protocols for data exchange. Preferentially, sensor interface 2273 enables a modular approach to the sensor net in which a wide variety of sensors may be selected to fulfill a variety of desired missions.

The sensor net may connect to a variety of sensors. For purposes of illustration and not limitation, first sensor 2276 might detect heart rate, body temperature, respiration or other vital statistic of an individual associated with mobile locator tag 2280. Alternatively, first sensor 2276 might detect oxygen tank level, battery status, or ammunition level status of an individual associated with mobile locator tag 2280. Second sensor 2277 might detect motion and thus be able to determine when mobile locator tag 2280 moves and should transmit an update. Such a motion detector might be part of a more comprehensive inertial tracking system that could provide valuable information to contribute toward an accurate position solution. Third sensor 2278 might detect temperature, humidity, the presence of dangerous chemical or biological agents or the presence of ionizing radiation that might indicate environmental hazards dangerous for the person or asset associated with mobile locator tag 2280. As many additional sensors as might be desired may be added, up to and including an $n^{th}$ sensor 2279 that might detect tampering or the presence of undesired activity in the vicinity of a valuable asset. In the context of a positioning system for assets, sensor interface 2273 enables asset integrity and security to be preserved and also allows early detection of potential hazards or other anomalies. In the context of a positioning system for people or animals, sensor interface 2273 enables health and safety to be monitored and provides for prompt detection of potentially hazardous or dangerous situations. Discussions of specific sensors are for purposes of illustration not limitation.

Local data center 2175 (LDC) receives and processes data from fixed beacon transmitters like fixed beacon transmitter 2281. Local data center 2175 may also convey command and control signals to fixed beacon transmitter 2281.

Nothing in this description should be interpreted so as to require all elements depicted in FIG. 22. For instance in alternate embodiments, fixed beacon transmitter 2281 may omit positioning system 2282, sensor interface 2273, first sensor 2276, second sensor 2277, third sensor 2278, nth sensor 2279, or communications interface 2174. Fixed beacon transmitter 2281 requires only those elements needed for a particular application.

Figure 23:
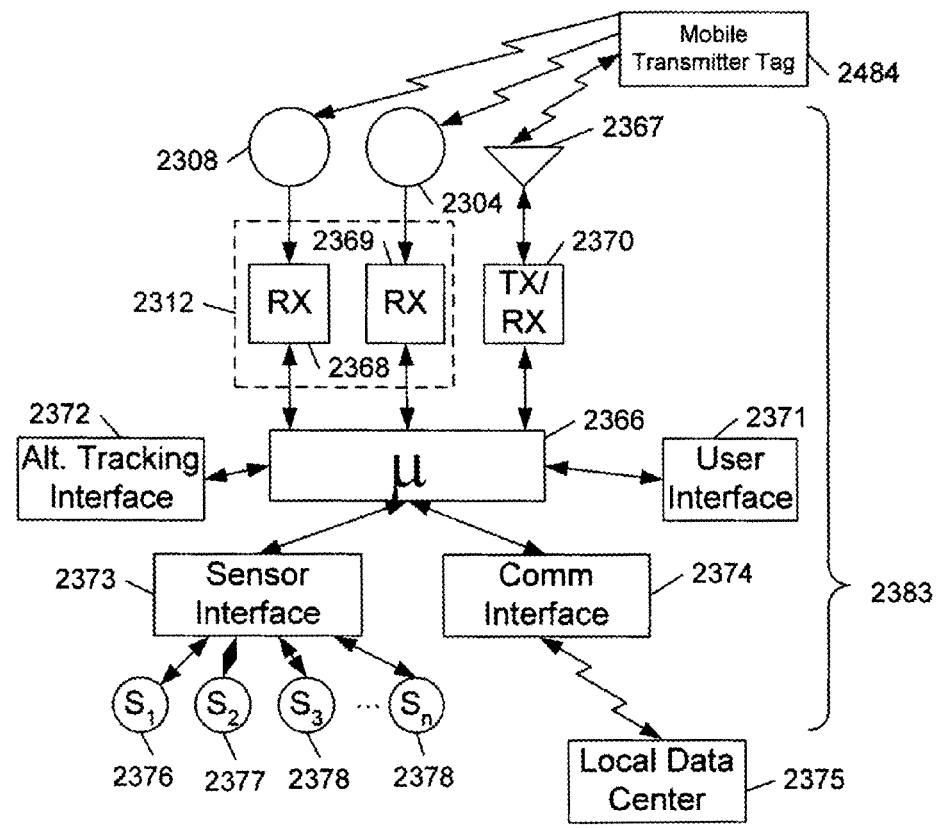
FIG. 23 is a block diagram describing a fixed locator receiver for use in a positioning system.

FIG. 23 is a block diagram describing a fixed locator receiver 2383 for use in a positioning system. Fixed locator receiver 2383 comprises first magnetic antenna 2304, second magnetic antenna 2308, RF module 2312, electric antenna 2367, transceiver 2370, microprocessor 2366, alternate tracking interface 2372, user interface 2371, sensor interface 2373, first sensor 2376, second sensor 2377, third sensor 2378, nth sensor 2379, and communications interface 2374. Mobile locator tag 2383 receives signals from mobile transmitter tags like mobile transmitter tag 2484 and communicates with a local data center 2375.

RF module 2312 is a near field receiver comprising first receiver 2369 and second receiver 2368. First receiver 2369 detects signals from first magnetic antenna 2304, and second receiver 2368 detects signals from second magnetic antenna 2308. In a preferred embodiment, first magnetic antenna 2304 and second magnetic antenna 2308 are arranged orthogonally. First receiver 2369 and second receiver 2368 may use analog or digital techniques for determining signal properties such as signal strength (RSSI). For instance, first receiver 2369 and second receiver 2368 may perform a Fourier Transform operation like an FFT on a received time domain waveform to simultaneously identify amplitude and phase characteristics of multiple near field signals at various frequencies. RF module 2312 communicates signal characteristics to microprocessor 2366. Microprocessor 2366 conveys command and control signals to RF module 2312.

Near field transceiver 2370 receives signals from electric field antenna 2367. Electric field antenna 2367 detects electric field signals from mobile transmitter tag 2484. In alternate embodiments, near field transceiver 2370 can also transmit data signals to mobile transmitter tag 2484 intermediate electric field antenna 2367. Microprocessor 2366 conveys command and control signals as well as data signals to near field transceiver 2370.

An optional alternate tracking interface 2372 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2366 conveys command and control signals to alternate tracking interface 2372 and receives data pertaining to location and position.

Optional user interface 2371 provides means to control fixed locator receiver 2383 and obtain information from fixed locator receiver 2383. User interface 2371 conveys command and control signals to microprocessor 2366 and provides means for accessing information stored in microprocessor 2366. Optional user interface 2371 may employ visual, audio or tactile means of conveying data to a user. Optional user interface 2371 may further comprise means for a user to control a fixed locator receiver 2383 or otherwise input relevant data to a microprocessor 2266.

Microprocessor 2366 includes input/output capability, memory and/or data storage capability, and processing capability. Preferentially, microprocessor 2366 also includes the ability to monitor data from sensor interface 2373, apply rules, and react to data from sensor interface 2373. Microprocessor 2366 can convey data, alarms, alerts, or status information via communications interface 2374 to a local data center 2375. Microprocessor 2366 can store and allow retrieval of other information including for instance invoices, bills of lading, material safety data, and sensor logs.

Sensor interface 2373 exchanges control and data signals intermediate a sensor (like sensor 2376) and a microprocessor 2366. Sensor interface 2373 may include wired or wireless links to a sensor net (not shown). Sensor interface 2373 is preferentially compatible with IEEE 1451.2 or similar such protocols for data exchange. Preferentially, sensor interface 2373 enables a modular approach to sensor net 2373 in which a wide variety of sensors may be selected to fulfill a variety of desired missions.

Local data center 2375 receives and processes data from fixed locator receivers like fixed locator receiver 2383. This data may include signal strength (RSSI) or other signal characteristics including phase characteristics. Local data center 2375 can use data from fixed locator receiver 2383 to determine position of a mobile transmitter tag 2484 using a ranging algorithm with plurality of appropriate ranging parameters for a given propagation environment as selected by a user or other schemes. Alternatively a fixed locator receiver 2383 may perform certain processing locally and convey ranges or a calculated position to a local data center 2375.

Nothing in this description should be interpreted so as to require all elements depicted in FIG. 23. For instance in alternate embodiments, fixed locator receiver 2383 may omit alternate tracking interface 2372, user interface 2371, sensor interface 2373, first sensor 2376, second sensor 2377, third sensor 2378, nth sensor 2379, or communications interface 2374. Mobile locator receiver tag 2380 requires only those elements needed for a particular application.

FIG. 24 is a block diagram laying out a mobile transmitter tag 2484 for use in a positioning system. Mobile transmitter tag 2484 comprises first magnetic field antenna 2404, second magnetic field antenna 2408, RF module 2412, user interface 2471, alternate tracking interface 2472, microprocessor 2466, sensor interface 2473, first sensor 2476, second sensor 2477, third sensor 2478, nth sensor 2479, and communications interface 2474. Mobile transmitter tag 2484 transmits signals to fixed locator receivers (like fixed locator receiver 2383). Mobile transmitter tag 2484 also communicates with a local data center 2375.

RF module 2412 comprises transmitter 2448, first power amplifier 2452, and second power amplifier 2453. Preferred embodiment magnetic antenna transmission system 1600, first alternate embodiment magnetic antenna transmission system 1800, and second alternate embodiment magnetic antenna transmission system 1900 are potential implementations of RF module 2412. RF module 2412 conveys signals to first magnetic antenna 1804, and second magnetic antenna 1808. In a preferred embodiment, first magnetic antenna 1804, and second magnetic antenna 1808 are arranged orthogonally.

An optional alternate tracking interface 2472 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2466 conveys command and control signals to alternate tracking interface 2472 and receives data pertaining to location and position.

Microprocessor 2466 includes input/output capability, memory and/or data storage capability, and processing capability. Preferentially, microprocessor 2466 also includes the ability to monitor data from sensor interface 2473, apply rules, and react to data from sensor interface 2473. Microprocessor 2466 can convey data, alarms, alerts, or status information via communications interface 2474 to a local data center 2375. Microprocessor 2466 can store and allow retrieval of other information including for instance invoices, bills of lading, material safety data, and sensor logs.

Sensor interface 2473 exchanges control and data signals intermediate sensor (such as sensor 2476) and a microprocessor 2466. Sensor interface 2473 may include wired or wireless links to sensor net. Sensor interface 2473 is preferentially compatible with IEEE 1451.2 or similar such protocols for data exchange. Preferentially, sensor interface 2473 enables a modular approach to sensor net 2473 in which a wide variety of sensors may be selected to fulfill a variety of desired missions.

Sensor interface 2473 may connect to a variety of sensors. For purposes of illustration and not limitation, first sensor 2476 might detect heart rate, body temperature, respiration or other vital statistic of an individual associated with mobile transmitter tag 2484. Alternatively, first sensor 2476 might detect oxygen tank level, battery status, or ammunition level status of an individual associated with mobile transmitter tag 2484. Second sensor 2477 might detect motion and thus be able to determine when mobile transmitter tag 2484 moves and should transmit an update. Such a motion detector might be part of a more comprehensive inertial tracking system that could provide valuable information to contribute toward an accurate position solution. Third sensor 2478 might detect temperature, humidity, the presence of dangerous chemical or biological agents or the presence of ionizing radiation that might indicate environmental hazards dangerous for the person or asset associated with mobile transmitter tag 2484. As many additional sensors as might be desired may be added, up to and including an $n^{th}$ sensor 2479 that might detect tampering or the presence of undesired activity in the vicinity of a valuable asset. In the context of a positioning system for assets, sensor interface 2473 enables asset integrity and security to be preserved and also allows early detection of potential hazards or other anomalies. In the context of a positioning system for people or animals, sensor interface 2473 enables health and safety to be monitored and provides for prompt detection of potentially hazardous or dangerous situations. Discussions of specific sensors are for purposes of illustration not limitation.

Optional user interface 2471 provides means to control mobile transmitter tag 2484 and obtain information from mobile transmitter tag 2484. User interface 2471 conveys command and control signals to microprocessor 2366 and provides means for accessing information stored in microprocessor 2366. Optional user interface 2471 may employ visual, audio or tactile means of conveying data to a user. Optional user interface 2471 may further comprise means for a user to control a mobile transmitter tag 2484 or otherwise input relevant data to a microprocessor 2266.

Local data center 2375 optionally receives and processes data from mobile transmitter tags like mobile transmitter tag 2484. Local data center 2375 may also convey command and control signals to mobile transmitter tag 2484.

Nothing in this description should be interpreted so as to require all elements depicted in FIG. 24. For instance in alternate embodiments, mobile transmitter tag 2484 may omit user interface 2471, alternate tracking interface 2472, sensor interface 2473, first sensor 2476, second sensor 2477, third sensor 2478, nth sensor 2479, and communications interface 2474. Mobile transmitter tag 2484 requires only those elements needed for a particular application.

Note that the magnetic antennas discussed with reference to FIGS. 16-24 and as generally discussed in this disclosure may be a magnetic antenna of any appropriate design. In particular, the magnetic antennas of FIGS. 4-8 are well adapted for the applications of FIGS. 16-20.

FIG. 25 illustrates an exemplary indoor deployment of a positioning system including fixed locator receivers and mobile transmitter tags. A plurality of mobile beacon transmitters 2484 are attached to people 623, fixed assets 2587, mobile assets 2588 or other objects whose position is desired to be known. Fixed locator receivers 2383 are placed at various known positions within a building 2585

In accordance with the present invention, ranging may be determined using free space equations as illustrated in FIG. 3. The equations may be adjusted for ground plane effects and potentially for imperfect ground plane conductivity. In a further embodiment, complex structures, such as buildings, urban areas, wooded areas, or even specific building types such as wood frame, concrete block, steel stud or other typical building types may be evaluated through empirical experiment to determine typical attenuation or phase shift characteristics. The characteristics may be evaluated over a range of buildings of the same type to establish an average characteristic. The average characteristics may be expressed in the form of standardized equations or standardized algorithm so that only a few parameters, such as an exponential decay rate need be specified to establish a range model for a particular situation.

In another embodiment, a particular locale may be mapped by using transmitters and receivers at predetermined locations by transmitting and receiving at a large number of locations within the locale. The map may then be stored in a database. In use, readings of signal characteristics are taken and compared with the database map to determine by lookup and/or interpolation, the precise location indicated by the signal readings. Further details of signal mapping techniques are disclosed in U.S. patent application Ser. No. 10/958,165, titled "Near field electromagnetic positioning system and method," filed Oct. 4, 2004 by Schantz et al and published as Pub. No. 2005/0046608 A1, which is incorporated herein by reference in its entirety.

A local data center (LDC) 2375 receives and processes data from mobile beacon transmitters 2484 and fixed locator receivers 2383. This data may include RSSI's or other signal characteristics including phase characteristics. A local data center (LDC) 2375 can use data from a fixed locator receiver 2383 to determine position of a mobile beacon transmitter 2484 using a ranging algorithm with plurality of appropriate ranging parameters for a given propagation environment as selected by a user. Alternatively a fixed locator receiver 2383 may perform range and/or position processing locally and convey ranges or a calculated position to a local data center (LDC) 2375.

FIG. 26 illustrates an exemplary indoor deployment of a positioning system including fixed beacon transmitters and mobile locator receiver tags. Mobile locator receivers 2180 are attached to people 623, valuable assets 2587, mobile assets 2588 or other objects whose position is desired to be known. Fixed beacon transmitters 2281 are placed at various known positions within a building 2585. A local data center (LDC) 2175 receives data regarding signal characteristics or ranges from mobile locator receivers 2180. In one embodiment, the local data center 2175 calculates ranges based on signal characteristic data as received by the mobile locator receivers 2180. In an alternate embodiment, the mobile locator receivers 2180 perform range calculation and pass range information to the local data center 2175.

Figure 27:
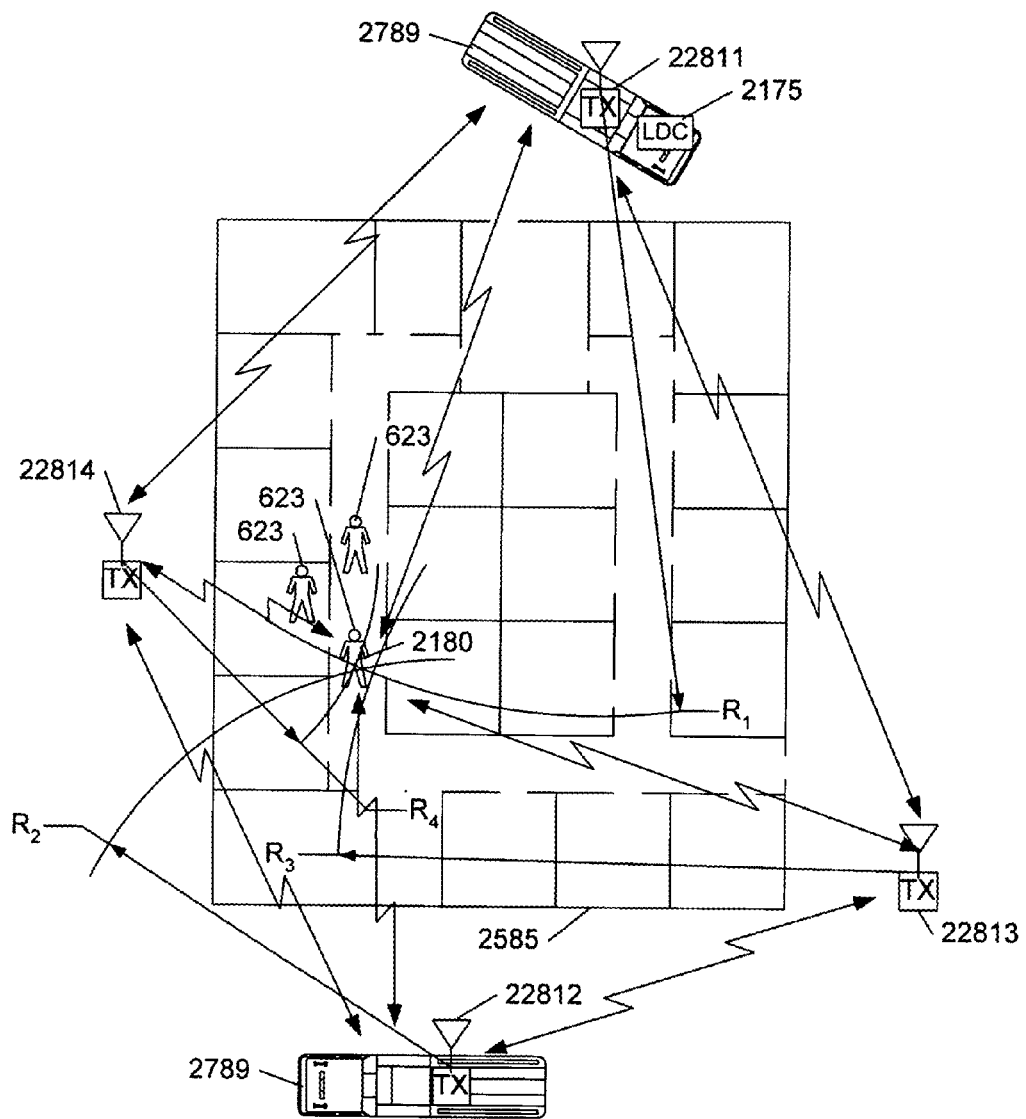
FIG. 27 illustrates an exemplary positioning system including fixed beacon transmitters and mobile locator receiver tags at an incident scene.

FIG. 27 illustrates an exemplary positioning system including fixed beacon transmitters and mobile locator receiver tags at an incident scene as may be used by the military or emergency responders.

The incident scene is a building, facility, or other environment requiring an emergency response from emergency responders like police, fire, paramedic, rescue, hazardous material, military, or other such individuals. Users deploy beacon transmitters 22811 through 22814 around or throughout an incident scene.

Users also select a plurality of appropriate ranging parameters for a propagation algorithm based on the nature of the incident scene. For instance, if the incident scene is a multi-resident dwelling, users may select a plurality of appropriate ranging parameters for a multi-resident dwelling. If the incident scene is a warehouse, users may select a plurality of appropriate ranging parameters for a warehouse. If the incident scene is an office building, users may select a plurality of appropriate ranging parameters for an office building. Users may be provided with a menu of options to allow them to select a plurality of optimal ranging parameters for a propagation algorithm. A plurality of ranging parameters may include but is not necessarily limited to a slope and intercept for a linear range vs. RSSI relationship.

FIG. 27 shows four beacon transmitters 22811 through 22814 for purposes of illustration. Additional beacon transmitters may yield a larger zone of coverage and/or a more accurate solution. Fewer beacon transmitters may yield a less accurate but still potentially useful position solution. Beacon transmitters 22811 through 22814 may be stand alone units or mounted on vehicles 2789. Beacon transmitters 22811 through 22814 may employ an alternate positioning system 2282 like pre-surveyed landmarks, GPS, UWB, laser range finding, or near field electromagnetic ranging to establish their locations via alternate positioning system. Beacon transmitters 22811 through 22814 may also include a transceiver capability to convey data intermediate mobile locator receiver tags 2180 and a local data center (LDC) 2175.

Preferably the beacon transmitters 22811 through 22814 should emit a near field signal of constant power. Regulated transmit power control means can help ensure a constant transmit power. Power level may alternatively be adjusted to maintain constant received power in response to variations in path attenuation, which may include variations in orientation of mobile units.

Alternatively, received power RSSI measurements may be adjusted to compensate for variations in transmitted power, which may vary as a function of battery levels and other factors.

The operation of one embodiment of the system will now be described in detail with reference to FIG. 27. The positions of the beacon transmitters 22811 through 22814 may be determined by survey or by GPS or by other methods that may be suitable for use outside the building but may not be suitable for use inside the building. When the positions of the beacon transmitters 22811 through 22814 are known, the system may commence operation. A mobile locator receiver tag 2180 receives a first signal from a first beacon transmitter 22811 and determines a first RSSI. The mobile locator receiver tag 2180 receives a second signal from a second beacon transmitter 22812 and determines a second RSSI. The mobile locator receiver tag 2180 receives a third signal from a third beacon transmitter 22813 and determines a third RSSI. The mobile locator receiver tag 2180 receives a fourth signal from a fourth beacon transmitter 22814 and determines a fourth RSSI. Using a plurality of ranging parameters suitable for the incident scene, the mobile locator receiver tag 2180 determines ranges (R1 through R4) to each respective beacon transmitter. Ranges R1 through R4 may be used by a mobile locator receiver tag 2180 to determine position using multilateration or other techniques. Alternatively, a mobile locator receiver tag 2180 may convey ranges R1 through R4 to a local data center 2175 where position may be determined.

The local data center 2175 receives and processes data from beacon transmitters 22811 through 22814 and mobile locator receiver tag 2180. This data includes RSSI's or other signal characteristics including phase characteristics. The local data center 2175 can use data from a mobile locator receiver tag 2180 to determine position of a mobile locator receiver tag 2180 using a ranging algorithm with plurality of appropriate ranging parameters for a given propagation environment as selected by a user. Alternatively the mobile-locator receiver tag 2180 may perform range and/or position calculation processing locally and convey ranges or calculated position to a local data center 2175.

In alternate embodiments, appropriate ranging parameters for a given propagation environment may be determined for a particular incident scene by a plurality of beacon transmitters 22811 through 22814 sending signals through the incident scene propagation environment to locator receivers 2180 at known positions (not shown), for instance, co-located with other beacon transmitters 22811 through 22814.

In a further alternate embodiment, where each beacon transmitter also includes receiver locator capability 2180 (not shown), the positions of the beacon transmitters may be determined by determining the set of ranges R1 through R4 between available Transceivers and determining position by triangulation from the set of ranges R1 through R4.

Figure 28:
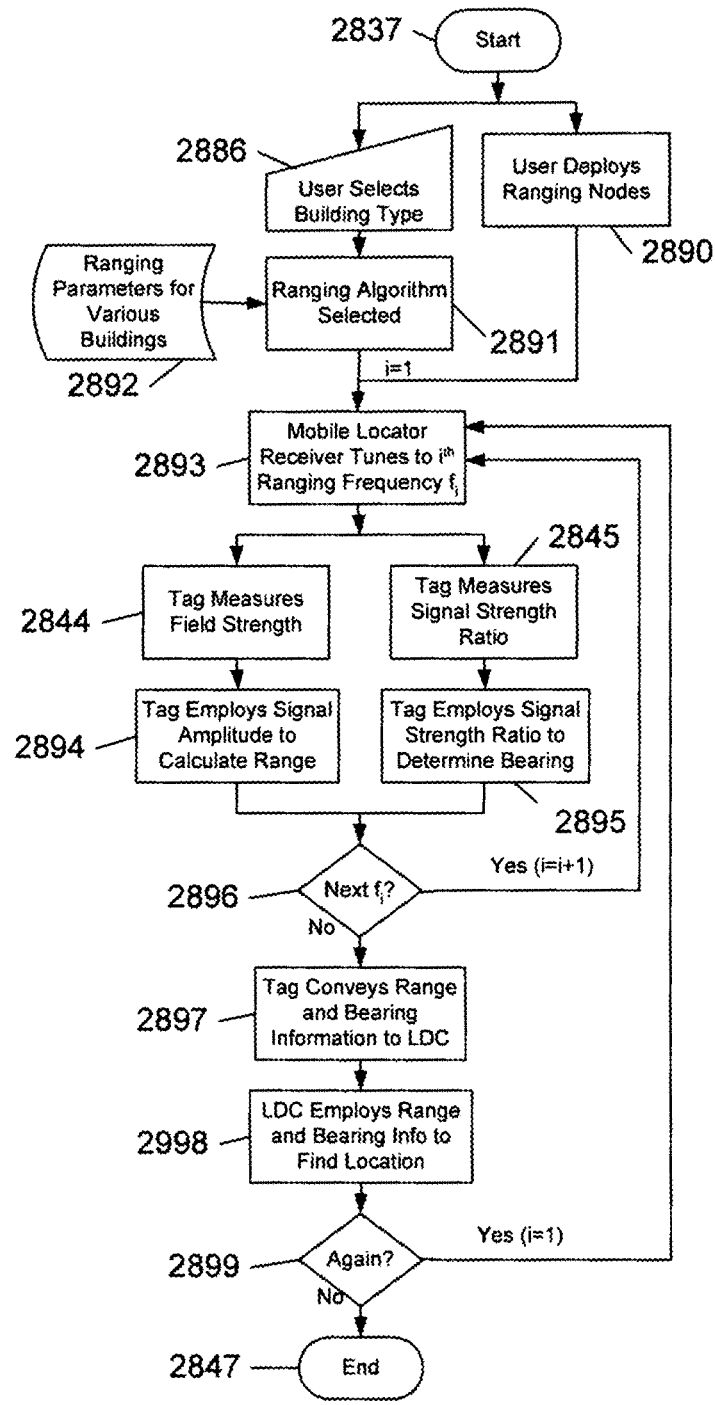
FIG. 28 is a process flow diagram of a positioning system including fixed beacon transmitters and mobile locator tags using near field signal strength.

FIG. 28 is a process flow diagram of a positioning system including fixed beacon transmitters and mobile locator tags using near field signal strength. The positioning system of FIG. 28 may be used for a variety of applications including but not limited to military or emergency responder applications. A preferred embodiment method for near field signal strength positioning begins at a start block 2837 and continues (with the following steps in no particular order) with a user deploying ranging nodes (as noted in block 2890) and a user selecting building type (as noted in block 2886). A user selecting building type effects a selection of appropriate ranging parameters 2892 for a ranging algorithm from stored ranging parameters 2892 for various buildings as shown in block 2891. Alternatively, a user selecting building type (as noted in block 2886) may select the ranging algorithm optimized for the particular building type, thus effected the process step denoted in block 2891. Ranging parameters 2892 may pertain to a particular class of structure or may be optimized to particular structures. The ranging parameters 2892 or the ranging algorithm selection (as noted in block 2891) may be conveyed to a mobile locator tag by using a data link. Alternatively, the ranging parameters 2892 or the ranging algorithm selection (as noted in block 2891) may be conveyed to a local data center (LDC) where a ranging calculation may be performed.

In alternate embodiments, appropriate ranging parameters 2892 for a given propagation environment may be determined for a particular incident scene by a plurality of beacon transmitters sending signals through the given propagation environment to locator receivers at known positions, for instance, co-located with other beacon transmitters.

The preferred embodiment method of FIG. 28 for near field signal strength positioning continues with a process block 2893 in which a mobile locator tag tunes to the $i^{th}$ ranging frequency beginning with i=1. The method continues with the following steps in no particular order with the mobile locator tag measuring signal strength from a beacon transmitter operating at the $i^{th}$ ranging frequency (as shown in block 2844) and optionally with the mobile locator tag measuring other signal parameters such as signal strength ratio or phase properties of a signal from the beacon transmitter operating at the $i^{th}$ ranging frequency (as shown in block 2845). The mobile locator tag employs signal amplitude or RSSI to calculate range using the ranging algorithm selected in block 2891 (as shown in block 2894). The mobile locator tag further employs other signal characteristics such as signal strength ratio or phase properties of a signal to determine bearing or other position relevant information (as shown in block 2895).

The method of FIG. 28 continues with a decision block 2896 whether to go to the $(i+1)^{th}$ ranging frequency. If yes, the process continues with a mobile locator tag tuning to the $(i+1)^{th}$ ranging frequency as shown in block 2893. If no, the process continues with a mobile tag conveying range and other useful information, including but not limited to bearing, to a local data center (LDC) as shown in block 2897. A local data center may employ range and other useful information, including but not limited to bearing, to find location as denoted in block 2898. In alternate embodiments, a mobile locator tag may employ range and other useful information, including but not limited to bearing, to find location and convey location information to a local data center (LDC) or elsewhere by using a data link. In still other alternate embodiments, a mobile locator tag may convey signal amplitude or RSSI to a local data center (LDC) or elsewhere for a calculation of range using a ranging algorithm. A mobile locator tag may further convey other signal characteristics such as signal strength ratio or phase properties of a signal to a local data center (LDC) or elsewhere for a determination of bearing or other position relevant information.

A preferred embodiment method for near field signal strength positioning continues with a decision block 2899 assessing whether to continue tracking based on user inputs or other information. If yes, the process continues as shown in block 2993 by a mobile locator tag tuning to the $i^{th}$ ranging frequency beginning with i=1 and repeating. If no, the process terminates in an end block 2847.

Orthogonal Antenna Systems

This section presents an evaluation of the geometric orientation for which two small loops will have minimum coupling. We assume that the loops lie in each other's near field, so only inductive coupling is relevant. To solve the problem, the inventors invoke the principal of reciprocity between two electromagnetic systems, system "a" and system "b." By the principal of reciprocity:

$$\int\int\int_V [E_b \cdot J_a - H_a \cdot M_b] dV = \int\int\int_V [E_a \cdot J_b - H_b \cdot M_a] dV \quad (1)$$

In other words, the interaction between the fields of antenna b ($E_b$, $H_b$) and the sources of antenna a ($J_a$, $M_a$) must be identical to the interaction between the fields of antenna a ($E_a$, $H_a$) and the sources of antenna b ($J_b$, $M_b$).

FIG. 29 shows the geometry around two small orthogonal loops. A first small loop antenna (loop a) 2904 is characterized by a magnetic moment $M_a$ in the +z-direction and a second small loop antenna (loop b) 2908 is characterized by a magnetic moment $M_b$ in the −y-direction. Ignoring far field terms, the magnetic field of a first small loop antenna 2904 is given by:

$$H_a = H_a(2\cos\theta \hat{r} + \sin\theta \hat{\theta}) \quad (2)$$

The magnetic moment of a second small loop antenna 2908 is given by:

$$M_b = -M_y \hat{y} = -M_y(\sin\theta \sin\phi \hat{r} + \cos\theta \sin\phi \hat{\theta} + \cos\phi \hat{\varphi}) \quad (3)$$

Setting $H_a \cdot M_b = 0$ yields:

$$\begin{aligned} 0 &= H_a \cdot M_b \\ &= -(2\cos\theta\,\hat{r} + \sin\theta\,\hat{\theta}) \cdot (\sin\theta\sin\phi\,\hat{r} + \cos\theta\sin\phi\,\hat{\theta} + \cos\phi\,\hat{\varphi}) \\ &= -3\cos\theta\sin\theta\sin\phi \end{aligned} \quad (4)$$

The result of (4) is zero if $\sin\theta=0$, $\cos\theta=0$, or $\sin\varphi=0$. Thus $\theta=0°$, 90°, or 180° or $\varphi=0°$, or 180° yields no coupling between the loops. A minimal coupling orientation between a first small loop antenna 2904 (loop a) and a second small orthogonal loop antenna 2908 (loop b) is one which satisfies (4). Geometrically, a minimum coupling orientation (or arrangement) will occur when one loop lies either in the plane or along the axis of the other. Magnetic axis, magnetic vector, and magnetic moment may be used interchangeably in this disclosure, depending on context.

FIG. 30 shows the geometry around two small orthogonal loops in a first minimal coupling arrangement. In a first minimal coupling arrangement of small orthogonal loops, a second loop 3008 lies in the plane of a first loop 3004. Angle $\theta_{ab}$ from an axis of a first loop 3004 to the direction of a second loop 3008 is a right angle. A first minimal coupling arrangement of small orthogonal loops (as shown in FIG. 30) corresponds to a second small loop antenna 3008 (loop b) located at $\theta=90°$ and $\varphi=90°$ relative to a first small loop antenna 3004 (loop a).

FIG. 31 shows the geometry around two small orthogonal loops in a second minimal coupling arrangement. In a second minimal coupling arrangement of small orthogonal loops, a second loop 3108 lies in the plane of a first loop 3104 and a first loop 3104 lies in the plane of a second loop 3108. Angle $\theta_{ab}$ from an axis of a first loop 3104 to the direction of a second loop 3108 is a right angle. Similarly angle $\theta_{ba}$ from an axis of a second loop 3108 to the direction of a first loop 3104 is a right angle. A second minimal coupling arrangement of small orthogonal loops (as shown in FIG. 31) corresponds to a second small loop antenna 3108 (loop b) located at $\theta=90°$ and $\varphi=0°$ relative to a first small loop antenna 3104 (loop a).

The inventors have found that although in theory the minimal coupling arrangements of FIG. 30 and FIG. 31 should be equivalent, in practice the arrangement of FIG. 31 yields lower mutual coupling under many circumstances. Having both a first loop 3104 and a second loop 3108 each in the plane of the other yields lower mutual coupling. Other factors including ergonomic and mechanical factors may further influence choice of an arrangement.

Figure 32:
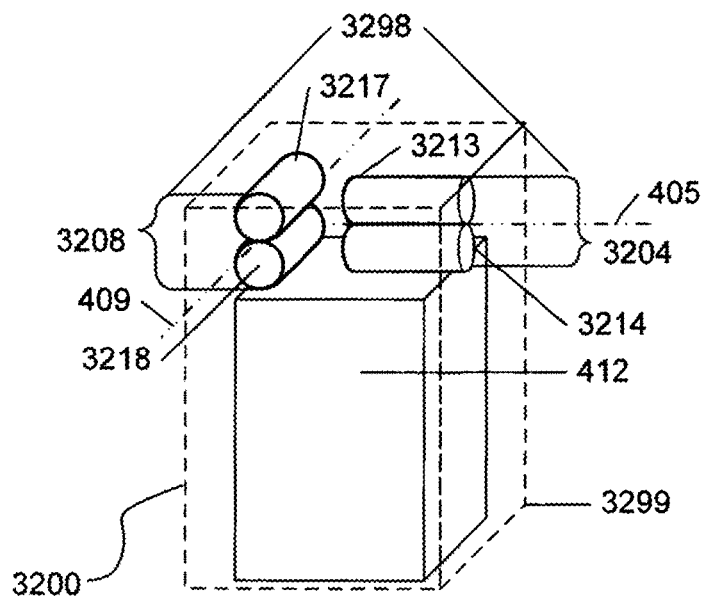
FIG. 32 shows a space efficient magnetic antenna system with two small orthogonal loop antennas in a first minimal coupling arrangement for a compact tracking device.

FIG. 32 shows two small orthogonal loop antennas in a first minimal coupling arrangement for a compact tracking device 3200. Compact tracking device 3200 comprises RF module 412, enclosure 3299, and a space efficient magnetic antenna system 3298 further comprising a first magnetic antenna 3204 and a second magnetic antenna 3208. A first magnetic antenna 3204 has a null generally aligned along first null axis 405. A second magnetic antenna 3408 has a null generally aligned along second null axis 409. A first null axis 405 is substantially orthogonal to a second null axis 409.

A first magnetic antenna system 3204 further comprises a first magnetic antenna component 3213 and a second magnetic antenna component 3214 (collectively, a "first set of magnetic antenna components"). A first set of magnetic antenna components is generally aligned along axes co-parallel to a first null axis 405. A first magnetic antenna system 3204 is depicted as having two components for purpose of illustration and not limitation. In alternate embodiments, a first magnetic antenna system 3204 may further comprise more than two components or a single component.

A second magnetic antenna system 3208 further comprises a third magnetic antenna component 3217 and a fourth magnetic antenna component 3218 (collectively, "second set of magnetic antenna components"). A second set of magnetic antenna components are all generally aligned along axes co-parallel to second null axis 409. A second magnetic antenna system 3208 is depicted as having two components for purpose of illustration and not limitation. In alternate embodiments, a second magnetic antenna system 3208 may further comprise more than two components or a single component.

Figure 33:
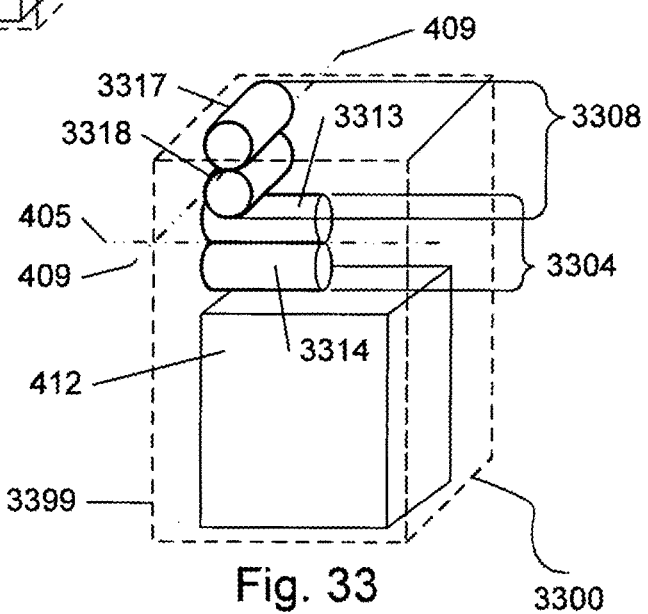
FIG. 33 shows a space efficient magnetic antenna system with two small orthogonal loop antennas in a second minimal coupling arrangement for a compact tracking device.

FIG. 33 shows two small orthogonal loop antennas in a second minimal coupling arrangement for a compact tracking device 3300. Compact tracking device 3300 includes RF module 412, enclosure 3399, and a space efficient magnetic antenna system 3398 further comprising first magnetic antenna 3304 and second magnetic antenna 3308. First magnetic antenna 3304 has a null generally aligned along first null axis 405. Second magnetic antenna 3308 has a null generally aligned along second null axis 409. First null axis 405 is substantially orthogonal to second null axis 409.

A first magnetic antenna system 3304 further comprises a first magnetic antenna component 3313 and a second magnetic antenna component 3314 (collectively, "first set of magnetic antenna components"). A first set of magnetic antenna components are all generally aligned along axes co-parallel to first null axis 405. A first magnetic antenna system 3304 is depicted as having two components for purpose of illustration and not limitation. In alternate embodiments, a first magnetic antenna system 3304 may further comprise more than two components or a single component.

A second magnetic antenna system 3308 further comprises a third magnetic antenna component 3317 and a fourth magnetic antenna component 3318 (collectively, a "second set of magnetic antenna components"). A second set of magnetic antenna components are all generally aligned along axes co-parallel to a second null axis 409. A second magnetic antenna system 3308 is depicted as having two components for purpose of illustration and not limitation. In alternate embodiments, a second magnetic antenna system 3208 may further comprise more than two components or a single component.

Figure 34:
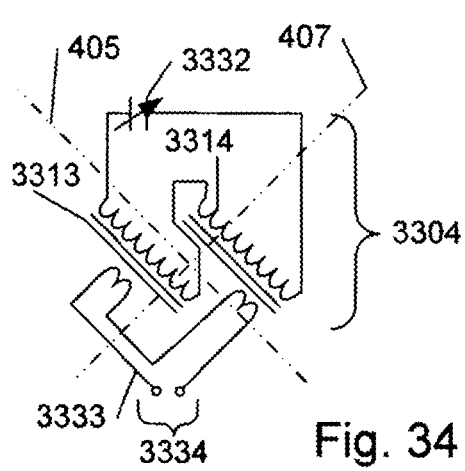
FIG. 34 presents a potential circuit diagram for a magnetic loopstick antenna.

FIG. 34 presents a potential circuit diagram for a magnetic loopstick antenna 3304. A magnetic loopstick antenna 3304 comprises a first magnetic antenna component 3313 and a second magnetic antenna component 3314 (collectively, "a set of magnetic antenna components"). In a preferred embodiment, a magnetic loopstick antenna 3304 further comprises tuning means 3332, a secondary coupling coil 3333 and coupling coil terminals 3334.

A first set of magnetic antenna components are aligned and connected so as to have a generally constructive addition of patterns substantially along pattern axis 407 and nulls generally co-parallel with null axis 405. For best results, the sense of currents in a first magnetic antenna component 3313 and a second magnetic antenna component 3314 should be the same so that the patterns of a set of magnetic components add up constructively. Similarly for best results, secondary coupling coil 3333 should couple to each of a set of magnetic components with the same sense so as to yield maximal transmission of power (or conversely, maximal sensitivity to received signals) from coupling coil terminals 3334.

A set of magnetic antenna components may be loopstick antenna or other inductive components. In preferred embodiments, a set of magnetic components do not share a common ferrite core.

Figure 35:
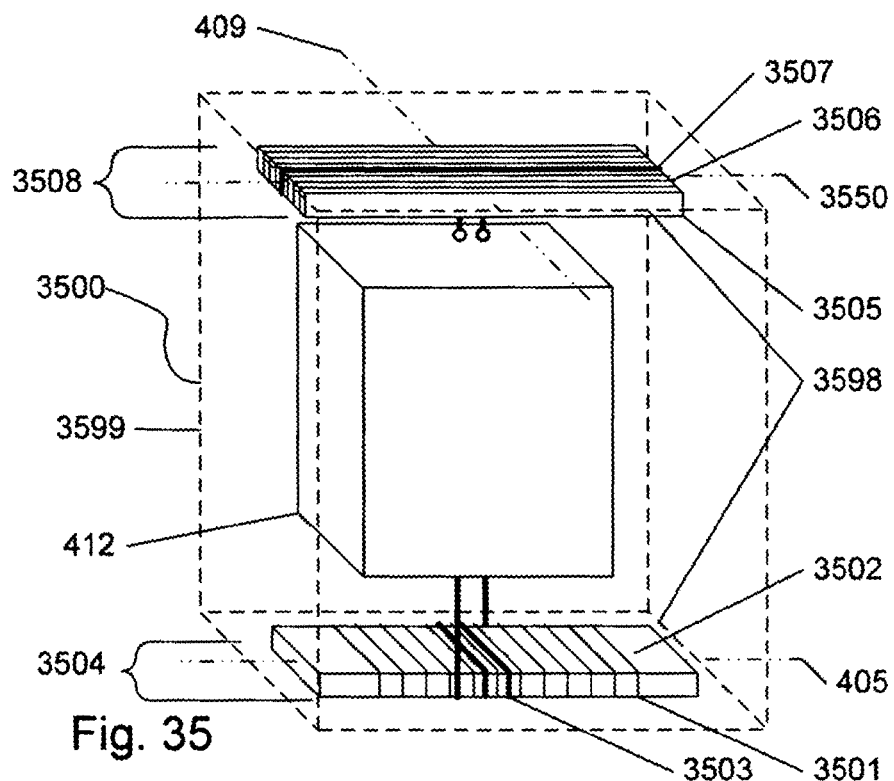
FIG. 35 shows a space efficient magnetic antenna system with a small orthogonal loop antenna characterized by a null axis orthogonal to a principal axis.

FIG. 35 shows a space efficient magnetic antenna system 3598 with a small orthogonal loop antenna 3508 characterized by a null axis 409 orthogonal to a principal axis 3550. In an alternate embodiment, a space efficient magnetic antenna system 3598 comprises a first magnetic antenna 3504 and a second magnetic antenna 3508. A first magnetic antenna 3504 further comprises a first bar 3502, a first primary coil 3501, and a first secondary coil 3503. A second magnetic antenna 3508 further comprises a second bar 3505, a second primary coil 3506, and a second secondary coil 3507. A first magnetic antenna 3504 has first null axis 405. A second magnetic antenna 3508 has second null axis 409. A second null axis 409 is substantially orthogonal to a first null axis 405. A second bar 3505 has a principal axis 3550. A principal axis 3550 is preferentially an axis of symmetry of a second bar 3505. In addition, a principal axis 3550 is substantially aligned with the dimension of greatest extent of a second bar 3505. A second primary coil 3506, and a second secondary coil 3507 cooperate with a second bar 3505 to create a null axis 409 substantially orthogonal to a principal axis 3550. A first bar 3502 and a second bar 3505 are preferentially ferrite bars, but in alternate embodiments may be any other material suitable for use in a magnetic antenna. In the context of the present invention, terms like "rod," "bar," or "core" may be used interchangeably to refer to a material incorporated in a magnetic antenna for either mechanical support or for the benefit of high permeability.

Figure 1:
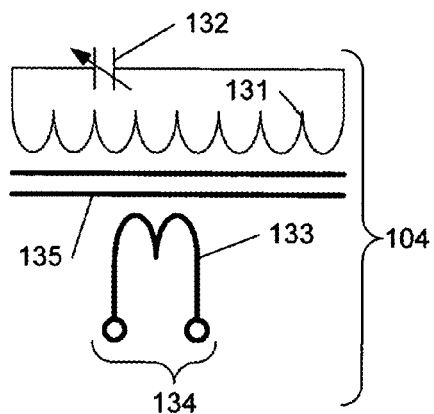
FIG. 1 is a circuit diagram showing a prior art loopstick antenna configuration.
Figure 2:
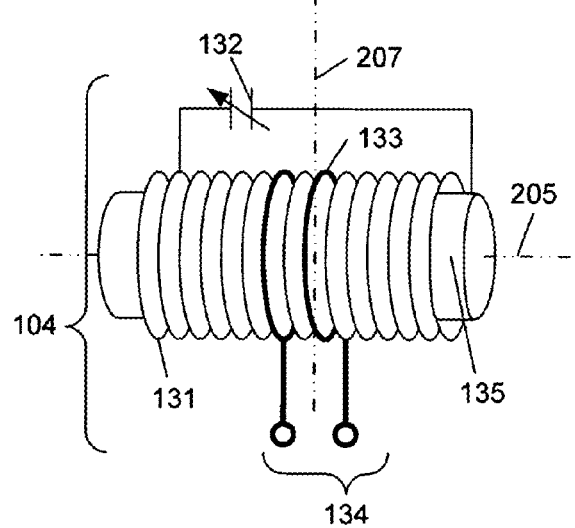
FIG. 2 is a schematic diagram illustrating a prior art loopstick antenna arrangement.

In many prior art loopstick antennas (like that of FIG. 1) loopstick axis 205 is both a principal axis as well as a null axis. In the alternate embodiment of FIG. 35, a second magnetic antenna 3508 is characterized by a null axis 409 that is not substantially co-parallel to a principal axis 3505. In fact, in the alternate embodiment of FIG. 35 a null axis 409 is substantially orthogonal to a principal axis 3505. A space efficient magnetic antenna system 3598 further cooperates with an RF module 412 and an enclosure 3599 to create a compact tracking device 3500.

Figure 36:
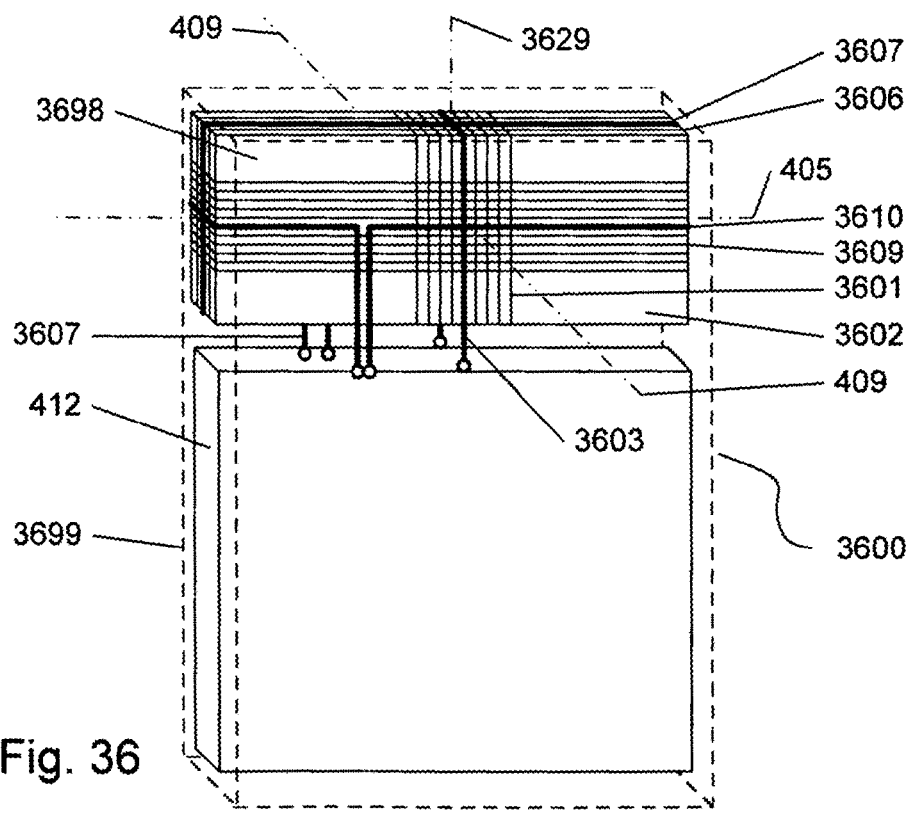
FIG. 36 shows a space efficient magnetic antenna system with three mutually orthogonal antennas on a common ferrite.

FIG. 36 shows a space efficient magnetic antenna system 3698 with three mutually orthogonal magnetic antennas on a common core 3602. Space efficient magnetic antenna system 3698 comprises three mutually orthogonal antennas. A first primary coil 3601, a first secondary coil 3603, and a common core 3602 cooperate as a first magnetic antenna with a first null axis 405. A second primary coil 3606, a second secondary coil 3607, and a common core 3602 cooperate as a second magnetic antenna with a second null axis 409. A second null axis 409 is substantially orthogonal to a first null axis 405. A third primary coil 3609, a third secondary coil 3610, and a common core 3602 cooperate as a third magnetic antenna with a third null axis 3629. A third null axis 3629 is substantially mutually orthogonal to a first null axis 405 and a second null axis 409. Compact tracking device 3600 includes RF module 412, enclosure 3699, and a space efficient magnetic antenna system 3698. In alternate embodiments, a space efficient magnetic antenna system 3698 may comprise either one or two magnetic antennas.

A first null axis 405 is also a principal axis 405 of a common core 3602. A principal axis 405 of a common core 3602 is generally aligned with the dimension of greatest extent of a common core 3602. Thus a second magnetic antenna is characterized by a second null axis 409 that is substantially orthogonal to a principal axis 405 of an associated common ferrite core 3602. A common core 3602 is preferentially a ferrite core, but in alternate embodiments may be any other material suitable for use in a magnetic antenna.

A second null axis 409 is also a secondary axis 409 of a common core 3602. A common core 3602 is shown with much less extent along a secondary axis 409 than along a principal axis 405. A substantial difference in extent along a secondary axis 409 relative to a principal axis 405 is beneficial for enabling a compact tracking device with a low profile form factor, such as a "credit-card" form factor. In alternate embodiments, there may be no substantial difference in extent along a secondary axis 409 relative to a principal axis 405.

FIG. 37 shows an exemplary space efficient antenna embodiment having a first magnetic antenna wound outside of and surrounding an electronics module 412. The coil is spaced a predetermined distance d1 3708 from the electronics module. Spacing d1 allows a substantial portion of the magnetic field of coil 3702 to pass unimpeded, thus preserving much of the inductance and sensitivity of antenna 3702. The antenna system of FIG. 37 also includes a second magnetic antenna 3704 oriented with a null axis orthogonal to the null axis of antenna 3702. Coil 3702 is preferably wound at the maximum extent practical for a device associated with the antenna and electronics module. For example the coil 3702 may be wound around the outside of the package 3703 and then coated or overmolded for protection. Alternatively, coil 3702 may be formed on the inside of the package 3703. Distance d1 3708 is preferably 10% to 90% of a distance from the center (or center line) of the coil to the inside edge of the coil 3702.

The dimensions of the antenna system are shown for reference. The height 3710 is shown. The length 3711 includes the two coils. The width 3712 is the width of coil 3702 which is the maximum in this direction. The terms length, width, height are for illustration purposes and may be interchanged as desired. The length of a coil as used in the art is often in reference to the winding axis dimension, even if the length is the shortest dimension. FIG. 37 shows a rectangular device; however, any device including round or irregular may be characterized by an orthogonal set of dimensions: length, width, and height.

A second magnetic antenna 3408 has a null generally aligned along second null axis 409. The first null axis 405 of coil 3702 is substantially orthogonal to the second null axis 409 of coil 3704. Null axis 405 and null axis 409 are typically aligned in accordance with a plane defining the coverage desired for the system, e.g., a horizontal plane. In typical operation, the device is normally held in position so that axis 405 and axis 409 are horizontal (parallel to a horizontal plane). The second antenna may be similar to antenna 408 of FIG. 5. The second magnetic antenna system 3704 is depicted as having one component for purpose of illustration and not limitation. In alternate embodiments, a second magnetic antenna system 3208 may further comprise more than a single component, for example antenna 3204 of FIG. 32. Second magnetic antenna 3704 is shown outside antenna 3702; however antenna 3704 may be located inside antenna 3702 at the bottom or at the side in space d1 3708 between the first antenna 3702 and the electronics package 412.

As a further property of the arrangement of FIG. 37, the second antenna 3704 is positioned and oriented for minimum coupling between antennas 3704 and 3702 by virtue of the centered position of coil 3704 at the end of coil 3702. Alternative minimum coupling positions and orientations may also be used.

In one embodiment, the antenna arrangement of FIG. 37 (and also FIG. 38) is designed so that the antenna system substantially fills the available dimensions, for example, length, width, and height for a given device. Note also that potentially at least part, and possibly all of the electronics needed with the antenna in the same package as the antenna is placed substantially within the volume defined by the maximum dimensions of the antenna system, except for incidental items. Such incidental items as controls, displays, connectors, moldings, and coatings may be required to extend outside the antenna dimensions. Note further that in one embodiment, the winding of the antenna coil may be distributed along the full length of the available winding axis dimension 409 or 412. See especially antennas 3702, 3802 and 3808. The winding, as well as the other dimensions of the antenna system should preferably enclose at least 75%, more preferably at least 85%, and more preferably at least 95% of each dimension (length, width, height) of the device, i.e., the outside package dimension of the device including the antenna system. Often the ability to make the antenna such a large percentage of the package dimension is enabled in part by placing most (greater than 50%, preferably greater than 75%, preferably greater than 95%) if not all of the associated electronics within the volume defined by the length, width, height of the antenna system, in one embodiment in particular, within the interior length, width, height of one or more individual antennas of the antenna system (see also FIG. 38).

In further embodiments, a third magnetic antenna may be included, wound around the enclosure in the remaining orthogonal direction. Alternatively, an electric field antenna may be added for alternative coverage.

FIG. 38 shows a system having two orthogonal magnetic antennas. The first magnetic antenna is formed similar to antenna 3702 of FIG. 37, i.e., wound around an electronics module 412 and spaced a distance at least d2 3804 from the electronics module. The second magnetic antenna 3808 may be orthogonal in directionality, i.e., the null axis 405 of antenna 3808 may be orthogonal to the null axis 409 of antenna 3802. Antennas 3802 and 3808 may be oriented in accordance with a predetermined plane in the manner described for antenna 3702 and 3704 of FIG. 37. Antenna 3808 may be wound around a second electronics module 3810 and spaced a distance d3 3806 from the second electronics module 3810. Electronics modules 412 and 3810 may cooperate together to perform the functionality of the device and may be connected by any necessary wires or cables. Coils 3702, 3802, and 3808 are shown completely enclosing the respective electronics modules for illustration purposes; however, the coils may only partially enclose the modules in accordance with design requirements or preferences. For example, the coils 3802 and 3808 may have ¼ the length, i.e., ¼ the number of turns as shown.

As a further property of the arrangement of FIG. 38, the second antenna 3808 is positioned and oriented for minimum coupling between antennas 3808 and 3802 by virtue of the centered position of coil 3808 at the end of coil 3802. Alternative minimum coupling positions and orientations may also be used.

In a further embodiment, antenna 3802 and 3808 may both be wound around electronics module 412, substantially enclosing electronics module 412 within each respective antenna. In a further embodiment, a third mutually orthogonal magnetic antenna (orthogonal to both 3802 and 3808 may be wound around electronics module 412, with each respective antenna substantially enclosing electronics module 412.

Minimum Coupling Configurations

Figure 39:
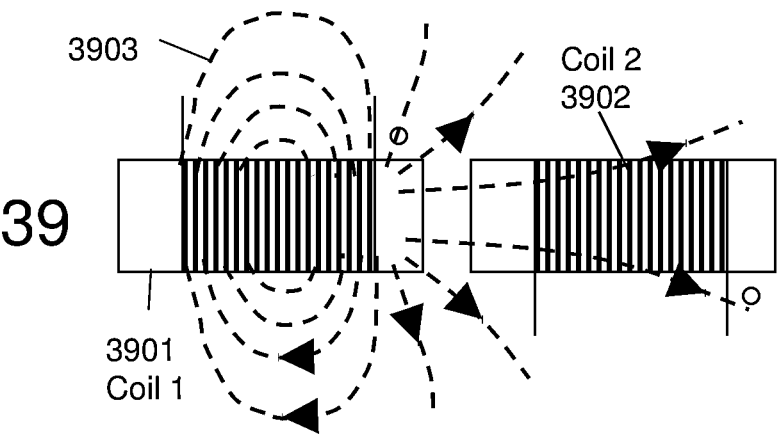
FIG. 39 depicts a first strong coupling configuration of two coil elements.
Figure 40:
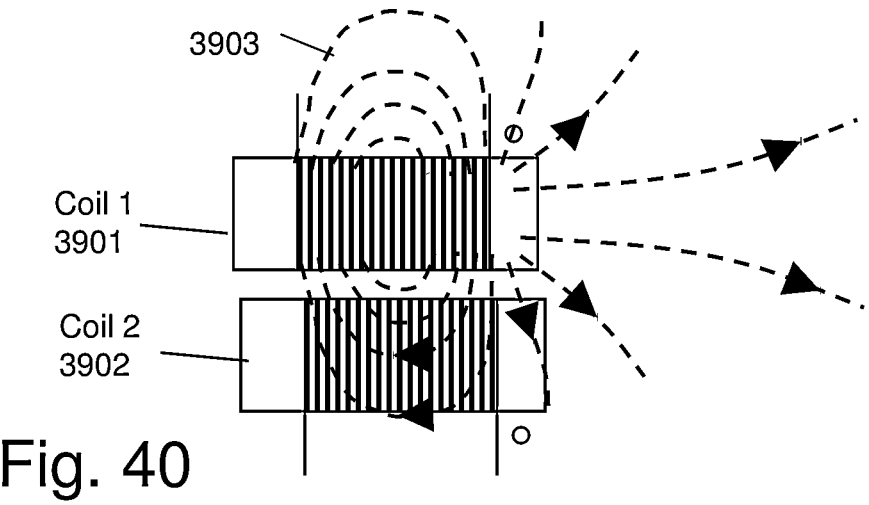
FIG. 40 shows a second strong coupling configuration of two coil elements.

This section provides further clarification on the issues relating to minimum coupling. Minimum coupling is the orientation of two or more coils that yield a null response in close proximity. Neither parallel nor perpendicular axes are either sufficient or necessary for minimum coupling. One may observe FIG. 39 and FIG. 40. FIG. 39 and FIG. 40 show two parallel orientations of maximum coupling. Note the polarity of the output.

FIG. 39 depicts a first strong coupling configuration of two coil elements. In FIG. 39, the field line arrows are toward the dot end of the coil 3902. For reference this may be referred to as positive polarity.

FIG. 40 shows a second strong coupling configuration of two coil elements. Note that in FIG. 40, the field lines are away from the dot end of coil 2 3902. Thus, the output is opposite polarity to that of FIG. 39, or negative polarity.

Figure 41:
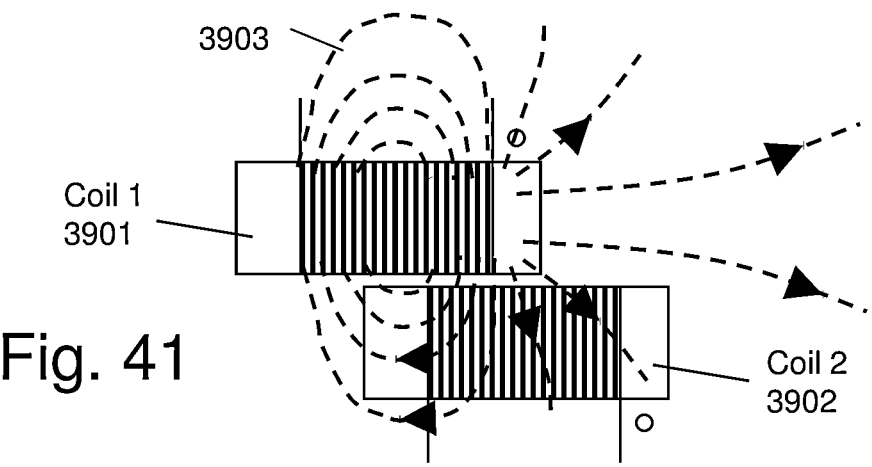
FIG. 41 depicts a first minimum coupling configuration of two coil elements.

FIG. 41 depicts a first minimum coupling configuration of two coil elements. FIG. 41 shows coil 2 3902 shifted to the right from the position in FIG. 40. Note that the field lines through coil 2 3902 are now in both directions. It can be appreciated that a position may be found along coil 2 3902 axis to provide equal coupling to both directions of the field. Such position would be a minimum coupling configuration. Thus perpendicularity is not a necessary requirement for minimum coupling.

Figure 42:
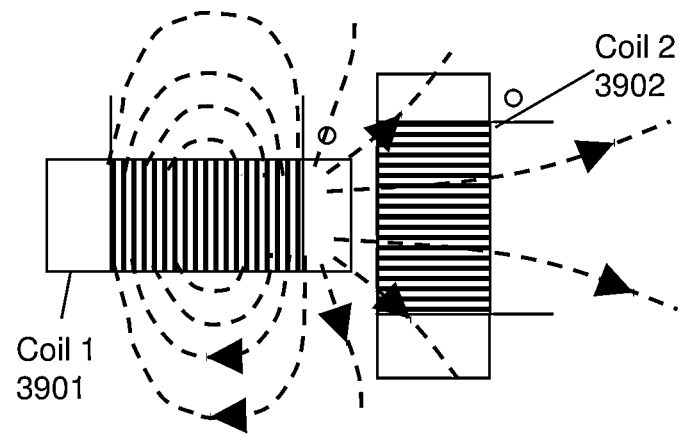
FIG. 42 shows a second minimum coupling configuration of two coil elements.

FIG. 42 shows a second minimum coupling configuration of two coil elements. The two coils are in an intersecting axis perpendicular balanced configuration that is also a minimum coupling configuration. Note that coil 2 3902 receives field lines in both directions equally, thus the coupling is balanced from both polarities and the resulting sum output is zero, thus minimum coupling. Thus, a parallel orientation is not a necessary requirement for minimum coupling.

Figure 43:
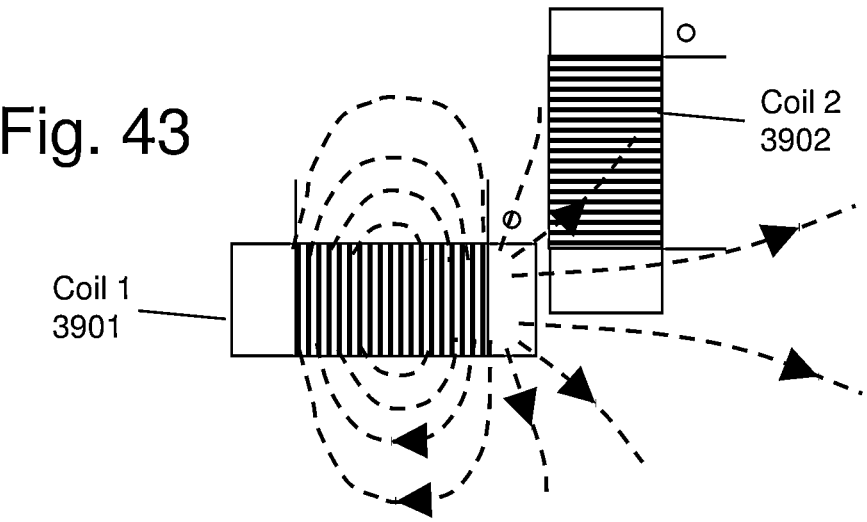
FIG. 43 presents a third strong coupling configuration of two coil elements.

FIG. 43 presents a third strong coupling configuration of two coil elements. Now shift coil 2 3902 vertically as shown in FIG. 43. The field lines are all of the same polarity. Thus the coupling is significant and the configuration is not minimum coupling. Thus perpendicular orientation is not a sufficient requirement for minimum coupling.

Figure 44:
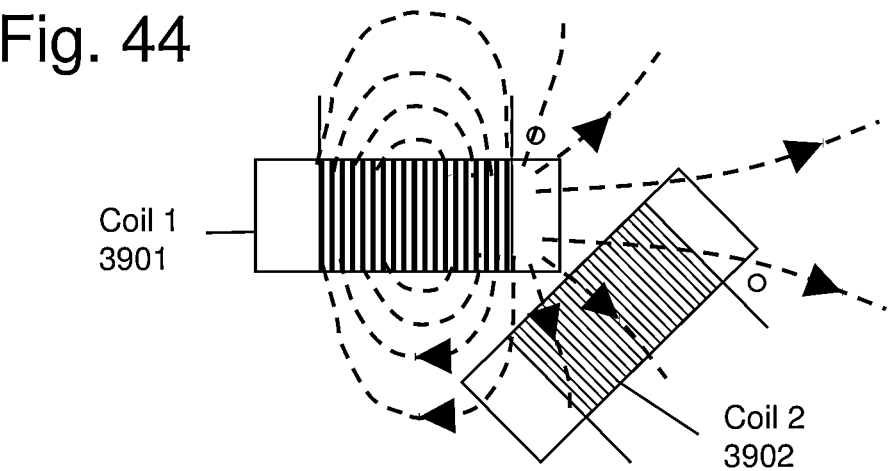
FIG. 44 presents a third minimum coupling configuration of two coil elements.

FIG. 44 presents a third minimum coupling configuration of two coil elements. In FIG. 44, Coil 2 3902 is oriented at a 45 degree angle with respect to coil 3901. Note that the field lines are from both directions. It can be appreciated that a position along the axis line may be found to balance the fields and yield a minimum coupling configuration. Likewise, coil 2 3902 may be moved along coil 2 3902 axis in FIG. 44 to achieve substantial positive polarity coupling or negative polarity coupling.

Thus, in summary, minimum coupling may be achieved at any relative axis angle between coils including parallel and perpendicular and angles in between. Neither parallel nor perpendicular orientation are necessary or sufficient to yield minimum coupling.

Minimum Coupling Configurations

This section presents an arrangement for a minimum coupling array of a plurality of coil elements.

Figure 45A:
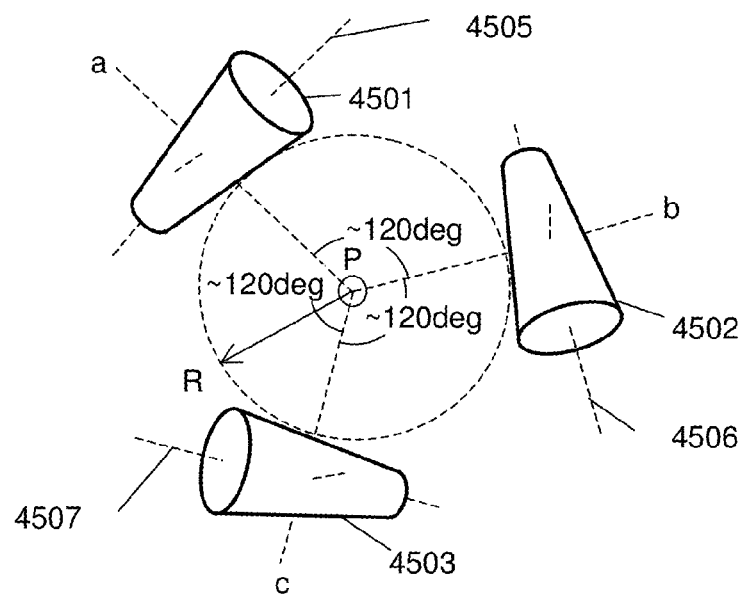
FIG. 45A displays a first "top" view of a minimum coupling arrangement of three coil elements.

FIG. 45A displays a first "top" view of a minimum coupling arrangement of three coil elements. The perspective view of FIG. 45A gives a conical appearance to the cylindrical coils 4501, 4502 and 4503. Three azimuthal axes, "a," "b," and "c" radiate from point "P." Azimuthal axes, "a," "b," and "c" are symmetrically spaced with a 120 degree separation in the common plane. Azimuthal axis "a" passes through the center of first coil element 4501. First coil element 4501 lies tangent to a circle of radius "R" about central locus or point "P." First coil element 4501 is generally aligned along first magnetic axis 4505 which also denotes a magnetic moment vector direction for first coil element 4501.

Azimuthal axis "b" passes through the center of second coil element 4502. Second coil element 4502 lies tangent to a circle of radius "R" about central point "P." Second coil element 4502 is generally aligned along second magnetic axis 4506 which also denotes a magnetic moment vector direction for second coil element 4502.

Azimuthal axis "c" passes through the center of third coil element 4503. Third coil element 4503 lies tangent to a circle of radius "R" about central point "P." Third coil element 4503 is generally aligned along third magnetic axis 4507 which also denotes a magnetic moment vector direction for second coil element 4503.

The geometry of FIG. 45a enforces a mutual symmetry between the elements. Each coil element lies a common distance "R" from a central point "P." Unlike traditional three element orthogonal arrays, each element of the three element array shares a common relation to the other two elements in the array.

Figure 45B:
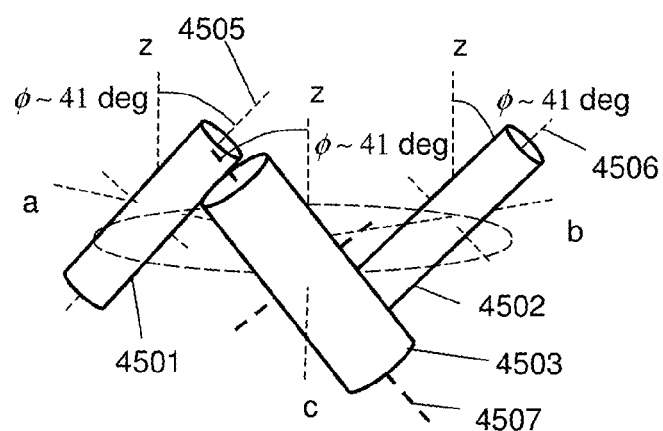
FIG. 45B portrays a second "side" view of a minimum coupling arrangement of three coil elements.

FIG. 45B portrays a second "side" view of a minimum coupling arrangement of three coil elements. Magnetic axes 4505, 4506, 4507 of each element, 4501, 4502, 4503, are rotated about their respective azimuthal axis ("a," "b," and "c," respectively) away from a vertical orientation by a common angle $\varphi$. Use of terms like "vertical" or "azimuthal" are intended as an aid to the reader in understanding the relative geometry involved and should not be taken as limiting the invention to use only in a particular orientation.

There exists an angle $\varphi$ at which the magnetic moment $M_i$ of the ith coil is orthogonal to the magnetic field $H_j$ of the jth coil, or expressed mathematically:

$$H_j \cdot M_i = 0 \tag{5}$$

Thus, the magnetic field vector of each coil element is arranged so as to be orthogonal to the magnetic moment vector of any other coil element. This condition guarantees minimum coupling. The angle $\varphi$ at which $H_j \cdot M_i = 0$ may be determined analytically, through simulation, or through trial and error. The exact value depends upon the details of the implementation, particularly the radial dimension "R" and the dimension of the coil elements. In typical implementations, however, the angle $\varphi$ at which $H_j \cdot M_i = 0$ has been on the order of 41 degrees.

Minimum coupling is advantageous because it means that the functioning of each element does not interfere with the functioning of any other element. A minimum coupling condition represents a local minimum given other constraints such as the overall dimension of an antenna array. Coupling may be reduced further by increasing separation between elements, by employing ferrite loading to better concentrate magnetic fields, and potentially by employing shielding materials. Note that substantial isolation between coils may be achieved in the neighborhood of a minimum coupling configuration.

Three coil elements are particularly advantageous because use of three coil elements enables a minimum coupling antenna array to sample all components of an incident magnetic field, even if the elements and their corresponding magnetic axes are not purely orthogonal. In alternate embodiments, one could employ two elements arranged along azimuthal axes 180 degrees apart whose magnetic axes are rotated 45 degrees with respect to vertical. In such a configuration, the coil elements are both orthogonal and in a minimum coupling configuration.

Three Element Minimum Coupling Configurations

Figure 46A:
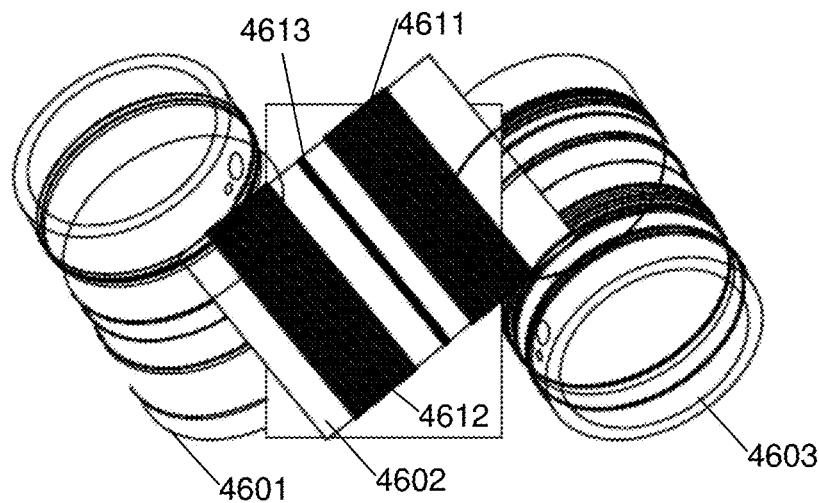
FIG. 46A displays a first "side" view of a minimum coupling three coil element array.

FIG. 46A displays a first "side" view of a preferred embodiment minimum coupling three coil element array. Preferred embodiment minimum coupling three coil element array includes first coil element 4601, second coil element 4602, and third coil element 4603. In a preferred embodiment, a coil element, like second coil element 4602, comprises primary turns 4611 and 4612 and secondary or coupling turns 4613.

Figure 46B:
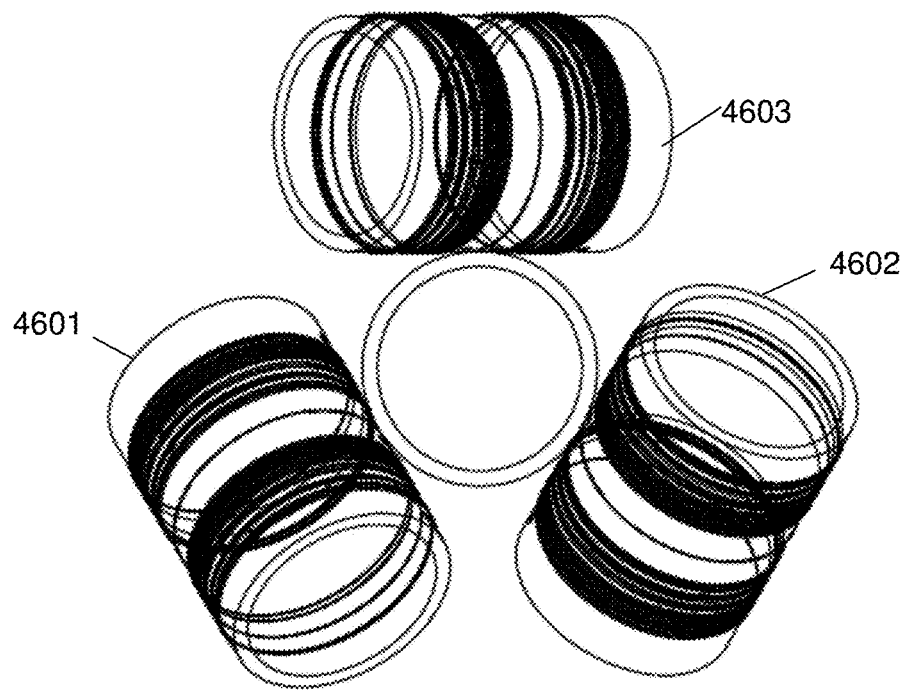
FIG. 46B portrays a second "top" view of a minimum coupling three coil element array.

FIG. 46B portrays a second "top" view of a minimum coupling three coil element array. A coil element is a magnetic antenna comprising a plurality of conducting loops through which incident changes in magnetic flux induce a detectable voltage fluctuation. Coil elements may further comprise means for tuning, such as parallel or series tuning capacitors or varactors, coupling means such as inductive or capacitive transformers, and a form or structure around which a plurality of conducting loops may be wound or otherwise supported.

Three Axis Symmetrical Skew Orthogonal Antenna System with Isolation

Figure 47A:
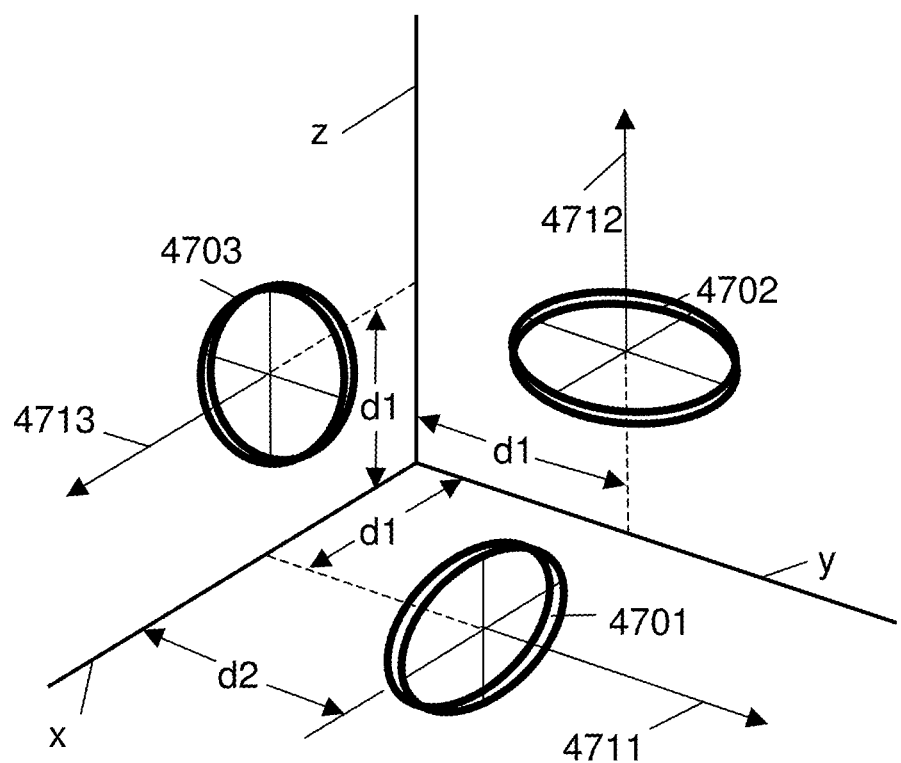
FIG. 47A illustrates an exemplary three axis symmetrical skew orthogonal antenna system with isolation from each element to each of the other two elements.
Figure 47B:
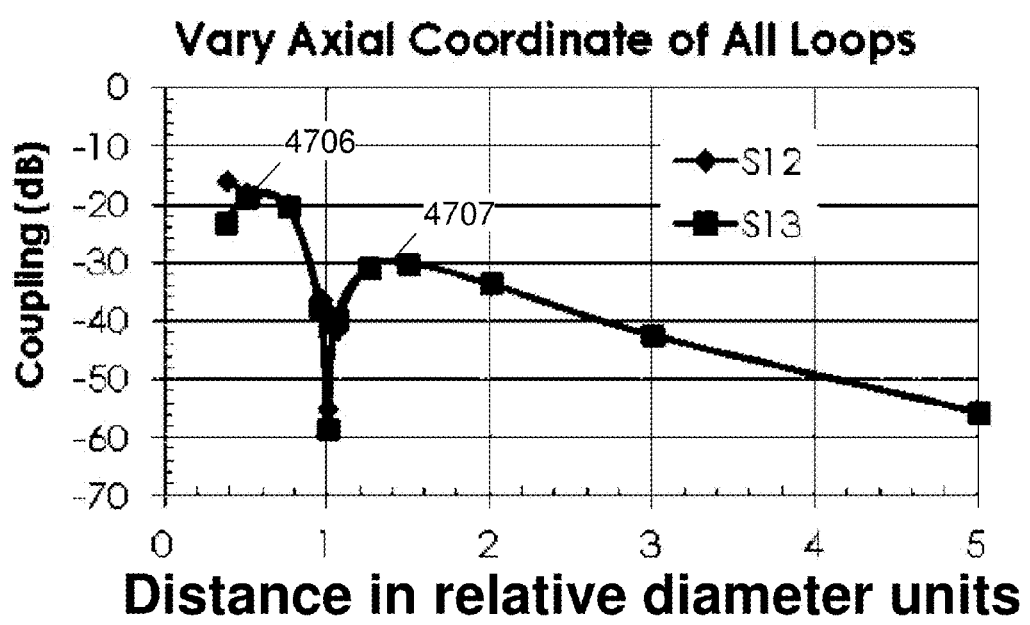
FIG. 47B shows a plot of the cross coupling between two coils of FIG. 47A as a function of distance d2.

FIG. 47A illustrates an exemplary three axis symmetrical skew orthogonal antenna system with isolation from each element to each of the other two elements. FIG. 47A and FIG. 47B further illustrate the adjustment of a second distance parameter simultaneously for each antenna element and the isolation achieved as a function of the second distance parameter. Referring to FIG. 47A, FIG. 47A a shows coil 4701, coil 4702, and coil 4703 in relation to reference coordinate axes including an x, y and z axis in an x-y-z sequence, having an origin at the intersection of the x, y, and z axes. (Alternatively, a left hand coordinate sequence may be used.) Coil 4701 is associated with the x axis and is located by locating the center of coil 4701 at x coordinate d1 and y coordinate d2 in the x-y plane, i.e., z=0. Similarly, coil 4702 is associated with the y axis and is located by locating the center of the coil 4702 at y coordinate d1 and z coordinate d2 in the y-z plane. Similarly, coil 4703 is associated with the z axis and is located by locating the center of the coil 4703 at z coordinate d1 and x coordinate d2 in the z-x plane. Thus, each coil is associated with a respective axis and is located by a distance d1 along the respective axis and a distance d2 along the next axis in sequence. The coil magnetic axis is aligned parallel to the respective next sequential axis. Each coil location is defined by a center of each coil, a point along the coil magnetic axis at the center of the coil length dimension. The coil diameter is defined by the average of the inside and outside diameters of the coil.

From FIG. 47A, it may be observed that the three magnetic axes are skew orthogonal, i.e., non intersecting and orthogonal in direction. Note that the three magnetic axes indicated by 4711, 4712 and 4713 do not intersect. (Arrows 4711, 4712 and 4713 indicate both the path of movement of the coils and the direction of the magnetic vector.) The closest approach is one diameter (as shown, d1=d2=coil diameter); yet the directions are orthogonal, e.g., the direction vector for magnetic axis 4711 is [0,1,0], and for magnetic axis 4712 is [0,0,1]. The dot product is zero. Thus, the two axes are orthogonal. The other two pairs 4712, 4713 and 4713, 4711 also result in a zero dot product.

Alternatively, an equivalent system for d1=d2=d may be constructed by using d1=d and d2=0, where d is the diameter of each of the coils. Each coil is positioned at distance d1 from the origin and each coil axis is positioned parallel to the next axis in sequence. Where d1 is not one diameter, the coils may be shifted along each respective axis to find a minimum or point of desired decoupling (isolation).

Skew orthogonal means the coils have orthogonal magnetic axes that do not intersect and are orthogonal in direction.

The directions of each coil axis are expressed as a normalized (i.e., magnitude of 1) direction vector in Cartesian coordinates. The scalar product (dot product) between any two coil normalized direction vectors should be less than 0.25, preferably less than 0.10, more preferably less than 0.05, ideally zero.

Each axis should be skewed to not intersect with each other axis, and should be skewed for closest approach to each other axis by more than ½ diameter of each coil. In one variation, the closest approach of the axes may be close to one diameter from one another, preferably within ¼ diameter of equal to one diameter of each coil.

The magnetic field vector associated with coil 4701 is orthogonal to magnetic moment vector direction 4713 of coil 4703. The magnetic field vector associated with coil 4701 is also orthogonal to magnetic moment vector direction 4712 of coil 4702. Thus Coil 4701 is in a minimum coupling orientation with respect to coil 4703 and coil 4702. The magnetic field vector associated with coil 4702 is orthogonal to magnetic moment vector direction 4713 of coil 4703. The magnetic field vector associated with coil 4702 is also orthogonal to magnetic moment vector direction 4711 of coil 4701. Thus Coil 4702 is in a minimum coupling orientation with respect to coil 4703 and coil 4701. The magnetic field vector associated with coil 4703 is orthogonal to magnetic moment vector direction 4711 of coil 4701. The magnetic field vector associated with coil 4703 is also orthogonal to magnetic moment vector direction 4712 of coil 4702. Thus Coil 4703 is in a minimum coupling orientation with respect to coil 4701 and coil 4702.

FIG. 47B shows a plot of the cross coupling between two coils of FIG. 47A as a function of distance d2. Because of the symmetry, the cross coupling between any two coils is the same. Note, all coils are moved as a function of d2, which maintains symmetry for variations in d2. d2 is a parameter defining the configuration and FIG. 47B shows the cross coupling as a function of the configuration variable d2. FIG. 47B is derived from a simulation. Note that the coils are modeled as single turn loops for simulation simplicity. For the simulation d1 is equal to the diameter of the loop (side to side distance of the hexagon). Coupling is plotted as a function of d2 in diameters. Note that at one diameter (d2=1), a deep null is observed, −60 dB. Each point plotted on either side is much higher coupling, −38 and −41 dB. Thus, the point at one diameter is a local minimum of the cross coupling, i.e., minimum coupling. Also, points within the notch, from peak point 4706 to peak point 4707 achieve a degree of minimal coupling, alternatively referred to as a degree of isolation.

The deep null at d2=1 indicates the configuration is a minimum coupling configuration. The magnetic field vector associated with coil 4701 is orthogonal to magnetic moment vector direction 4713 of coil 4703. The magnetic field vector associated with coil 4701 is also orthogonal to magnetic moment vector direction 4712 of coil 4702. Thus Coil 4701 is in a minimum coupling orientation with respect to coil 4703 and coil 4702. The magnetic field vector associated with coil 4702 is orthogonal to magnetic moment vector direction 4713 of coil 4703. The magnetic field vector associated with coil 4702 is also orthogonal to magnetic moment vector direction 4711 of coil 4701. Thus Coil 4702 is in a minimum coupling orientation with respect to coil 4703 and coil 4701. The magnetic field vector associated with coil 4703 is orthogonal to magnetic moment vector direction 4711 of coil 4701. The magnetic field vector associated with coil 4703 is also orthogonal to magnetic moment vector direction 4712 of coil 4702. Thus Coil 4703 is in a minimum coupling orientation with respect to coil 4701 and coil 4702.

It may be appreciated from FIG. 47A that all coils are orthogonal in direction for all values of d2. The structure remains triply symmetric for all values of d2. A range of values of d2 provide significant decoupling between the local peaks 4706 and 4707 and substantial decoupling at 10 dB below the maximum coupling achievable at that distance. Significant minimal coupling may also be bounded by, for example 10% or 20% of the distance d2 that gives peak performance (e.g. 10%: d2=0.9 to 1.1).

Note that a distance other than one diameter may be chosen for d1 and the simulation or physical measurement may be used in accordance with FIG. 47A to find the range of d2 having the desired level of minimal coupling for a given application. Similarly, other shapes, including complex shape coils including but not limited to solenoidal or ferrite loopsticks may be may be set up in accordance with FIG. 47A to find the range d2 for a given d1 that provides suitable minimal coupling (isolation). See FIG. 59 and FIG. 60A through FIG. 60C for an example of a loopstick mag element whose minimum coupling dimensions could be found using this method.

The configuration shown in FIG. 47A is triply rotationally symmetric about an axis of symmetry defined by x=y=z. The system may be rotated 120 degrees one or more time about the axis of symmetry and achieve an equivalent system.

Figure 48A:
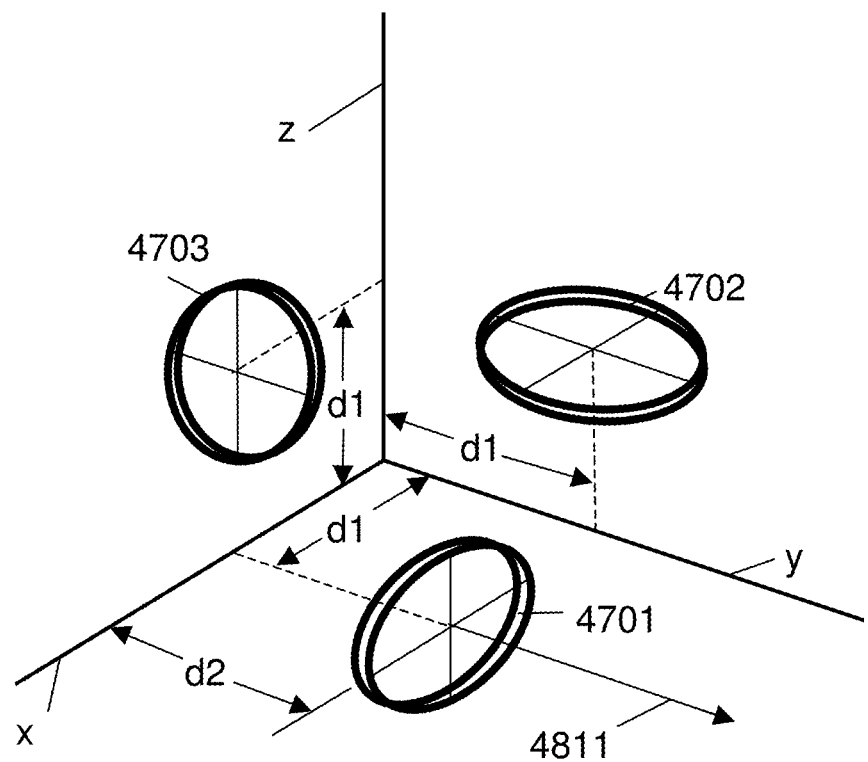
FIG. 48A illustrates the exemplary system of FIG. 47A wherein only one antenna is moved along the magnetic axis.

FIG. 48A illustrates the exemplary system of FIG. 47A wherein only one antenna is moved along the magnetic axis. Referring to FIG. 48A, antenna 4701 is shown with a path for adjusting the coil position. Antenna elements 4702 and 4703 are held at positions [0,1,1] and [1,0,1] respectively (representing [x, y, z] coordinates in units of diameter).

Figure 48B:
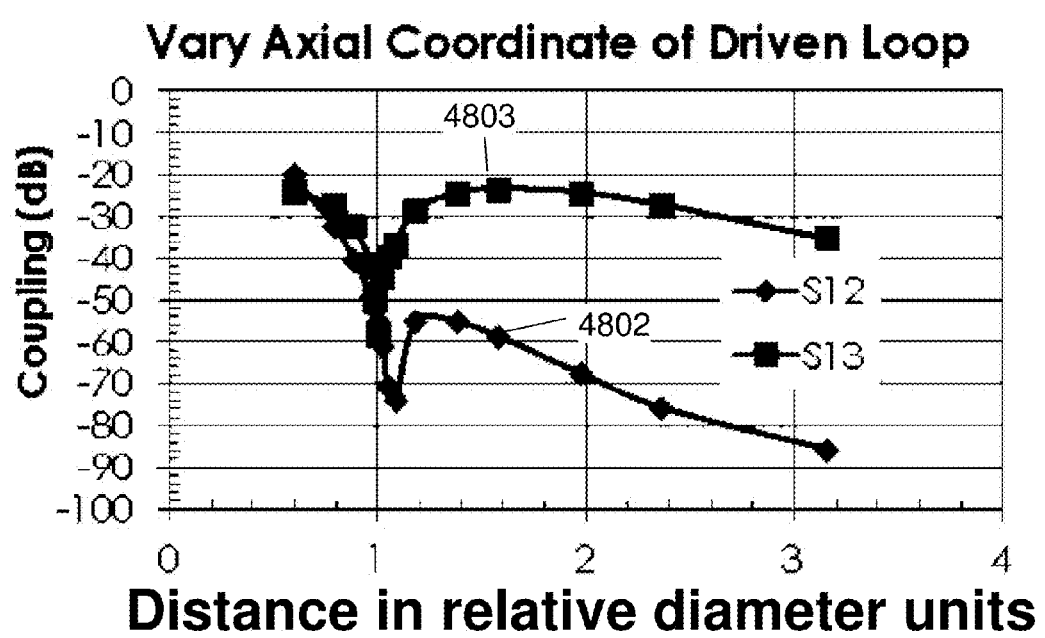
FIG. 48B shows a graph of antenna mutual coupling of FIG. 48A between the moved antenna and the two fixed antennas.

FIG. 48B shows a graph of antenna mutual coupling of FIG. 48A between antenna 4701 and 4702 (graph 4802) and between antenna 4701 and 4703 (graph 4803) as antenna element 4701 is moved parallel to the y axis. Antenna 4701 is varied at position [1,y,0]. Attenuation is shown as a function of the y coordinate of the antenna 4701 position. Note also that a null is observed around y=1 diameter. It may be appreciated that significant attenuation may be found between plus and minus twenty percent from the maximum attenuation, preferably between plus and minus ten percent. Null attenuation may also be compared with attenuation from a maximum attenuation between the same coils at the same distance achievable by rotating the coils in place. The minimum coupling should achieve at least ten dB attenuation compared with maximum coupling. Careful positioning may achieve −15 dB, −20 dB, −30 dB, −60 dB coupling or better compared with the coupling of a maximum coupling configuration with the same antenna distance.

Figure 49A:
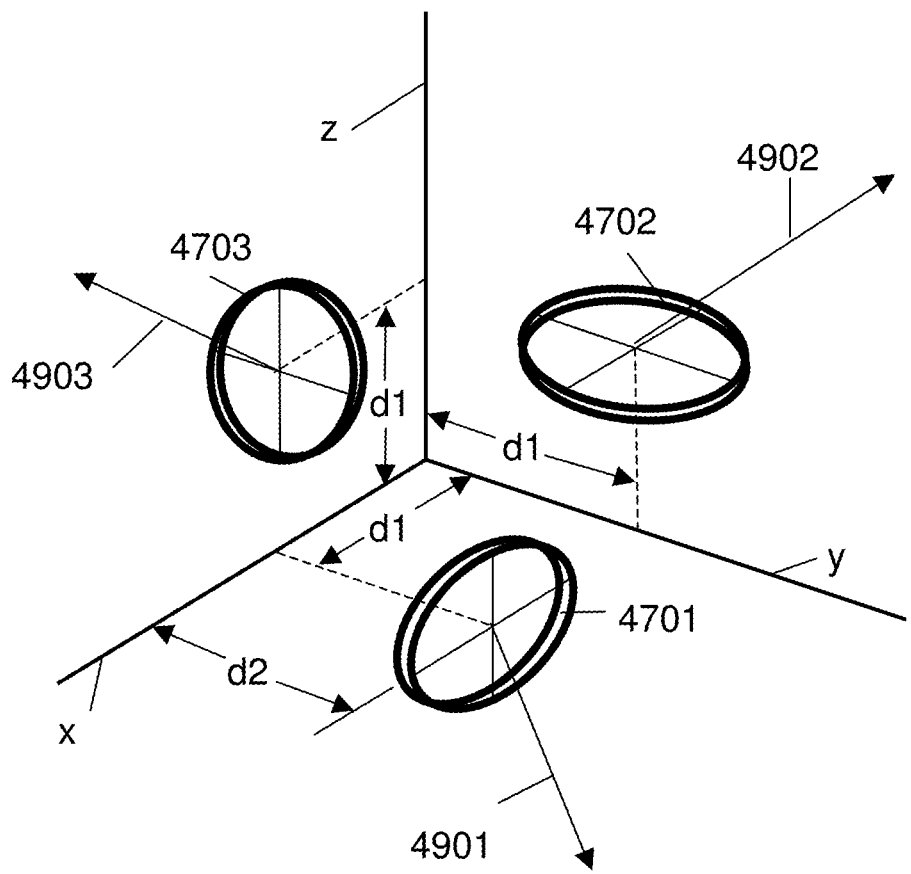
FIG. 49A illustrates the exemplary system of FIG. 48A wherein the system is varied by moving all coils away from the origin in their respective planes

FIG. 49A illustrates the exemplary system of FIG. 48A wherein the system is varied by moving all coils away from the origin in their respective planes, e.g. coil 4701 is moved keeping the coil center in the xy plane by moving along line 4901 defined by x=y, z=0. Coils 4702 and 4703 are also moved in their respective planes along respective lines 4902 and 4903, where d1=d2, thus preserving both orthogonality and symmetry of coils 4701, 4702, and 4703.

Figure 49B:
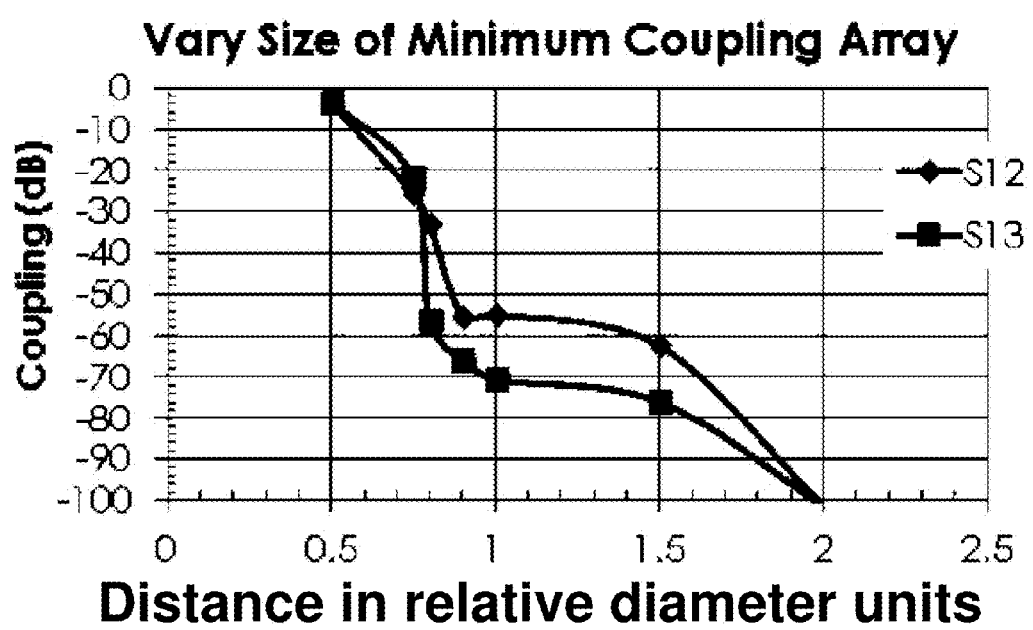
FIG. 49B shows the attenuation as a function of x, where all coils are moved equally and symmetrically as shown in FIG. 49A FIG. 50 and FIG. 51 show the three antennas of FIG. 47A in conjunction with a reference cube for alternate visualization.

FIG. 49B shows the attenuation as a function of x, where all coils are moved equally and symmetrically as shown in FIG. 49A. Note that where x equals the diameter (x=1), the familiar attenuation of FIG. 47B is achieved. As x increases, the greater distance between coils further increases the attenuation. Here again, a distance separation of d1=d2=coil diameter appears close to optimal, providing very low mutual coupling. Distance separation should be increased past 1.5 coil diameter to capture an appreciable decrease in mutual coupling.

Figure 50:
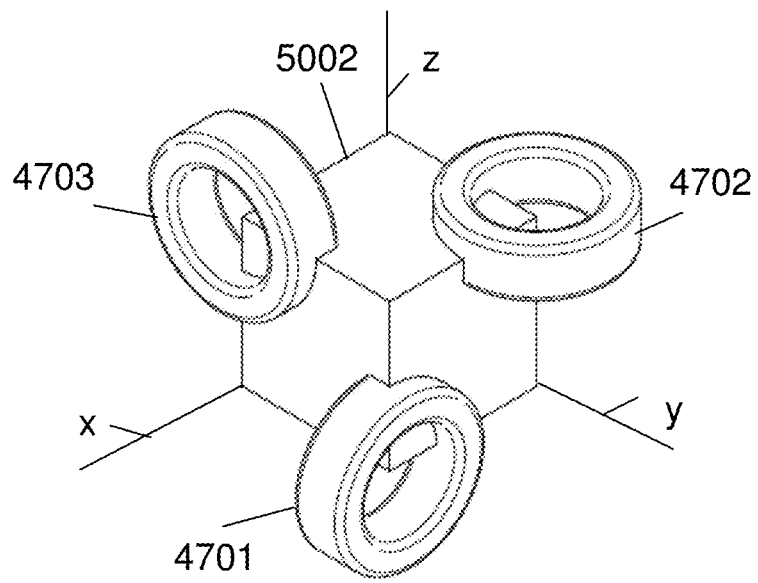
Figure 51:
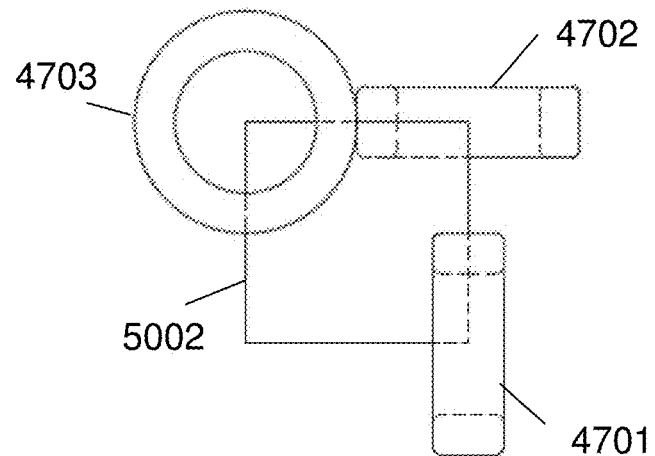

FIG. 50 and FIG. 51 show the three antennas of FIG. 47A in conjunction with a reference cube for alternate visualization. FIG. 50 shows an exemplary isometric view of a (d1=d2=coil diameter) construction. A reference cube with sides equal to the coil diameter may provide visual cues to help visualize the arrangement. In one embodiment, the cube may be fabricated as a coil holder.

FIG. 51 is a top view of the arrangement of FIG. 50. FIG. 51 shows clearly the mutual orthogonality of the direction of the coil axes. Coil relationship to cube vertices and cube faces is also apparent.

Figure 52:
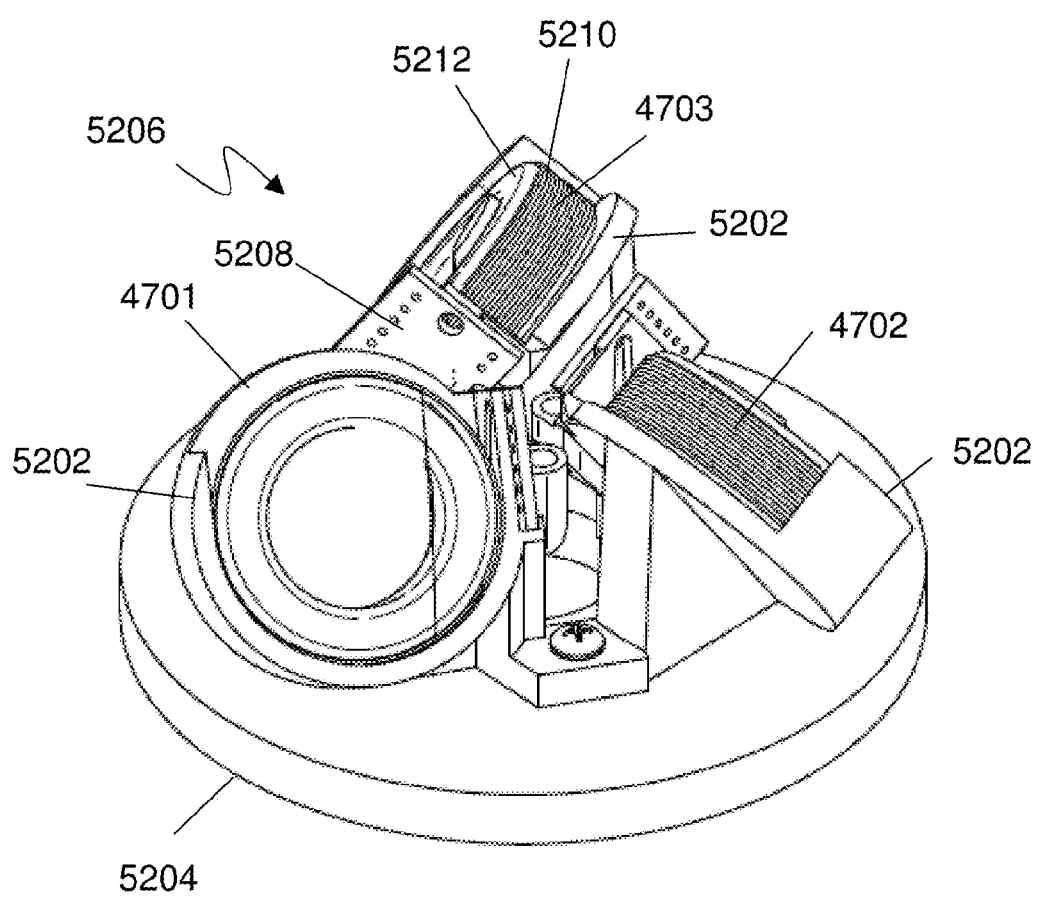

FIG. 52, FIG. 53 and FIG. 54 illustrates an exemplary three axis antenna system including antenna element holder system for a skew orthogonal tri-symmetric antenna system.

FIG. 52 shows an isometric view of an exemplary composite antenna holder 5206 with three antenna elements. The composite antenna holder is shown mounted to an optional mounting plate 5204. The composite holder 5206 comprises three single core holders 5202 mounted together in an assembly. Each single holder comprises a slanted cup attached to a mounting surface by mounting tabs. The cup forms a partial cylindrical recess configured to hold an antenna element. The cup is open on one end and closed on the other. The side of the cylinder has an opening. Each antenna element comprises a coil 5210 wound around the perimeter of a cylindrical torroidal core 5212. The core 5212 may alternatively be a solid "hockey puck" cylindrical core; however, the center may be hollow as shown to reduce weight and material without substantial performance impact, since the core material proximal to the winding has the most effect. The side of the cylinder has a flat for optional mounting of a circuit board 5208 for mounting components and connecting to the coils.

FIG. 53 shows top view of the antenna holder and system of FIG. 52. FIG. 53 shows the triply symmetric arrangement. Note also the overlapping of the mounting tabs and sharing of mounting screws 5302.

FIG. 54 shows a side view of the antenna holder of FIG. 52. The side view shows clearly the narrow space (thickness dimension 5402) needed for the configuration. The narrow profile may be easily added to an electronics package to yield a complete device, for example, a location tag, communications transceiver, or other device.

Figure 55:
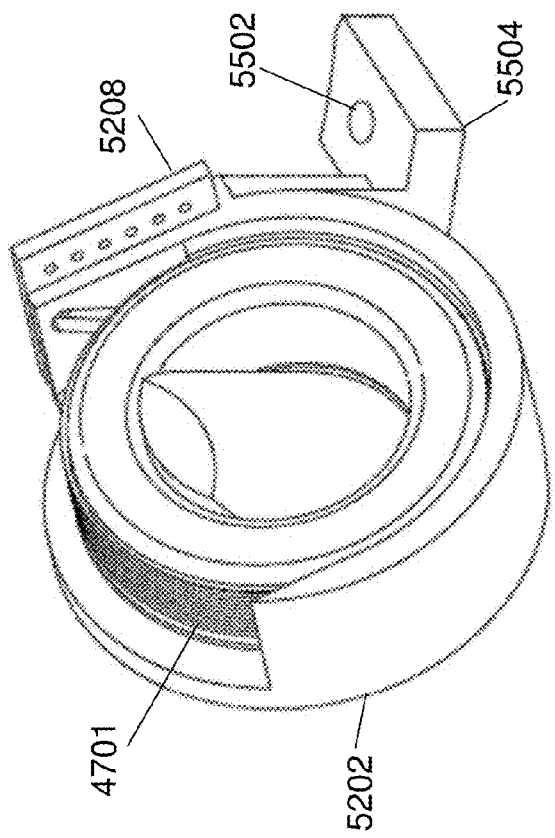
FIG. 55 shows an isometric view of an individual antenna element and holder of FIG. 52.

FIG. 55 shows an isometric view of an individual antenna element and holder of FIG. 52. FIG. 55 shows an exemplary antenna element 4701 and exemplary antenna element holder 5202. The antenna holder is configured to be one of three identical holders to form a triple antenna pattern of FIG. 52. The antenna holder includes a cradle for holding the antenna element, and two mounting tabs 5504 having mounting holes 5502. A face for mounting a circuit board 5208 is also provided. A wire guide 5506 may be provided. Alternatively 5506 may be used as a mounting tab. The circuit board 5208 may include tuning components, interface components, driver or receiver components as desired. The antenna holder is arranged with an open top side to allow insertion of the coil and to allow molding the part with a two part mold tool for economy.

Figure 56C:
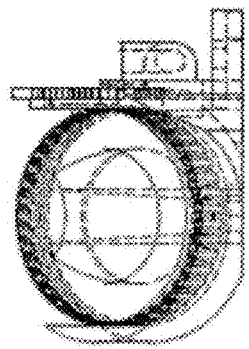
FIG. 56A, FIG. 56B, and FIG. 56C show a top, front and side view respectively of the antenna element holder of FIG. 55.
Figure 56A:
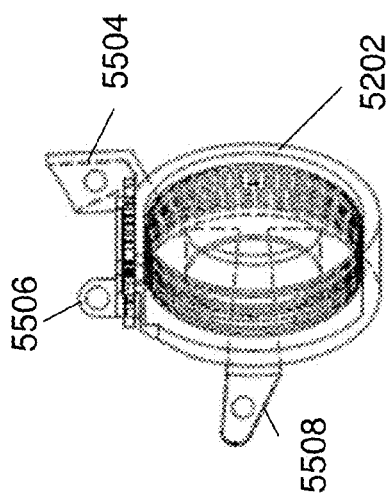
Figure 56B:
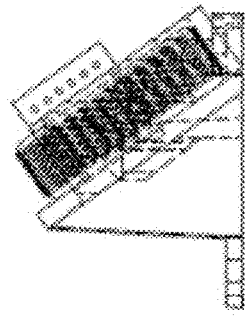

FIG. 56A through FIG. 56C show a top, front and side view of the antenna element holder of FIG. 55. Referring to FIG. 56A, the mounting tabs 5504, 5508 are arranged for sharing a mounting screw with adjacent coil holders. (See also FIG. 53 5302.) Thus, a first mounting tab 5508 is for mounting flush with the face of the mounting surface. The second tab 5504 is configured to fit over the first mounting tab of the other coil holder. The second tab 5504 may also have a rim that contacts the mounting surface.

The mounting structure of FIG. 55 has a number of advantages. First, because it allows an array to be assembled from three smaller parts, it may be manufactured using a smaller and therefore less expensive tool. Second, it allows an individual antenna element to be assembled, tuned, and tested before assembly, making the array assembly easier. Third, if a problem develops in an individual antenna element, it may be replaced without having to replace the entire array.

Figure 57:
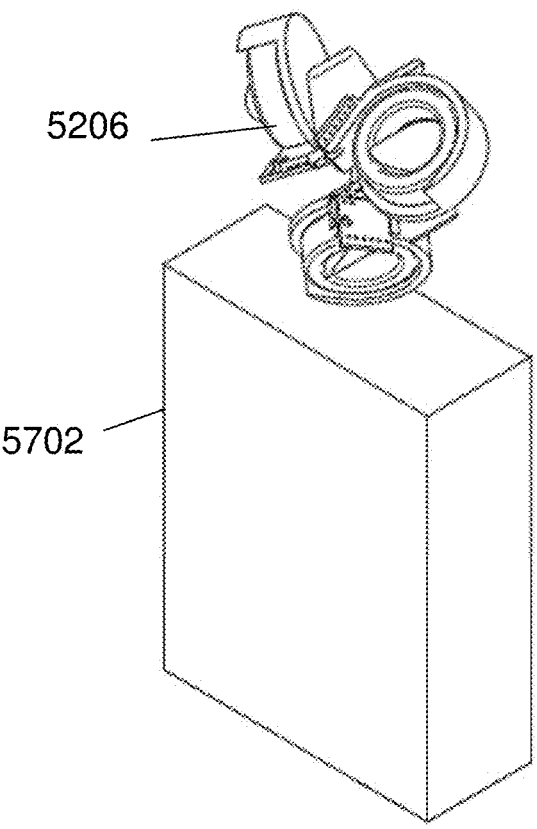
FIG. 57 depicts an exemplary electronic device with the antenna system extending the length.

FIG. 57 depicts an exemplary electronic device with the antenna system extending the length. FIG. 57 shows an electronic device 5702 with a length, width, and thickness. The three element antenna 5206 is shown extending the length (mounting details not shown.) Note that the thickness dimension of the antenna structure (height of FIG. 54 as shown on the page) allows the overall package to have an efficient thickness dimension, which can be significant for portable devices, communication devices, location tags, RFID tags, and other small devices.

Figure 58:
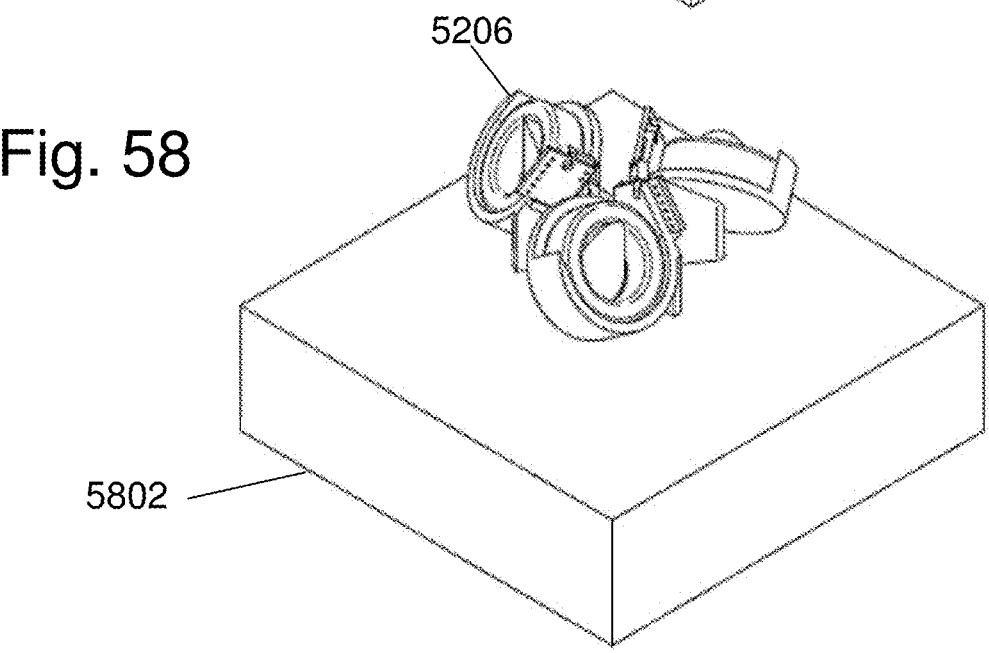
FIG. 58 depicts an exemplary electronic device with the antenna system extending the width.

FIG. 58 depicts an exemplary electronic device 5802 with the antenna system extending the width. Note that the efficient thickness dimension of the antenna system permits minimal extension of the thickness of an electronics package. Numerous other configurations may be used, including embedded configurations, each taking advantage of the efficient narrow thickness dimension of the antenna system.

Figure 59:
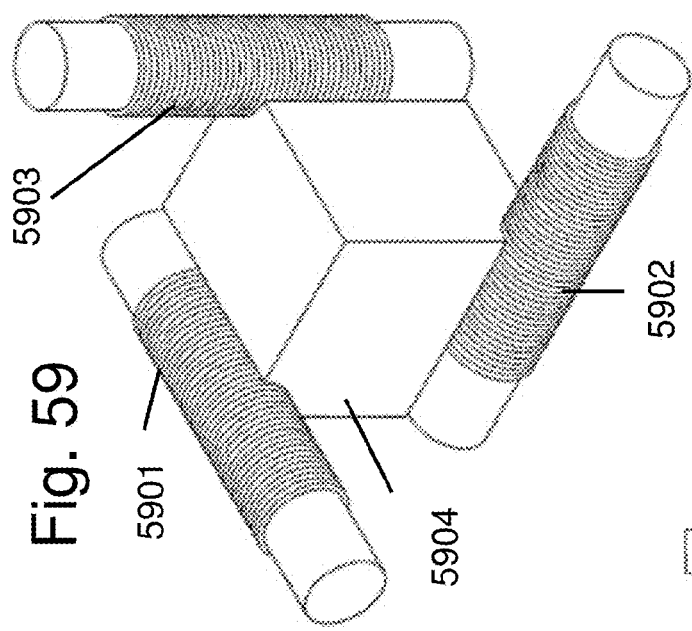
FIG. 59 illustrates an isometric view of exemplary loopstick variation of the three axis antenna system of FIG. 47A.

FIG. 59 illustrates an isometric view of exemplary loopstick variation of the three axis antenna system of FIG. 47A. Referring to FIG. 59, three loopstick antenna elements 5901, 5902, 5903 are located at distances d1 and d2 as described with respect to FIG. 47A. A reference cube 5904 is shown to aid in visualizing the locations. (See also FIG. 50) The loopstick coils may optionally have a ferrite core. Antenna elements with a high length to diameter ratio, greater than for example 1:1, may require analysis or experiment to determine the exact d2 value that yields the best minimum coupling value for a given d1. (See FIG. 47A.)

Figure 60C:
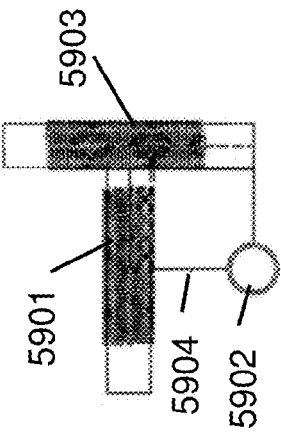
FIG. 60A, FIG. 60B, and FIG. 60C illustrate a top, front, and side view of the loopstick variation of FIG. 59.
Figure 60A:
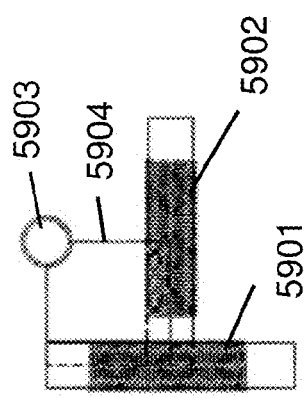
Figure 60B:
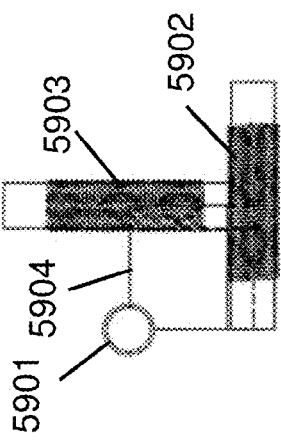

FIG. 60A, FIG. 60B, and FIG. 60C illustrate a top, front, and side view of the loopstick variation of FIG. 59. FIG. 60A through FIG. 60C further illustrate the three axis symmetry and equivalence of the symmetrical views.

Utilizing the Three Axis Antenna System.

In one embodiment, the three axis system (FIG. 47A) may be implemented with the antennas aligned with the coordinates of the environment, i.e., parallel or perpendicular to vertical and horizontal directions. For example, the x 4701 and z 4703 antennas may be aligned as in FIG. 5 antennas 405 and 404. The y antenna 4702 may be used to measure any vertical component of the field for completeness and for measuring tilt in the system.

Alternatively the antennas may be oriented as shown in FIG. 57 or FIG. 58, for example mounted on the top of an electronics module. In FIG. 57 and FIG. 58, the antennas are diagonal to the vertical and horizontal lines of the environment. In the diagonal orientation, signals may be rotated to and from the environment coordinates to the antenna coordinates by vector rotation of the signal components.

Applications

Minimum coupling antenna arrays have a variety of applications, including use in Multiple Input Multiple Output (MIMO) antenna arrays or in field sensing probes that aim to measure all three orthogonal field components. Another important application is in systems that must act in an orientation independent fashion. Low-frequency, near-field wireless systems also benefit from such antennas. These systems include, but are not limited to, Near-Field Communications (NFC), certain Radio-Frequency Identification (RFID) applications, and Near-Field Electromagnetic Ranging (NFER).

A variety of applications are possible for the present invention, but one of particular interest is application in real-time locations systems. Real-time location system (RTLS) devices track an object's movement and measure the object's location to sufficient accuracy to identify the position of the object within the correct bin or region in the storage area or elsewhere. An important sub-set of RTLS use active wireless devices. Active RTLS may employ 2.4 GHz signals (for instance, Wi-Fi®, Bluetooth®, or ZigBee®), optical, IR, or laser signals, acoustic signals, ultra-wideband (UWB) signals, near-field signals, or other wireless signals. Active RTLS methods may include time-of-flight, time-difference-of-arrival, Received Signal Strength Indicator (RSSI), multilateration, line-of-sight, direction finding, radar, RF fingerprinting, or other methods.

Incumbent location providers typically take high frequency, short wavelength wireless systems, like Wi-Fi or UWB, that were optimized for high data rate communications, and they try to use them to solve the challenging problem of indoor wireless location. But location and communication are two fundamentally different problems requiring fundamentally different solutions, particularly in the most challenging RF propagation environments.

Applicants have pioneered a solution. NFER® technology offers a wireless physical layer optimized for real-time location in the most RF hostile settings. NFER® systems exploit near-field behavior within about a half wavelength of a tag transmitter to locate a tag to an accuracy of 1-3 ft, at ranges of 60-200 ft, all at an infrastructure cost of $0.50/sqft or less for most installations. NFER® systems operate at low frequencies, typically around 1 MHz, and long wavelengths, typically around 300 m.

Low frequency signals penetrate better and diffract or bend around the human body and other obstructions. This physics gives NFER® systems long range. There's more going on in the near field than in the far field. Radial field components provide the near field with an extra (third) polarization, and the electric and magnetic field components are not synchronized as they are for far-field signals. Thus, the near field offers more trackable parameters. Also, low-frequency, long-wavelength signals are resistant to multipath. This physics gives NFER® systems high accuracy. Low frequency hardware is less expensive, and less of it is needed because of the long range. This makes NFER® systems more economical in more difficult RF environments.

One application of particular interest is in Near-Field Electromagnetic Ranging (NFER). NFER was first fully described in applicant's "System and method for near-field electromagnetic ranging" (Ser. No. 10/355,612, filed Jan. 31, 2003, now U.S. Pat. No. 6,963,301, issued Nov. 8, 2005). This application is incorporated in entirety by reference. Some of the fundamental physics underlying near field electromagnetic ranging was discovered by Hertz [Heinrich Hertz, Electric Waves, London: Macmillan and Company, 1893, p. 152]. Hertz noted that the electric and magnetic fields around a small antenna start 90 degrees out of phase close to the antenna and converge to being in phase by about one-third to one-half of a wavelength. This is one of the fundamental relationships that enable near field electromagnetic ranging. A paper by one of the inventors [H. Schantz, "Near field phase behavior," 2005 IEEE Antennas and Propagation Society International Symposium, Vol. 3A, 3-8 Jul. 2005, pp. 237-240] examines these near-field phase relations in further detail. Link laws obeyed by near-field systems are the subject of another paper [H. Schantz, "Near field propagation law & a novel fundamental limit to antenna gain versus size," 2005 IEEE Antennas and Propagation Society International Symposium, Vol. 3B, 3-8 Jul. 2005, pp. 134-137]. In addition to an active RTLS tag (or fixed locator—mobile beacon) architecture, the teachings of U.S. Pat. No. 6,963,301 encompass a passive location tag (or fixed beacon—mobile locator) architecture. In this architecture, the passive location tag (or passive RTLS tag) is a receiver that may be incorporated or associated with a vehicle or person to provide position information from signals emitted by fixed transmit beacons. A beacon may be an uncooperative source of electromagnetic radiation, like a signal from an AM broadcast station or other signal-of-opportunity. In the sense taught by Applicants, a "passive RTLS tag" is passive in the sense that it does not emit signals in the process of obtaining location data, rather it receives and characterizes signals so as to determine location of an associated mover. Determination of location may be performed either locally (within the passive RTLS tag) or remotely (by conveying signal characterization data to a remote server for location determination).

Complicated propagation environments do tend to perturb the near-field phase relations upon which NFER® systems rely. Applicants have overcome this problem using calibration methods described in "Near-field electromagnetic positioning system and method" (Ser. No. 10/958,165, filed Oct. 4, 2004, now U.S. Pat. No. 7,298,314, issued Nov. 20, 2007). Additional calibration details are provided in applicant's "Near-field electromagnetic positioning calibration system and method" (Ser. No. 11/968,319, filed Nov. 19, 2007, now U.S. Pat. No. 7,592,949, issued Sep. 22, 2009). Still further details of this calibration are provided in applicant's copending "Near-field electromagnetic calibration system and method" (Ser. No. 12/563,960 filed Sep. 21, 2009, now U.S. Pat. No. 7,859,452, issued Dec. 28, 2010).

Applicant's unique algorithms enable innovative techniques for displaying the probability density and other aspects of location information, as described in applicant's "Electromagnetic location and display system and method,"

(Ser. No. 11/500,660, filed Aug. 8, 2006, now U.S. Pat. No. 7,538,715, issued May 26, 2009).

Further, the phase properties of near-field signals from orthogonal magnetic and other multiple antenna near-field transmission signals enable additional phase comparison states that can be used for location and communication, as described in applicant's co-pending "Multi-state near-field electromagnetic system and method for communication and location," (Ser. No. 12/391,209, filed Feb. 23, 2009, now U.S. Pat. No. 8,253,626 issued Aug. 28, 2012).

Near-field electromagnetic ranging is particularly well suited for tracking and communications systems in and around standard cargo containers due to the outstanding propagation characteristics of near-field signals. This application of NFER® technology is described in applicant's "Low frequency asset tag tracking system and method," (Ser. No. 11/215,699, filed Aug. 30, 2005, now U.S. Pat. No. 7,414,571, issued Aug. 19, 2008).

Applicants have also discovered that near-field electromagnetic ranging works well in the complicated propagation environments of nuclear facilities and warehouses. An NFER® system provides the RTLS in a preferred embodiment of applicants' co-pending "System and method for simulated dosimetry using a real-time location system" (Ser. No. 11/897,100, filed Aug. 29, 2007, published as U.S. 2008/0241805 on Oct. 2, 2008, now abandoned). An NFER® system also provides the real-time location system in a preferred embodiment of applicants' "Asset localization, identification, and movement system and method" (Ser. No. 11/890,350, filed Aug. 6, 2007, now U.S. Pat. No. 7,957,833 issued Jun. 7, 2011) and in applicants' "Inventory control system and method" (Ser. No. 13/153,640, filed Jun. 6, 2011, now U.S. Pat. No. 8,326,451 issued Dec. 4, 2012).

In addition, applicants recently discovered that AM broadcast band signals are characterized by "near field" behavior, even many wavelengths away from the transmission tower. These localized near-field signal characteristics provide the basis for a "Method and apparatus for determining location using signals-of-opportunity" (Ser. No. 12/796,643, filed Jun. 8, 2010, now U.S. Pat. No. 8,018,383 issued Sep. 13, 2011). The techniques therein disclosed enable an RTLS comprising a mobile tag receiver employing signals-of-opportunity to determine precise location or position. More generically, passive receiver tag RTLS employing an uncooperative signal is described in Applicant's "Near-field electromagnetic location system and method," (Ser. No. 12/977,067, filed Dec. 23, 2010, now U.S. Pat. No. 8,643,538 issued Feb. 4, 2014) along with other improvements in the RTLS arts. Additional details may be found in Applicant's co-pending "Method of near-field electromagnetic ranging and location," (Ser. No. 13/692,721, filed Dec. 3, 2012, published as U.S. 2014/0062792 on Mar. 6, 2014).

Applicants also discovered that a path calibration approach can yield successful location solutions particularly in the context of first responder rescues, as detailed in applicant's "Firefighter location and rescue equipment" (Ser. No. 13/021,711, filed Feb. 4, 2011, now U.S. Pat. No. 8,599,011 issued Dec. 3, 2013). Applicant's "Malicious attack response system and method," (Ser. No. 12/843,002 filed Jul. 23, 2010, published as U.S. 2012/0023572 Jan. 26, 2012, now abandoned) discusses innovative means of securing a computer network, such as location-based service or system, from an attack outside the network. All the above referenced US Patents are incorporated herein by reference in their entirety.

CONCLUSION

Although the present invention is illustrated in terms of ferrite materials, one skilled in the RF arts will realize that other magnetic materials (like iron), non-magnetic materials (like plastic or printed circuit board materials), an air core, or even meta-materials may be acceptable substitutes or alternatives for ferrite in a magnetic antenna. Thus, use of terms like "ferrite" in the present invention should be understood as being illustrative, not limiting.

A space efficient magnetic antenna system is of particular value in conjunction with an RF module and when used as a component in a system for wireless tracking. Magnetic antennas are well suited for applications requiring an antenna to be mounted against a human body, an asset, or other objects being tracked. Further, a space efficient magnetic antenna system enables a compact tracking device. A compact tracking device is highly prized in a wireless tracking application. Space efficient magnetic antennas are of value for enabling compact devices for a host of other applications as well, including, but not limited to, Radio Frequency Identification (RFID), low data rate Near-Field Communications (NFC), wireless power transfer, and Real-Time Location Systems (RTLS).

This disclosure discusses a multiple axis antenna system comprising magnetic antenna elements. Magnetic antenna elements include, but are not limited to loop, solenoidal, and loopstick elements. Magnetic antenna elements may further employ loading with ferrites, dielectrics, metamaterials, or other materials with desired electric or magnetic properties. Similar benefits and advantages are available employing electric antenna elements in a multiple axis antenna system, particularly for wireless devices that do not require close proximity to a person or asset. Antenna dimensions are often discussed generically. Terms such as equal, parallel, and orthogonal have practical tolerances when real components are constructed. The tolerances for a toy are likely to be wider than that for a scientific instrument. The tolerance is thus determined as appropriate for the proper usefulness of the device. In the absence of other guidance, substantially equal means a tolerance of plus or minus ten percent, preferably five percent. Substantially parallel and substantially orthogonal mean plus or minus ten degrees, preferably five degrees.

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention.

We claim:

1. A three axis antenna system comprising:
three magnetic antennas comprising a first magnetic antenna, a second magnetic antenna and a third magnetic antenna, each magnetic antenna of the three magnetic antennas having a respective magnetic center, a respective magnetic moment vector direction and a respective diameter, each of the respective diameters being equal to one another to within plus or minus ten percent; the three magnetic antennas oriented according to a reference orthogonal coordinate system having x, y, and z axes meeting at a common origin, the three magnetic antennas being oriented such that the respective magnetic moment vectors thereof are skew orthogonal so that the respective magnetic moment vectors do not intersect and the respective magnetic moment vectors are orthogonal with respect to one another;

the first magnetic antenna of the three magnetic antennas placed with the respective magnetic center thereof at a first position: x=d1, y=d2, z=0 in the reference coordinate system; the first magnetic antenna oriented with the respective magnetic moment vector direction thereof parallel to, and spaced apart from, the y axis and nonintersecting with respect to the y axis;

the second magnetic antenna of the three magnetic antennas placed with the respective magnetic center thereof at a second position: y=d1, z=d2, x=0 in the reference coordinate system; the second magnetic antenna oriented with the respective magnetic moment vector direction parallel to, and spaced apart from, the z axis and nonintersecting with respect to the z axis;

the third magnetic antenna of the three magnetic antennas placed with the respective magnetic center thereof at a third position: z=d1, x=d2, y=0 in the reference coordinate system; the third magnetic antenna oriented with the respective magnetic moment vector direction parallel to, and spaced apart from, the x axis and nonintersecting with respect to the x axis;

wherein d1 and d2 are coordinate distances in the reference coordinate system that are selected to substantially minimize cross coupling among the three magnetic antennas by selecting d1 and d2 such that when the direction of each magnetic axis of the three antennas is expressed as a normalized direction vector in Cartesian coordinates, a scalar product between any two of the three magnetic antennas is less than 0.25;

wherein d1 is at least one half of the respective diameter of the first magnetic antenna.

2. The three axis antenna system of claim 1, wherein d1 is substantially equal to d2 within plus or minus ten percent.

3. The three axis antenna system of claim 2, wherein d1 and d2 are substantially equal to the respective diameter of the first magnetic antenna within plus or minus ten percent.

4. The three axis antenna system of claim 1, wherein d2 is determined in accordance with achieving at least 15 dB isolation between at least the first magnetic antenna and the second magnetic antenna.

5. The three axis antenna system of claim 4, wherein d2 is determined by varying d2 and evaluating cross coupling as a function of d2 to find a local minimum cross coupling, then fixing d2 at a value producing local minimum cross coupling.

6. The three axis antenna system of claim 5, wherein d2 is varied at a sequence of incremental values of d2, and determining minimal coupling value of d2 to be the value of d2; wherein the isolation values on either side of minimal coupling d2 are higher than that of minimal coupling d2.

7. The three axis antenna system of claim 6, wherein the incremental values of d2 are incremented by less than ten percent of the respective diameter of the first magnetic antenna.

8. The three axis antenna system of claim 1, wherein said reference orthogonal coordinate system is left handed.

9. The three axis antenna system of claim 1, further including an antenna holder system supporting the three magnetic antennas wherein the antenna holder system comprises three substantially identical individual antenna holders configured to support the three magnetic antennas at a predetermined diagonal angle from a planar base plate.

10. The three axis antenna system of claim 9, wherein the individual antenna holders further include mounting tabs configured to share a mounting screw with an adjacent antenna holder in a three mounting screw pattern that establishes a 120 degree rotation from one antenna holder to an adjacent antenna holder.

11. A method for producing a three axis antenna system comprising:

providing three substantially identical magnetic antennas comprising a first magnetic antenna, a second magnetic antenna, and a third magnetic antenna, each magnetic antenna of the three magnetic antennas having a respective center, a respective magnetic moment vector direction and a respective diameter, each of the respective diameters being substantially equal to one another to within plus or minus ten percent;

orienting the three magnetic antennas according to a reference orthogonal coordinate system having x, y, and z axes meeting at a common origin, the three magnetic antennas being oriented such that the respective magnetic moment vectors thereof are skew orthogonal so that the respective magnetic moment vectors do not intersect and the respective magnetic moment vectors are orthogonal with respect to one another;

placing the first magnetic antenna of said three magnetic antennas with the respective magnetic center thereof at a first position: x=d1, y=d2, z=0 in the reference coordinate system; orienting the first magnetic antenna with the respective magnetic moment vector direction thereof parallel to, and spaced apart from, the y axis and nonintersecting with respect to the y axis;

placing the second magnetic antenna of the three magnetic antennas with the respective magnetic center at a second position: y=d1, z=d2, x=0 in the reference coordinate system; orienting the second magnetic antenna with the respective magnetic moment vector direction-parallel to, and spaced apart from, the z axis and nonintersecting with respect to the z axis;

placing the third magnetic antenna of the three magnetic antennas with the respective magnetic center at a third position: z=d1, x=d2, y=0 in the reference coordinate system; orienting the third magnetic antenna with the respective magnetic moment vector direction parallel to, and spaced apart from, the x axis and nonintersecting with respect to the x axis;

where d1 and d2 are coordinate distances in the reference coordinate system that are selected to substantially minimize cross coupling among the three magnetic antennas by selecting d1 and d2 such that when the direction of each magnetic axis of the three antennas is expressed as a normalized direction vector in Cartesian coordinates, a scalar product between any two of the three magnetic antennas is less than 0.25;

wherein d1 is at least one half of the respective diameter of the first magnetic antenna.

12. The method in accordance with claim 11, wherein d1 is substantially equal to d2 within plus or minus ten percent.

* * * * *